United States Patent
Werley et al.

(10) Patent No.: US 12,422,660 B2
(45) Date of Patent: Sep. 23, 2025

(54) MICROSCOPE FOR IMAGING SAMPLES WITHIN WELLS OF MULTI-WELL PLATES HOLD BY STAGE AND BEAM HOMOGENIZER FOR HOMOGENIZING BEAM

(71) Applicant: QUIVER HOLDINGS INC., Cambridge, MA (US)

(72) Inventors: Christopher Werley, Cambridge, MA (US); Yang Lu, Cambridge, MA (US); Arvind Mohan, Cambridge, MA (US); Pin Liu, Cambridge, MA (US); Graham T. Dempsey, Cambridge, MA (US); Nate Bremmer, Cambridge, MA (US); William Amar, Cambridge, MA (US); Hongkang Zhang, Wellesley, MA (US)

(73) Assignee: QUIVER HOLDINGS INC., Cambridge, MA (US)

( * ) Notice: Subject to any disclaimer, the term of this patent is extended or adjusted under 35 U.S.C. 154(b) by 939 days.

(21) Appl. No.: 17/563,434

(22) Filed: Dec. 28, 2021

(65) Prior Publication Data
US 2022/0206280 A1 Jun. 30, 2022

Related U.S. Application Data

(60) Provisional application No. 63/132,889, filed on Dec. 31, 2020.

(51) Int. Cl.
*G02B 21/26* (2006.01)
*G01N 21/03* (2006.01)
(Continued)

(52) U.S. Cl.
CPC ......... *G02B 21/26* (2013.01); *G01N 21/0303* (2013.01); *G01N 21/6458* (2013.01);
(Continued)

(58) Field of Classification Search
None
See application file for complete search history.

(56) References Cited

U.S. PATENT DOCUMENTS

| | | |
|---|---|---|
| 3,975,084 A | 8/1976 | Block |
| 7,316,801 B2 | 1/2008 | Kercso et al. |
| (Continued) | | |

FOREIGN PATENT DOCUMENTS

WO 2000/050872 A2 8/2000

OTHER PUBLICATIONS

Machine Translation in English of Chinese Pub # CN 108823095 A to Shen et al.*

(Continued)

*Primary Examiner* — Haris Sabah
(74) *Attorney, Agent, or Firm* — Thomas C. Meyers; Sullivan & Worcester LLP

(57) ABSTRACT

The inventions provide microscopes for imaging samples within wells of multi-well plates. Microscopes of the disclosure include a beam homogenizer system that shapes a beam from a light source into a shape specific to the bottom of a well of a multi-well plate. In particular, microscopes of the disclosure can illuminate wells for imaging by passing light through a prism that is beneath the sample. The light enters the prism from the side and as refracted into the well at a steep angle such that the light only illuminates about a bottom ten microns of the well. The beam homogenizer shapes the light from the light source so that, instead of hitting the prism as a spot with an irregular shape, the light enters the prism in a substantially rectangular pattern with homogeneous optical power level over the pattern.

35 Claims, 38 Drawing Sheets

(51) Int. Cl.
  *G01N 21/64* (2006.01)
  *G02B 21/06* (2006.01)
  *G02B 21/16* (2006.01)
  *G02B 21/36* (2006.01)
  *G02B 26/08* (2006.01)
  *G02B 27/10* (2006.01)
  *G02B 27/14* (2006.01)
  *G06V 20/69* (2022.01)

(52) U.S. Cl.
  CPC ............. *G02B 21/06* (2013.01); *G02B 21/16* (2013.01); *G02B 21/365* (2013.01); *G02B 26/0833* (2013.01); *G02B 27/1006* (2013.01); *G02B 27/141* (2013.01); *G01N 2021/6463* (2013.01); *G01N 2021/6482* (2013.01); *G01N 2201/0446* (2013.01); *G01N 2201/0631* (2013.01); *G01N 2201/103* (2013.01); *G01N 2201/104* (2013.01); *G01N 2201/1087* (2013.01); *G06V 20/69* (2022.01)

(56) References Cited

U.S. PATENT DOCUMENTS

| | | | |
|---|---|---|---|
| 7,531,303 | B2 | 5/2009 | Dorsel et al. |
| 7,978,412 | B2 | 7/2011 | Moriwaka |
| 8,908,277 | B2 | 12/2014 | Pesach et al. |
| 9,594,075 | B2 | 3/2017 | Eggan et al. |
| 9,664,613 | B2 | 5/2017 | Wohlstadter et al. |
| 10,288,863 | B2 * | 5/2019 | Werley ............... G01N 21/6428 |
| 10,436,713 | B2 | 10/2019 | Battrell et al. |
| 10,613,079 | B2 | 4/2020 | Eggan et al. |
| 2003/0179374 | A1 | 9/2003 | Jaaskelainen |
| 2004/0110123 | A1 | 6/2004 | Maher et al. |
| 2005/0112757 | A1 | 5/2005 | Spence et al. |
| 2005/0176056 | A1 | 8/2005 | Sammak et al. |
| 2011/0128532 | A1 * | 6/2011 | Taira ....................... G01J 9/04 356/218 |
| 2012/0053084 | A1 | 3/2012 | Gerber et al. |
| 2014/0295413 | A1 | 10/2014 | Cohen et al. |
| 2015/0004637 | A1 | 1/2015 | Cohen et al. |
| 2015/0080256 | A1 | 3/2015 | Gambini et al. |
| 2015/0216398 | A1 | 8/2015 | Yang et al. |
| 2016/0305926 | A1 * | 10/2016 | Rachet ................ G02B 21/361 |
| 2017/0246635 | A1 | 8/2017 | Buermann et al. |
| 2017/0248621 | A1 | 8/2017 | Putnam et al. |
| 2017/0270690 | A1 | 9/2017 | Chung et al. |
| 2017/0292961 | A1 | 10/2017 | Cohen et al. |
| 2017/0315430 | A1 | 11/2017 | Wang et al. |
| 2017/0370827 | A1 | 12/2017 | Wohlstadter et al. |
| 2018/0136198 | A1 | 5/2018 | Gerber et al. |
| 2018/0136446 | A1 | 5/2018 | Werley et al. |
| 2019/0154652 | A1 | 5/2019 | Ghosh et al. |
| 2019/0295413 | A1 | 9/2019 | Hase et al. |
| 2020/0158497 | A1 | 5/2020 | Arnoult et al. |
| 2020/0257098 | A1 * | 8/2020 | Shaffer ................ G02B 21/368 |

OTHER PUBLICATIONS

Original Pub. in Chinese Pub # CN 108823095 A to Shen et al.*
Axelrod, 2001, Total internal reflection fluorescence microscopy in cell biology, Traffic, 2(2):764-774.
Candia, 2017, Assessment of variability in the SOMAscan assay, Sci Rep 7(1):14248.
Fest, 2013, Baffle and Cold Shield Design, In: Stray Light Analysis and Control, Society of Photo-Optical Instrumentation Engineers (SPIE), pp. 163-182.
McGorty, 2015, Open-top selective plane illumination microscope for conventionally mounted specimens, Opt Exp 23 (12):16142-16153.
Simon, 2009, Partial internal reflections on total internal reflection fluorescent microscopy, Trends Cell Bio 19 (11):661-668.
Sluder, 2013, Fluroescent Protein Applications in Microscopy, from Digital Microscopy, Sluder & Wolf, Eds., Elsevier Science & Technology, p. 133.

* cited by examiner

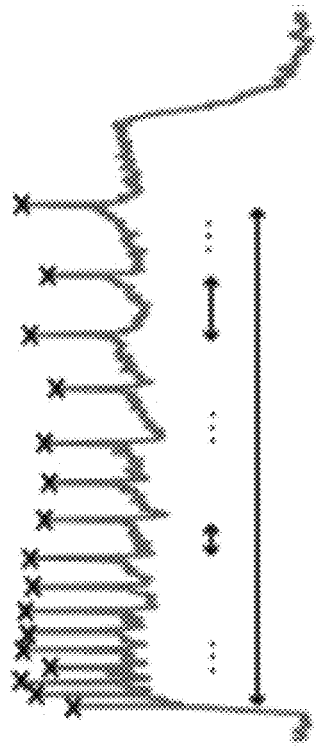
FIG. 23 Spike Shape
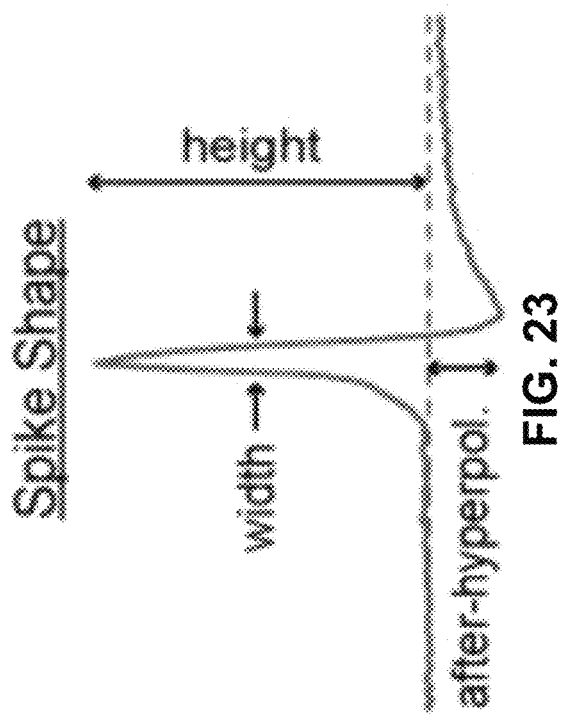
FIG. 24 Spike Timing
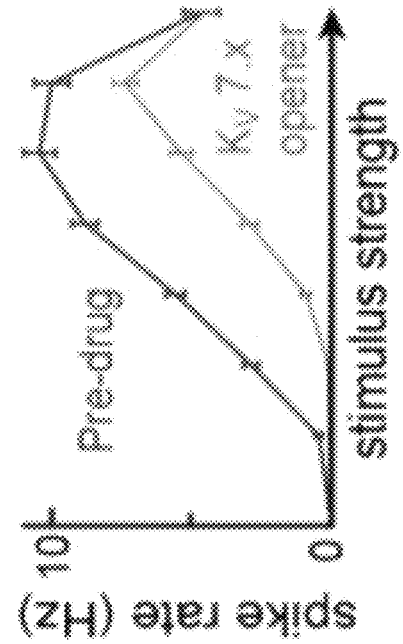
FIG. 25 Adaptation
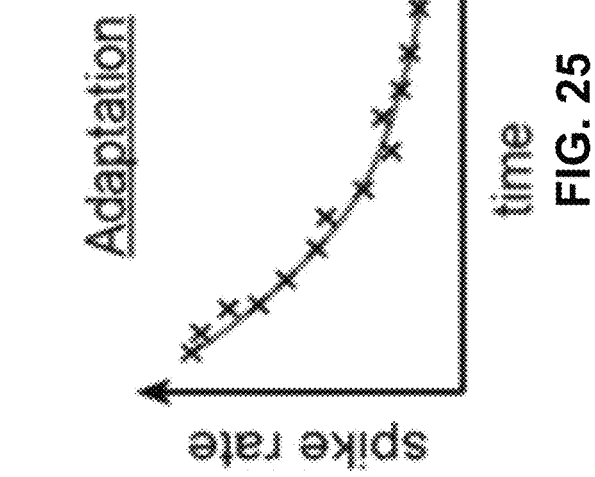
FIG. 26 Excitability

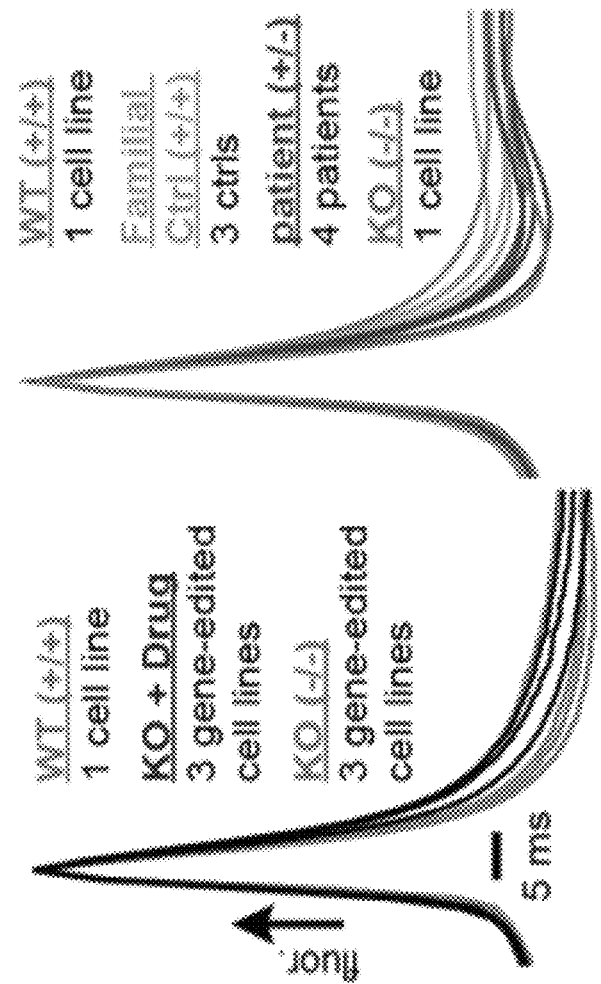
FIG. 40
FIG. 39
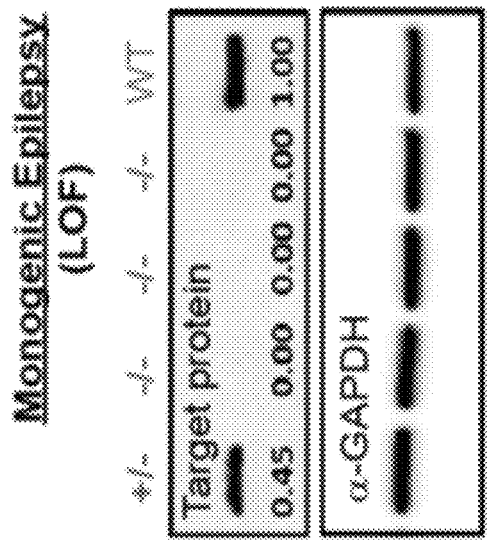
FIG. 38

MICROSCOPE FOR IMAGING SAMPLES WITHIN WELLS OF MULTI-WELL PLATES HOLD BY STAGE AND BEAM HOMOGENIZER FOR HOMOGENIZING BEAM

TECHNICAL FIELD

The disclosure relates to microscopes.

BACKGROUND

There are numerous diseases that involve electrically-active cells, such as neurons and cardiomyocytes. As a result, there is a significant push to study characteristics and interactions of those cells.

Fluorescence microscopy, a technique in which fluorophores are bound to the specimen to detect phenomena such as cell surface binding, neurotransmitter release, or specific DNA sequences is often used to study cellular behavior. However, fluorophores and other compounds in the surrounding medium and even in the optical components of the microscope can exhibit autofluorescence and overwhelm fluorescence from the sample. Attempts have been made to reduce background fluorescence by using total internal reflection fluorescence (TIRF) microscopy. A TIRF microscope illuminates only a thin region of the sample so that fluorophores in the surrounding medium do not receive the excitation energy needed for fluorescence. However, existing TIRF microscopes require a prism to be pressed down onto the sample in a configuration that severely limits what conditions are allowable for the sample. For example, the TIRF prism occludes any culture media, as would be required for living cells, and prevents any physical access to the sample. Thus, fluorescence microscopy has not proven satisfactory for studying fine details of living, electrically active cells. Other light microscopy techniques have failed to bring about results that are not similarly limited. Thus, there is a need in the art for improved techniques for optical measurement of cellular activity.

SUMMARY

The invention provides microscopes for imaging samples within wells of multi-well plates. Microscopes of the disclosure include a beam homogenizer system that shapes a beam from a light source into a shape with excellent uniformity to the bottom of a well of a multi-well plate. In particular, microscopes of the disclosure illuminate wells for imaging by passing light through a prism beneath the sample. The light enters the prism from the side and is refracted into the well at an angle such that the light only illuminates about a bottom ten microns of the well. The beam homogenizer shapes the light from the light source so that, instead of hitting the prism as a spot with an irregular shape, the light enters the prism in a substantially rectangular pattern with homogeneous optical power level over the pattern. Thus, cells at the bottom of well are illuminated uniformly with good optical power for imaging. Moreover, the microscope can include an adjustable optical system that allows the homogenizer components to be positioned and an aperture to be selected so that the homogenized illumination beam can be matched to wells of a particular multi-well plate or a particular imaging lens and its associated field of view. This allows different types of multi-well plates to be loaded onto the microscope for imaging. Each well can include a living sample culture with multiple living cells in each well that are imaged by the microscope. The cells can include fluorescent reporter proteins that emit light in response to cellular electrical activity. The beam homogenizer ensures that the entire sample in each well receives strong and uniform illumination while avoiding off-target light that causes autofluorescence. Using the beam homogenizer, the microscope can successfully image living cells in multiple wells of a multi-well plate and record movies of electrical activity useful to show, for example, action potentials propagating within living neurons.

For example, the microscope may be operable with two preselected imaging tube lenses and three types of multi-well plates, such as 96-, 384-, or 1536-well plates. The beam homogenizer may use a pair of a microlens arrays that are repositionable to one of six pairs of pre-set stops and the optical system may include a screen or block with six pre-defined apertures. For each of the six possible combinations of imaging tube lens and well-plate, the appropriate homogenizer microlens array spacing and aperture may be set so that the homogenized illumination beam enters the side of the prism as a homogeneous rectangle of illumination that gets refracted into about the bottom 10 microns of the well across the relevant field of view. Because only the relevant part of a sample (e.g., cells grown on a bottom of the well) is illuminated, excess autofluorescence is avoided. The light is restricted to the lower portion of the well by sending the beam into the prism at angle that promotes near-total-internal-reflection (TIR) within a glass bottom of the well. The light does not undergo TIR, but instead passes across only the bottom ten or so microns of the well. The microscope thus maximizes image clarity and signal-to-noise ratio.

Using near TIR illumination restricts the light to about the bottom ten microns of a sample in a multi-well plate. When the sample includes cells growing on a bottom surface of the plate, the light will illuminate those cells but will not illuminate other parts of the well plate. When the cells include fluorescent labels, such as optical reporters of electrical activity, the light is tuned to an excitation wavelength of the fluorescent reporters. Thus, the near-TIR imaging is very useful to excite fluorescent reporters in cells growing in the bottom of wells of multi-well plates. Optical systems of the microscope can simultaneously illuminate a well with multiple excitation wavelengths.

Additionally, microscopes of the invention can apply spatially-patterned illumination to a sample. A microscope can shine light onto a well with a pattern such that a cell in the well is illuminated and only that cell. The spatial patterning can illuminate one or more particular cells. Using a digital light processor or digital micromirror device (DMD), the light can be shined with an arbitrarily complex pattern such that one or more living cells can be illuminated without shining any of the illumination light into parts of the well not occupied by the one or more cells. Moreover, the microscope can initially image the well, and an associated computer system can be used to identify the one or more cells within an image and to create a "spatial mask", or a digital file identifying, pixel-by-pixel, locations within the image that are occupied and not occupied by the one or more cells. The computer system can use the spatial mask to activate corresponding reflective pixels on the DMD. The microscope shines light onto the DMD, which reflects onto the sample with a pattern matches the locations of the one or more cells growing at the bottom of the well. Creating the mask can be done by fluorescently labelling the cells of interest, or using human-user-selection, or performing an object finding algorithm in the image. Moreover, the microscope can iterate over each of a plurality of wells and create a spatial mask for each. Then, the microscope can operate an xy translational stage to position each of those wells over the imaging optical system and, for each well, use the corresponding spatial mask to spatially pattern illumination onto the one or more cells of interest growing in the bottom of that well.

The spatially patterned illumination is of particular use when the cells are electrically active cells such as neurons that are expressing an optical actuator of electrical activity. For example, certain channelrhodopsins may be used as light-gated ion channels that then function as optical actuators of electrical activity. When those proteins are expressed by a cell and then illuminated by light of a certain wavelength, the light causes those proteins to pump ions across the cell membrane, effecting membrane polarization leading to electrical activity such as causing that cells to transmit an action potential down its length. When multiple cells in a sample are expressing optical actuators, spatially-patterned illumination is useful to trigger electrical activity (such as an action potential) in only select ones of those cells. Because the microscope can image each well of a plurality of wells in a plate, create a spatial mask for select cells in each well, use a translational stage and DMD to spatially pattern illumination onto each well in-turn while imaging those wells, the microscope is well suited to optogenetic analysis of electrically active cells in multi-well plates.

The spatially patterned illumination may be provided at a wavelength specific to optogenetic actuators such as a channelrhodopsin that functions as a light-gated ion channel. The microscope may further include a prism and dichroic assembly that received multiplexed light of different wavelengths and refracts at least one wavelength into a well at a near-TIR angle while reflecting another wavelength from a DMD to simultaneously provide spatially patterned illumination on the sample. The near-TIR illumination may be at an excitation wavelength of a fluorescent reporter in cells in the sample, such as, for example, an optogenetic reporter of membrane electrical activity. Moreover, using optical systems described herein, the microscope can also simultaneously illuminate the sample by near-TIR with light of a second wavelength, such as the excitation wavelength of a second optogenetic protein, such as a fluorescent reporter of an ion concentration. Additionally, the microscope can include imaging systems—such as an imaging lens, optional filters, and an image sensor—to record light at emission wavelengths of the optogenetic proteins.

Thus, the microscope can simultaneously handle at least five different wavelengths of light (activation light for an optogenetic actuator, excitation light for at least two fluorescent reporters, and emission light for both reporters) through a single prism assembly. The microscope records movies of electrical activity of cells in wells of a plate, and serially performs an imaging assay for each of a plurality of wells of the plate using a translational stage to displace the plate in an xy direction over the stage. Using a beam homogenizer, the sample is fully illuminated across the applicable field of view with a light beam shaped to wells of the current plate in use on the stage with excellent illumination uniformity, which is critical to capture optogenetic reporter activity with good signal-to-noise ratio. Thus the microscope provides for conducting assays to record movies of neural activity from multiple wells of a multi-well pate.

In certain aspects, the invention provides microscopes that include a stage configured to hold a multi-well plate; a light source for emitting a beam of light mounted within the microscope; and an optical system that directs the beam towards the stage from beneath, wherein the optical system comprises a homogenizer for spatially homogenizing the beam. The stage may be a motorized xy translational stage. The microscope may include a control system comprising memory connected to a processor operable to move the translational stage to position individual wells of the multi-well plate in the path of the beam. The optical system may include a prism beneath the stage, whereby the beam enters a side of the prism and passes into a well of the plate at near-TIR angle.

In some embodiments, when a well of the plate containing an aqueous sample is positioned above the prism, the prism directs the beam into the sample at angle that avoids total internal reflection within the bottom of the plate. When a well of the plate containing an aqueous sample is positioned above the prism, the prism may direct the beam into the aqueous sample at an angle of refraction that restricts light to about the bottom microns of the well in order to reduce background autofluorescence and boost the excitation intensity.

In certain embodiments, the microscope includes multiple (e.g., at least three) light sources for emitting three beams at three distinct wavelengths. The optical system comprises one or more dichroic mirrors to join the three beams in space and pass the three beams through the homogenizer. One of the prisms may include a dichroic surface that reflects one wavelength for spatial patterning and refract the others for near-TIR illumination. Preferably, the homogenizer forms the beam into a substantially uniform and rectangular region of illumination. The homogenizer may include at least two microlens arrays.

The optical system may include an opaque screen with a plurality of apertures, wherein the screen can be positioned so that the beam passes through one of the apertures. Optionally the homogenizer comprises two microlens arrays and the optical system comprises a plurality of microlens array position stops at predetermined spacings whereby a distance between the two microlens arrays can be fixed to thereby shape the beam to match each of the apertures.

The microscope may include a stimulation light source that emits a stimulation beam (e.g., at a wavelength that activates a light-gated ion channel). The optical system may also include a digital micromirror device (DMD) such that the stimulation beam reflects off the DMD to illuminate a bottom of a well of the plate with a pattern defined by the DMD. For example, the beam may be at an excitation wavelength of a fluorophore, while the stimulation beam is at a second wavelength such as for optogenetic actuation of electrical activity.

The microscope may include an imaging lens beneath the stage to direct light from a sample in a well of the plate onto an image sensor mounted within the microscope. Preferably the optical system includes a prism immediately beneath the stage, whereby the beam (e.g., as an excitation beam) enters a side of the prism and the prism directs the beam into an aqueous sample in a well of the plate at an angle of refraction that restricts light to about the bottom ten microns of the well, the microscope further comprising a stimulation light source that emits a stimulation beam (e.g., specific to an optogenetic actuator), wherein the optical system comprises a digital micromirror device (DMD) and the stimulation beam reflects off the DMD to illuminate a bottom of a well of the plate with a pattern defined by the DMD. The stimulation beam and the excitation beam may be multiplexed onto the same optical path and separated by a dichroic mirror forming part of the prism assembly. Alternatively, the stimulation beam and the excitation beam may be passed towards the prism assembly along distinct and spatially separated paths.

Aspects of the disclosure provide a method for imaging a sample. The method includes positioning a multi-well plate on a microscope stage, the plate having at least one cell living on a bottom surface of a well; obtaining an image of the cell; and processing the image to create a spatial mask identifying areas of the bottom surface occupied by the cell and areas not occupied by the cell. A control system of the microscope then selectively activates micromirrors of a digital micromirror device (DMD) that subtend the cell using the spatial mask and causes the microscope to shine light onto the DMD to thereby specifically reflect light onto the areas of the bottom surface occupied by the cell while not reflecting any of the light onto the areas not occupied by the cell. The method may include creating a spatial mask for cells in each of a plurality of wells of the multi-well plate; holding the spatial masks in memory; and using the spatial masks and DMD to selectively illuminate the cells in the plurality of wells in a serial manner. Preferably the DMD is controlled by a computer comprising a process coupled to a non-transitory memory system, the memory system having the spatial masks stored therein. Preferably the light is activation light at a wavelength that activates a light-gated ion channel in the cell.

The method is useful where a light-gated ion channel is in a pre-synaptic neuron connected to a non-selected cell via a synapse. The non-selected cell may include an optical reporter of synaptic activity. In preferred embodiments, the stage comprises a motorized xy translational stage and the computer directs the stage to serially position each of the plurality of wells over an imaging lens of the microscope and activate micromirrors of the DMD according to a spatial mask created uniquely for cells in that well and stored in the memory system. The cells may include neurons such that selectively illuminating the cells in the plurality of wells initiates electrical activity in the illuminated cells. The computer may record a movie for each well using an imaging sensor positioned beneath the imaging lens and store the resulting plurality of movies in the memory system. Preferably the microscope includes a light source and optical system that guides an excitation beam of light to each well from beneath at an angle that restricts the light to about the bottom ten microns of the well. The wells may contain neurons that express optical reporters of electrical activity, in which the neurons fluoresce when they fire an action potential. The movies may record fluorescent activity showing the neurons firing. Optionally the cell expresses a fluorescent protein (e.g., such as GFP) and a computer system analyzes a signal from the fluorescent protein to automatically create the spatial mask. In preferred embodiments, the computer system can automatically create a spatial mask for labeled cells in each of a plurality of wells and hold the spatial masks in memory while the microscope serially illuminates each well using the DMD and the respective spatial mask to create spatially patterned illumination specific to a cell in that well.

In certain aspects, the microscopes of the invention and methods using them include an autofocus system. An exemplary method using the autofocus system includes positioning a multi-well plate on a microscope stage, the plate having at least one cell living on a bottom surface of a well, wherein the microscope includes an autofocus system. Images are obtained of the multi-well plate from a plurality of fields of view (FOV). The position of each FOV is determined using an autofocus system. The system then generates a plate focus map of a curvature of wells of the multi-well plate from a subset of the FOVs. Measurements from the cell living on the bottom of the well are obtained by interpolating the positions the FOVs between the subset of the FOVs.

In certain aspects, the autofocus system is a laser-based autofocus system. An exemplary method using a laser-based autofocus system may further include moving the microscope stage into a first position and shining a laser beam on the well using a laser of the laser-based autofocus system and determining, using the autofocus system, the position of a FOV based on the displacement the laser beam reflecting off the sample. The well with the sample may be moved and the laser beam detected for each FOV obtained by the autofocus system.

In certain aspects, the autofocus system is an image-based autofocus system. An exemplary method using an image-based autofocus system may include recording the X,Y coordinates of n wells across the microplate from the subset of FOV; measuring an image quality metric in the n wells across a series of Z steps; and finding the Z step that provides the highest image quality metric across the n wells.

BRIEF DESCRIPTION OF THE DRAWINGS

FIG. 23 shows the spike shape.
FIG. 24 shows spike timing properties.
FIG. 25 shows adaptation averaged over cells.
FIG. 26 shows the excitability extracted from data.

FIG. 38 shows WT cells, CRISPR/Cas9 was used to knock out the gene, and multiple isogenic clones were expanded and converted to neurons.

FIG. 39 show that through multiple rounds and KO cell lines, there was a consistent change in spike shape. Treatment with a clinically effective compound moves the behavior back towards WT.

FIG. 40 gives a similar, but less severe phenotype observed in heterozygous patient cell lines and healthy familial controls.

DETAILED DESCRIPTION

Figure 1:
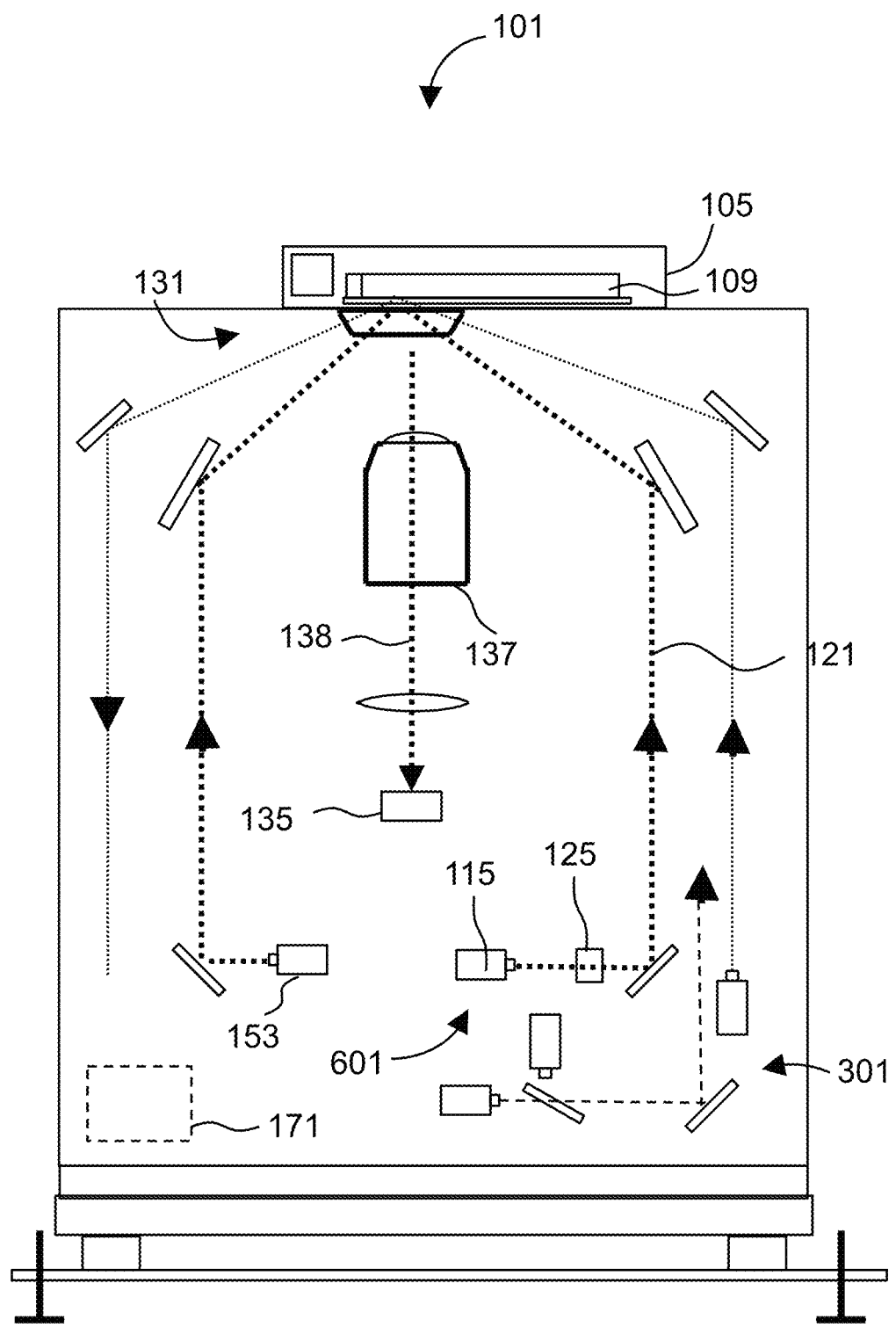
FIG. 1 shows components of a microscope of the disclosure.

The invention provides multi-well plate microscope for illuminating a sample with near-TIR light in a configuration that allows living cells to be observed and imaged within wells of a plate. The invention is particularly useful for observing fluorescence in biological moieties with rapid dynamics and fluorophores having low quantum efficiency. The microscope illuminates the sample from the side rather than through the objective lens, which allows more intense illumination, and a corresponding lower numerical aperture and larger field of view. By using illumination light at a wavelength distinct from the wavelength of fluorescence, the TIR microscope allows the illumination wavelengths to be nearly, completely removed from the image with optical filters, resulting in images that have a dark background with bright areas of interest. The microscope can observe fluorescence to provide indicative measures of underlying chemical or biochemical processes, for example the expression of a gene, the presence of an antibody, or the location of specific proteins within a cell.

Fluorescent reporters such as the modified Archaerhodopsin proteins known as QuasAr2 and QuasAr3 require intense excitation light in order to fluoresce. Low quantum efficiency and rapid dynamics demand intense light to measure electrical potentials. The illumination subsystem is therefore configured to emit light at high wattage or high intensity. Characteristics of a fluorophore such as quantum efficiency and peak excitation wavelength change in response to their environment. The intense illumination allows that to be detected. Autofluorescence caused by the intense light is minimized by the microscope in multiple ways. The use of near-TIR illumination exposes only a bottom portion of each well to the illumination light, thereby reducing excitation of the culture medium or other components of the device. Additionally, the microscope is configured to provide illumination light that is distinct from imaging light. Optical filters in the imaging subsystem filter out illumination light, removing unwanted fluorescence from the image. Cyclic olefin copolymer (COC) dishes for culturing cells enable reduced background autofluorescence compared to glass. The prism is coupled to the multi-well plate through an index-matching low-autofluorescence oil. The prism is also composed of low autofluorescence fused silica.

The microscope is configured to optically characterize the dynamic properties of cells. The microscope realizes the full potential of all-optical characterization by simultaneously achieving: (1) a large field of view (FOV) to allow measurement of interactions between cells in a network or to measure many cells concurrently for high throughput; (2) high spatial resolution to detect the morphologies of individual cells in wells and facilitate selectivity in signal processing; (3) high temporal resolution to distinguish individual action potentials; and (4) a high signal-to-noise ratio to facilitate accurate data analysis. The microscope can provide a field of view sufficient to capture tens or hundreds of cells. The microscope and associated computer system provide an image acquisition rate on the order of at least 1 kilohertz, which corresponds to a very short exposure time on the order of 1 millisecond, thereby making it possible to record the rapid changes that occur in electrically active cells such as neurons. The microscope can therefore acquire fluorescent images using the recited optics over a substantially shorter time period than prior art microscopes.

The microscope achieves all of those demanding requirements to facilitate optically characterizing the dynamic properties of cells. The microscope provides a large FOV with sufficient resolution and light gathering capacity with a low numerical aperture (NA) objective lens. The microscope can image with magnification in the range of 2× to 6× with high-speed detectors such as sCMOS cameras. To achieve fast imaging rates, the microscope uses extremely intense illumination, typically with fluence greater than, e.g., 50 W/cm$^2$ at a wavelength of about 635 nm up to about 2,000 W/cm$^2$.

Despite the high power levels, the microscope nevertheless avoids exciting nonspecific background fluorescence in the sample, the cell growth medium, the index matching fluid, and the sample container. Near-TIR illumination limits the autofluorescence of unwanted areas of the sample and sample medium. Optical filters in the imaging subsystem prevent unwanted light from reaching the image sensor. Additionally, the microscope prevents unwanted autofluorescence of the glass elements in the objective lens by illuminating the sample from the side, rather than passing the illumination light through the objective unit. The objective lens of the microscope may be physically large, having a front aperture of at least 50 mm and a length of at least 100 mm, and containing numerous glass elements.

The microscope can be used to observe fluorescent indicators that are sensitive to specific physical properties of their environment such as calcium ion concentration or membrane potential. The time-varying signal produced by these indicators is repeatedly measured to chart the course of chemical or electronic states of a living cell. One example of an environmentally sensitive fluorescent indicator for use with the present invention is the archaerhodopsin-based protein QuasAr2, an optogenetic reporter which is excited by red light and produces a signal that varies in intensity as a function of cellular membrane potential. Optogenetic reporters can be introduced into cells using genetic engineering techniques such as transfection or electroporation, facilitating optical measurements of membrane potential.

In addition to fluorescent indicators, microscopes can be used to optically activate light-sensitive compounds for chemically or electrically perturbing cells. The invention can be used with voltage-indicating proteins such as those disclosed in U.S. Pat. No. 10,613,079 and U.S. Pub. 2014/0295413, the entire contents of each of which are incorporated by reference. Using light-controlled activators, stimulus can be applied to entire samples, selected regions, or individual cells by varying the illumination pattern. One example of a light-controlled activator is the channelrhodopsin protein CheRiff, which produces a current of increasing magnitude roughly in proportion to the intensity of blue light falling on it. In one study, CheRiff generated a current of about 1 nA in whole cells expressing the protein when illuminated by about 22 mW/cm$^2$ of blue light.

Optically modulated activators can be combined with fluorescent indicators to enable all-optical characterization of specific cell traits such as excitability. For example, a channelrhodopsin such as CheRiff is combined with a fluorescent indicator such as QuasAr2. The microscope provides different wavelengths of light to illuminate and activate the reporter and activator proteins, respectively, allowing membrane potential to be measured at the same time that action potentials are initiated by light.

Samples useful with the near-TIR microscope include cells expressing an optical activator of electrical activity and an optical reporter of electrical activity. Within a well of a multi-well plate, a first cell expresses the activator and a second cell expresses the reporter. The microscope can activate the light-sensitive activator protein (e.g., the optogenetic actuator) with an activation beam to cause a conformational change in the protein, thereby initiating a change in membrane potential in the cell. The result is that the cell "fires," i.e., an action potential propagates in the electrically-active cell. The microscope can simultaneously illuminate a fluorescent optical reporter protein with an illumination beam that is spectrally distinct from the activation beam, causing the reporter to fluoresce. The imaging subsystem of the microscope can measure the fluorescence emitted by the reporter to measure corresponding changes in membrane potential.

The microscope employs numerous light subsystems such as at least an illumination light subsystem for exciting a reporter protein and an imaging light subsystem to image the light emitted by the reporter. The microscope may also include an activation light subsystem for activating an activator protein such as a light-gated ion channel. In some embodiments, the illumination subsystem refers to a subsystem for emitting illumination light for energizing a reporter protein so that it can fluoresce upon a change in action potential. The imaging subsystem refers to a subsystem for receiving the light emitted by the reporters when they fluoresce, and the light that they emit is referred to as imaging light. The activation subsystem refers to the subsystem that emits light for activating a light-gated ion channel protein for initiating change in membrane potential.

FIG. 1 shows components of a microscope 101 of the disclosure. The microscope includes a stage 105 configured to hold a multi-well plate 109; an excitation light source 115 for emitting a beam of light mounted within the microscope; and an optical system 601 that directs the beam towards the stage from beneath. The optical system comprises a homogenizer 125 for spatially homogenizing the beam. The microscope 101 includes or is communicatively coupled to a computer 171 or computing system hardware for performing or controlling various functions. The microscope 101 may include a light patterning system 301, discussed in more detail below. The stage 105 is preferably a motorized xy translational stage.

The microscope 101 includes an image sensor 135. The image sensor may be provided as a digital camera unit such as the ORCA-Fusion BT digital CMOS camera sold under part #C15440-20UP by Hamamatsu Photonics K.K. (Shizuoka, JP) or the ORCA-Lightning digital CMOS camera sold under part #C14120-20P by Hamamatsu Photonics K.K. Another suitable camera to use for sensor 135 is the back-illuminated sCMOS camera sold under the trademark KINETIX by Teledyne Photometrics (Tucson, AZ).

The microscope may also include an imaging lens 137 such as a suitable tube lens. The lens 137 may be an 85 mm tube lens such as the ZEISS Milvus 85 mm lens. With such imaging hardware, the microscope can image an area with a diameter of 5.5 mm in a 96-well plate and the full 3.45 mm well width of a 384-well plate.

The microscope 101 preferably includes a control system comprising memory connected to a processor operable to move the translational stage to position individual wells of the multi-well plate in the path of the beam. Optionally, the microscope 101 includes an excitation light source 115 mounted within the microscope for emitting a beam 121 of light. The optical system 601 directs the beam 121 towards the stage from beneath.

The microscope 101 may optionally include a secondary light source 153. The secondary light source 153 may have its own optical system that share some similarities with the optical system 601. However, including the optical system 601 and the secondary light source 153 with its own optical system allows those systems to be operated independently, simultaneously or not. In some embodiments, the secondary light system is operated a different (e.g., much higher) power than the optical system 601. The secondary light source 153 and its system may be used for calibration or to address optogenetic proteins that operate best at a different power than sets of optogenetic proteins addressed by the optical system 601.

Figure 2:
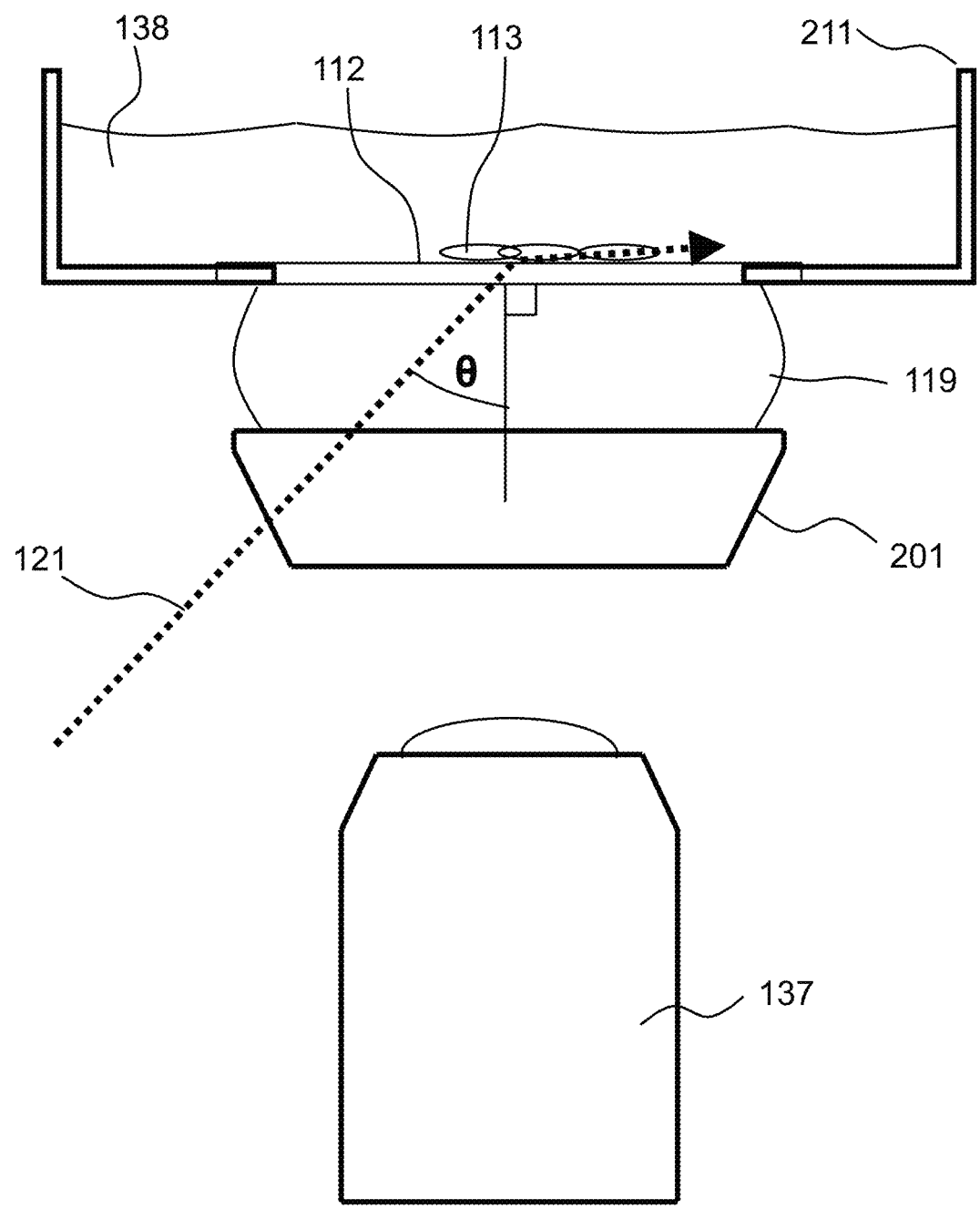
FIG. 2 shows a prism.

FIG. 2 shows a prism 201 that guides the beam 121 towards the sample 205. The optical system 601 includes a prism 201 immediately beneath the stage, whereby the beam enters a side of the prism and passes into a well 211 of the plate. As shown, an aqueous sample 138 includes living cells 113 on a bottom surface 112 of a well 211. Optionally, index-matched lens oil 119 optical couples the prism 201 to the bottom 112 of the well. Preferably, when a well 211 of the plate containing an aqueous sample 138 is positioned above the prism 201, the prism directs the beam 121 into the sample at angle theta that avoids total internal reflection within the bottom 112 of the well of the plate. As shown, when a well of the plate containing an aqueous sample is positioned above the prism, the prism directs the beam into the aqueous sample at an angle of refraction that restricts light to about the bottom ten (optionally twenty) microns of the well.

The invention provides a microscope in which all of the optical components are positioned underneath a well of a multi-well plate and illumination occurs from the side rather than through the objective lens. The side illumination allows the microscope to have more intense illumination and a larger field of view. Optionally, an area above the stage is unencumbered by optical elements such as prisms. That configuration allows for physical access to the sample and control over its environment. Thus, the sample can be, for example, living cells in a nutrient medium. That configuration solves many of the problems associated with traditional TIRF microscopes. In particular, a thin region of sample cells can be illuminated with a near-TIR beam without having to physically interfere with the cells by loading them into a flow chamber. Instead, living cells in an aqueous medium such as a maintenance broth can be observed. The sample can be further analyzed from above with electrodes or other equipment as desired. The microscope can be used to image cells expressing fluorescent voltage indicators. Since the components do not interfere with the sample, living cells can be studied using a microscope of the invention. Where a sample includes electrically active cells expressing fluorescent voltage indicators, the microscope can be used to view voltage changes in, and thus the electrical activity of, those cells. Since the electrical activity of cells such as neurons and cardiomyocytes can be studied using devices and methods of the invention, the invention will help researchers understand diseases affecting those cells, empowering them to discover new preventions and cures for diseases such as Alzheimer's and heart disease.

Devices and methods of the present invention can be used in conjunction with optogenetics. In optogenetics, light is used to control and observe certain events within living cells. For example, a light-responsive gene such as a fluorescent voltage indicator can be introduced into a cardiomyocyte. The reporter may be a rhodopsin-type transmembrane protein that generates an optical signal in response to changes in membrane potential, thereby functioning as an optical reporter. For example, modified versions of the microbial rhodopsin protein Archaerhodopsin 3 (Arch) from *Halorubrum sodomense* may be used as an optically reporter. Examples of optical reporters are the microbial rhodopsin QuasAr2 and QuasAr3. When excited with an illumination light at one wavelength, the reporter is energized to emit a light of a different wavelength indicative of a change in membrane potential. The microscope therefore includes an illumination system for illuminating the sample with one wavelength of light and an imaging system for recording an image of light given off by the reporter in a different wavelength. The illumination system includes a light source and a prism. Illumination light from the light source is transmitted through the prism, which imparts near-TIR illumination on the sample. The imaging system includes an objective lens and an image sensor for recording the light emitted by the reporter.

Near-TIR illumination can provide illumination of a thin region of cells approximately 10 microns thick. That means that it can illuminate a whole cell that is in contact with a bottom of a well of a multi-well plate. The illumination comes from the side rather than through the objective, and so the microscope is able to illuminate a whole cell using intense illumination without illuminating the medium or other optical components.

Optionally, cells in the sample may also include optogenetic activators, such as a light-gated ion channel. The optical actuator may be a genetically-encoded rhodopsin or modified rhodopsin such as a microbial channelrhodopsin. For example, sdChR, a channelrhodopsin from *Scherffelia dubia*, may be used or an improved version of sdChR— dubbed CheRiff—may be used as an optical actuator. "CheRiff" refers to a version of sdChR that uses mouse codon optimization, a trafficking sequence, and the mutation E154A as described herein. The activator responds to light of a particular wavelength to initiate an action potential in the electrically active cell. To activate those optogenetic proteins, the microscope may include an activation system. The activation system directs light onto the sample at a wavelength capable of activating the channelrhodopsin. The activation light may be patterned light, which corresponds to certain areas of the sample, such as particular cells in the sample. The pattern can be imparted on the light beam with a spatial light modulator (SLM) such as a digital micromirror device (DMD). Light is shined onto the SLM, which reflects a defined pattern of the light that is imaged onto the sample. The light pattern can correspond to particular cells expressing the activator.

The microscope may include additional reporters and associated systems for activating them. Proteins that report changes in intracellular calcium levels may be used, such as a genetically-encoded calcium indicator (GECI). The microscope may include a subsystem to provide activation light for a GECI, such as yellow light for RCaMP. Exemplary GECIs include GCaMP or RCaMP variants such for example, jRCaMP1a, jRGECO1a, or RCaMP2. A key challenge in combining multiple optical modalities (e.g., optical excitation, activation, voltage imaging, calcium imaging) is to avoid optical crosstalk between the modalities. The pulses of light used to deliver optical activation should not induce fluorescence of the reporters; the light used to image the reporters should not activate the light-gated ion channel; and the fluorescence of one reporter should be readily distinguished from the fluorescence of other reporters. In some aspects of the invention, this separation of modalities is achieved by selecting an activator and reporters with little or no spectral overlap. In one embodiment, the activator is activated by blue light, a Ca2+ reporter is excited by yellow light and emits orange light, and a voltage reporter is excited by red light and emits near infrared light.

Moreover, the microscope includes systems for spatially-patterned illumination, useful to selectively illuminate only specific cells within a sample.

Figure 3:
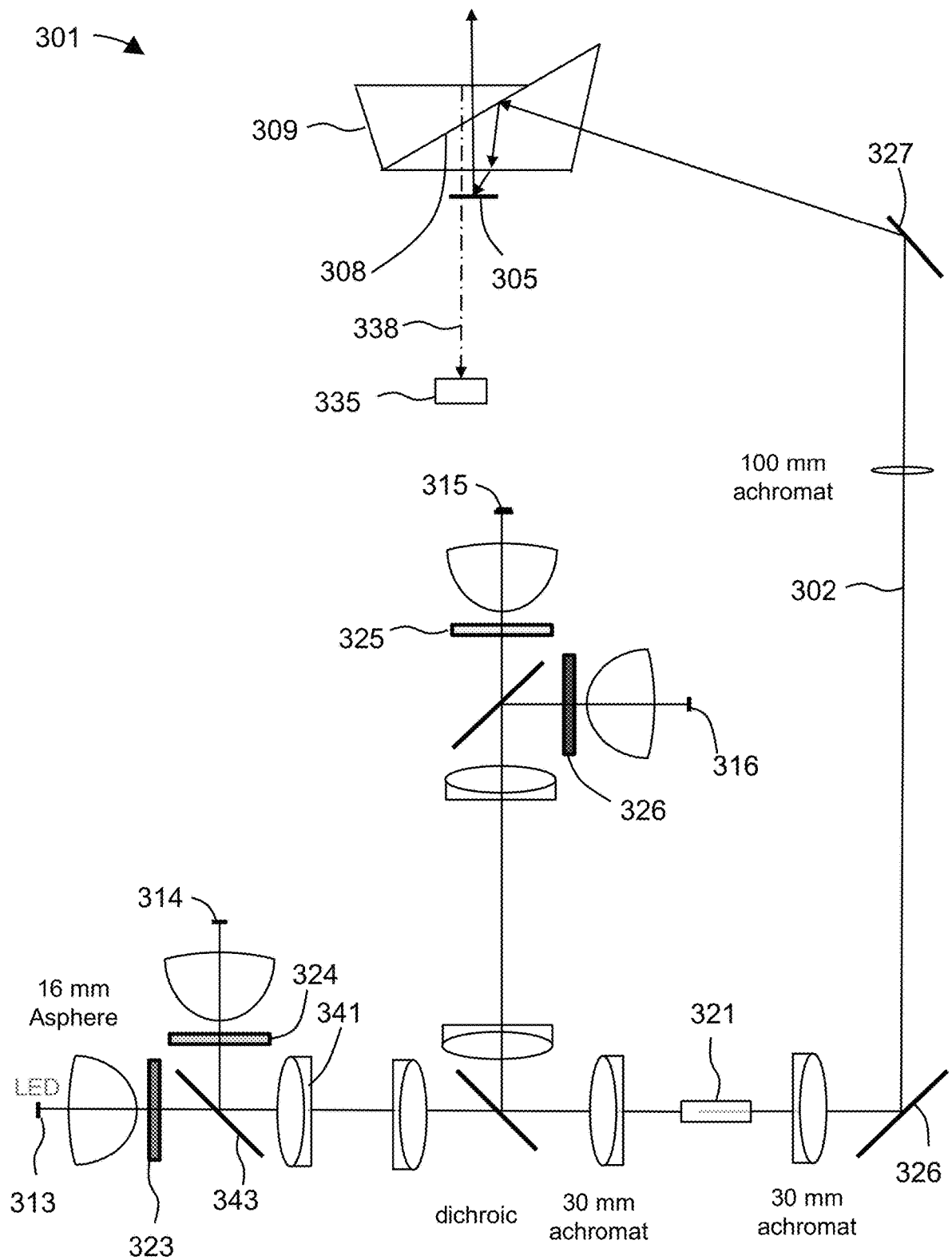
FIG. 3 shows a light patterning system.

FIG. 3 shows an optical light patterning system 301 to spatially pattern light of multiple wavelengths onto a sample. The light patterning system 301 includes a first light source 313 for emitting a beam 302 of light. The beam of light reflects from a digital micromirror device (DMD) 305. The DMD 305 forms the beam 302 into a pattern. The patterned beam is imaged onto the sample. The DMD will enable fully synchronized 100 μs pattern refresh for fast single-cell stimulation to measure individual synaptic connections or slightly delayed pulses on connected neurons to probe spike-timing dependent plasticity. The light patterning system may optionally include a second light source 314. The first light source preferably sends light of a first wavelength into the beam 302. This may be done using a filter 323 for the first wavelength.

A dichroic mirror 343 may selectively reflect light of a second wavelength from the second light source 314 into the beam 302. The light patterning system 301 may include one or any number of lens element(s) 341, such as 30 mm achromatic doublets, to guide light onto any dichroic mirror(s) 343 or to collimate the beam 302. The second light source 314 may provide light at the second wavelength using a second filter 324 specific for the second wavelength. The light patterning system 301 may include a third light source 315, a third filter 325, and optionally a fourth light source 316 and a fourth filter 326. In preferred embodiments, once light from various wavelengths is joined in the beam 302 the beam 302 is passed through a light pipe 321.

One optional embodiment uses four light sources with four wavelengths: UV (380 nm), blue (470 nm), yellow/green (560 nm), and red (625 nm). The UV (380 nm) may be useful for imaging EBFP2 or mTagBFP2 imaging or intracellular calcium. A power of 50 mW/cm$^2$ may be sufficient. The blue (470 nm) may be used to image CheRiff (e.g., at 250 to 500 mW/cm$^2$ to open >95% of channels), Chronos (e.g., at 500 mW/cm$^2$ to open a majority of channels), FLASH, or other such proteins. The yellow/green (560 nm) light may be used to image jRGECO1a (80 mW/cm$^2$ @560 nm for neurons, or 25 mW/cm$^2$ for cardiomyocytes) VARNAM, or other proteins. The red (625 nm) may be useful for measuring target proteins with Alexa647 (e.g., at 50 mW/cm$^2$), or cellular activity with BeRST (e.g., 1-20 W/cm$^2$ for neurons)

The light patterning system 301 may include one or any number of round mirrors 326 to guide the beam 302 from the light source 313 (typically mounted to a solid frame or board) to the sample. The light patterning system 301 includes an adjustable round mirror 327 that controls the final angle by which light approaches the prism assembly 309. In a preferred embodiment, the light pattern system 301 includes a prism assembly 309 that includes one or more prisms to guide the light onto the DMD 305 and on to the sample. The prisms may preferably have a refractive index that matches a refractive index of a material that forms a bottom of a multi-well plate. For example, the microscope 101 may be designed for use with a plate such as the glass bottom microplates with 24, 96, 384, or 1536 wells sold under the trademark SENSOPLATE by MilliporeSigma (St. Louis, MO). Such microplates have dimensions that include 127.76 mm length and 85.48 mm width. The microplates include borosilicate glass (175 µm thick).

The prism assembly 308 may include a dichroic mirror 308 that bounces select wavelengths of light off of the DMD 305 and permits other select wavelengths to pass through at a near-TIR angle to thereby illuminate the sample over just the bottom 10 to 20 microns of the well. Here, near-TIR can be understood to mean that the angle is less than the critical angle by which the light coming from the side will exhibit total internal reflection in part of the multi-well plate hardware (e.g., will NOT exhibit TIR in the borosilicate glass bottom of the plate) but is nevertheless quite close to that, e.g., preferably within 10 degrees of the critical angle, more preferably within 5 degrees of the critical angle for TIR, most preferably within 2 degrees of the critical angle.

As shown, a sample that is imaged emits light 338 that passes towards an imaging sensor 335 (e.g., through a tube lens, not pictured). Because of the dichroic mirror, the sample can be illuminated with spatially pattern light, also illuminated from the side by near-TIR light that pass through only about the bottom 10 microns of the sample well (both from beam 302), and also emit emitted light 338 that is captured by the sensor 335 to record a movie.

Any suitable digital light processor or spatial patterning mechanism may be used as the DMD 305. In some embodiments, the DMD 305 is a Vialux V9601-VIS DMD system with a 1920×1200 pixel array of micromirrors at a 10.8 µm pitch and a 20.7×13 mm array size. The light patterning system may optionally include a tube lens, such as a Zeiss Milvus 135 mm, to provide (e.g., 2.7×) demagnification onto the sample.

In the depicted embodiment, each light source 313 is a 3×3 mm Luminus LED imaged onto 6×6 mm light pipe 321 maintaining source etendue. The 4 lens design (2 4-f imaging systems) from LED to light pipe increases light collection efficiency and minimizes angular content. The depicted light patterning system 301 includes at least three (e.g., four) light sources 313, 314, 315, 316 for emitting at least three beams at three distinct wavelengths. Preferably the light patterning system 301 has one or more dichroic mirrors 343 to join the three beams in space and pass the three beams through a homogenizer and/or the light pipe 321. The light pipe 321 homogenizes the source and ensures good overlap of four LED colors. Light from the light pipe 321 is passed along towards the DMD.

The microscope 101 includes an excitation light source 115 mounted within the microscope for emitting a beam 121 of light. The optical system 601 directs the beam 121 towards the stage at an angle from beneath. One potential issue is aberration that could affect a shape of the beam 121.

Figure 4:
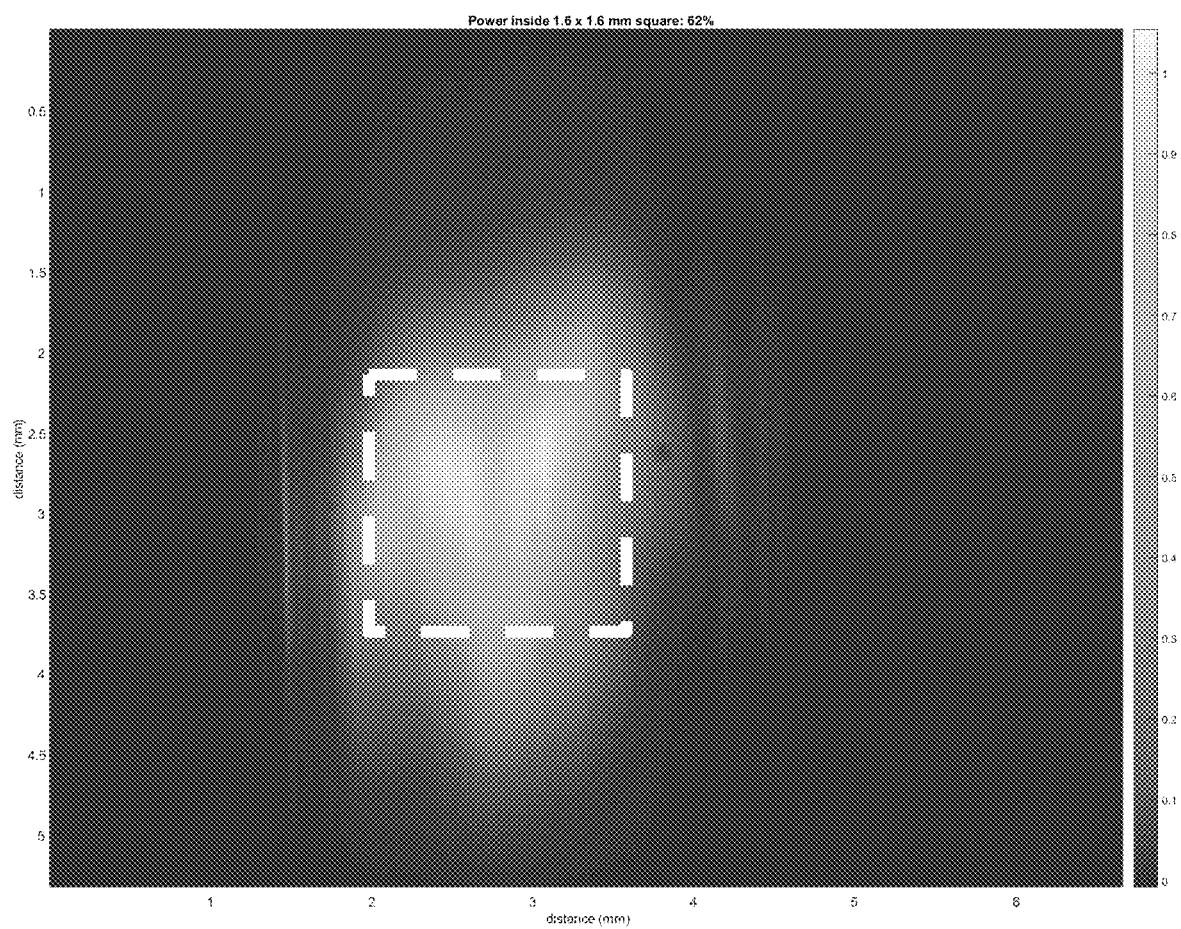
FIG. 4 shows power levels and shape of a light beam without homogenizer
FIG. 5 diagrams components of the optical system with homogenizer.

FIG. 4 shows power levels of a light beam from the excitation light source 115 with an aperture square drawn onto the image illustrating optical aperture used in the microscope 101. The amount of light is not uniform across the aperture square. A consequence would be non-uniform illumination of cells 113 in the sample 205. The microscope 101 avoids non-uniform illumination of the cells 113 by including, in the optical system 601, a homogenizer 125 for spatially homogenizing the beam 121.

Figure 5:
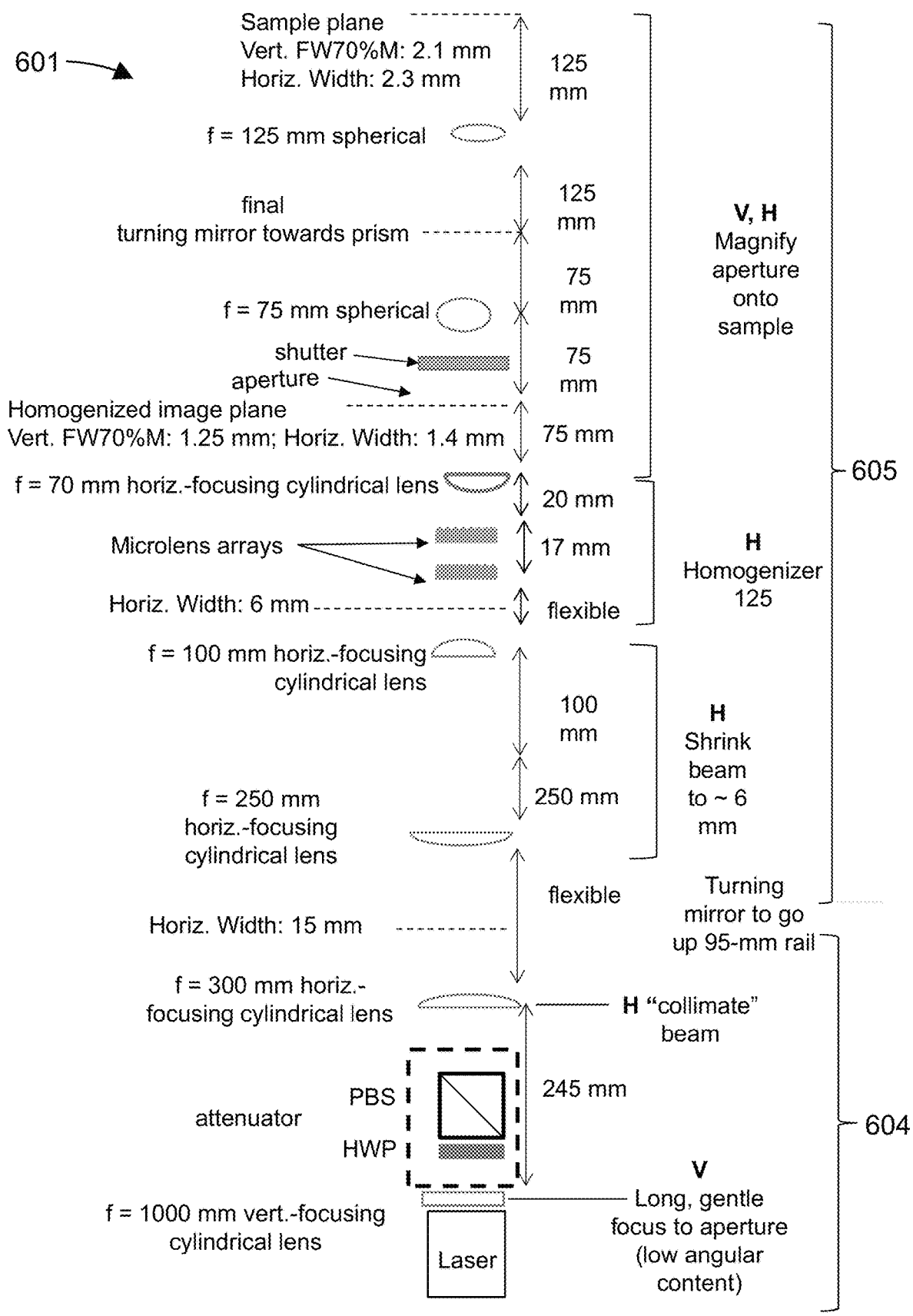

FIG. 5 diagrams components of the optical system 601. As shown, a first set 604 of components are substantially within a horizontal plane, e.g., fixed to a printed circuit board or other substrate in a base of the microscope 101. A second set 605 of components may have components oriented so that the beam of light travels up towards the sample.

Within the optical system 601, the beam 121 passes through a homogenizer 125. Preferably, the homogenizer 125 forms the beam 121 into a substantially uniform and rectangular region of illumination. Different methods of laser beam homogenization may be used to create a uniform beam profile. Homogenization may use a lens array optic or a light pipe rod.

A lens array is composed of separate lens elements stacked side by side to form an array then placed in the laser beam path. Homogenization is created by dividing the initial wave front into separate beams with each lens element and then focusing those new beams onto the target area with a focusing lens. The separate beams are superimposed on the illumination plane focused with the focusing lens. Preferably the shape of the illumination area is the same as that of the lens element aperture. To avoid a blurred edge, a second lens array can be used. One lens array is conjugated to another so that the focal points of one array coincide with the pupil surface of the next one, and the focal points of the second array coincide with the pupil surface of the first one. This setup improves edge sharpness but the arrays need to be very accurately aligned with one another for it to work properly. The homogenizer 125 can include one or any number of microlens arrays. Passing light through a micro-lens arrays can give a power profile of the light a "top hat" shape. The beam homogenizer smooths out irregularities in a laser beam profile and creates a more uniform profile. Suitable beam homogenizers may use a multifaceted mirror with square facets. The mirror reflects light at different angles to create a beam with uniform power across the whole beam profile (a "top hat" profile). The homogenizer may include a diffractive beam homogenizer or an MLA (Micro Lens Array). See Voelkel 2008, Laser beam homogenizing: limitations and constraints, Proc SPIE 7102, Optical Fabrication, Testing, and Metrology III, 71020J, incorporated by reference.

A second method for homogenization is the use of a rod lens. In this layout, multiple reflections from the initial beam are mixed inside of the rod (or light pipe). The length of the light pipe (homogenizing rod) should exceed several-fold the laser beam cross section size, which dictates the longitudinal system size. The input beam may be focused into a light pipe with a focusing lens is an option for reducing the cross-section size and longitudinal size. A light pipe which provides TIR reflection reduces reflection losses while a TIR angle limits the input beam's numerical aperture (NA).

After passing through the homogenizer 125, the light passes through an aperture 555. Any suitable hardware mechanism may be used in the microscope 101 to create the aperture 555.

Figure 6:
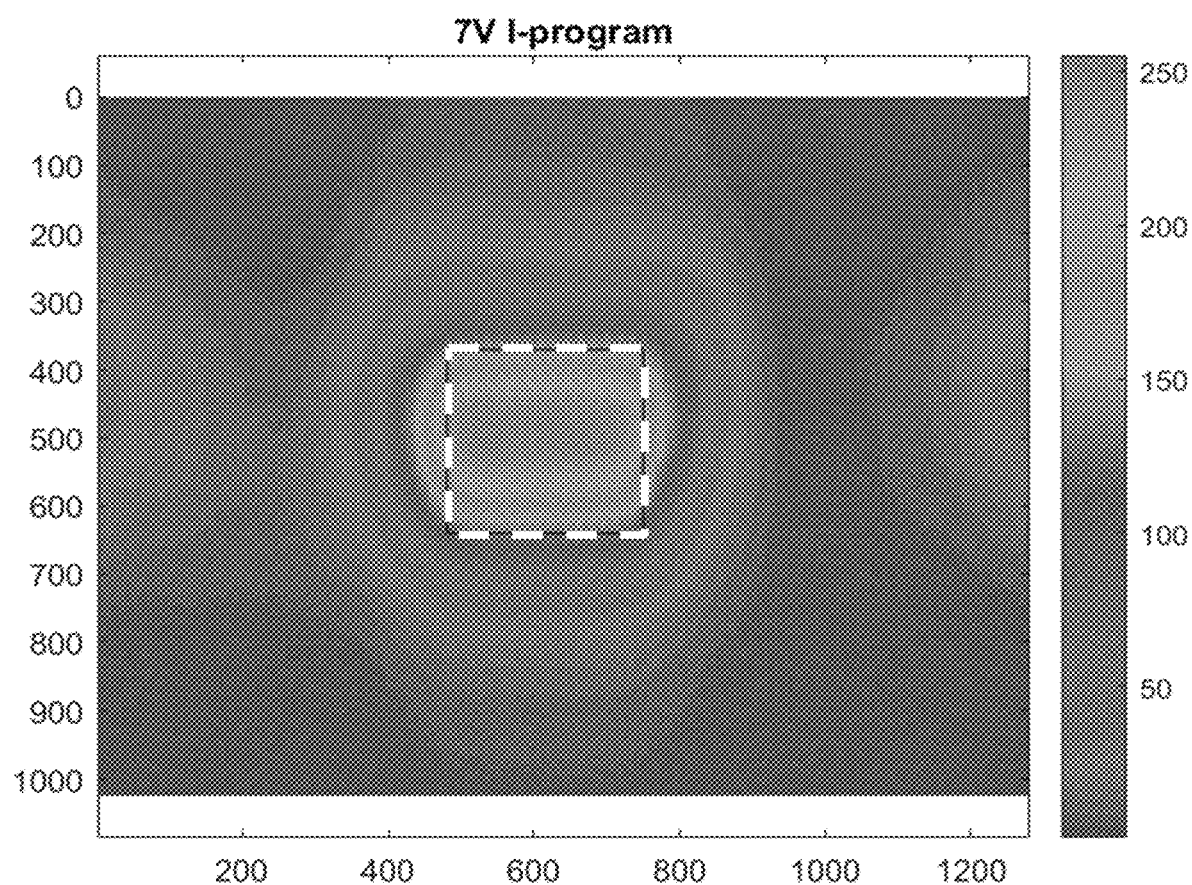
FIG. 6 shows a result of spatially homogenizing the beam.

FIG. 6 shows a result of spatially homogenizing the beam 121. The homogenization can be provided by any suitable optical hardware for a homogenizer 125, such as a pair of microlens arrays or a as a light pipe, e.g., mounted within hardware of a light patterning system.

Figure 7A:
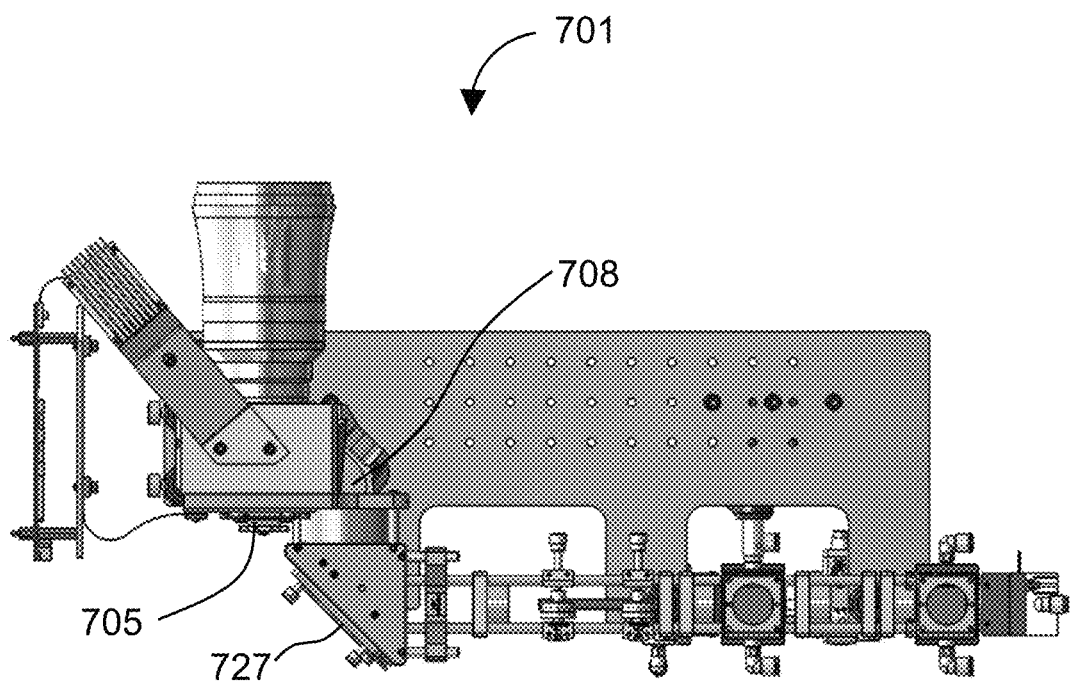
FIG. 7A shows a side view of hardware for the light patterning system.

FIG. 7A shows a side view of hardware 701 for the light patterning system.

Figure 7B:
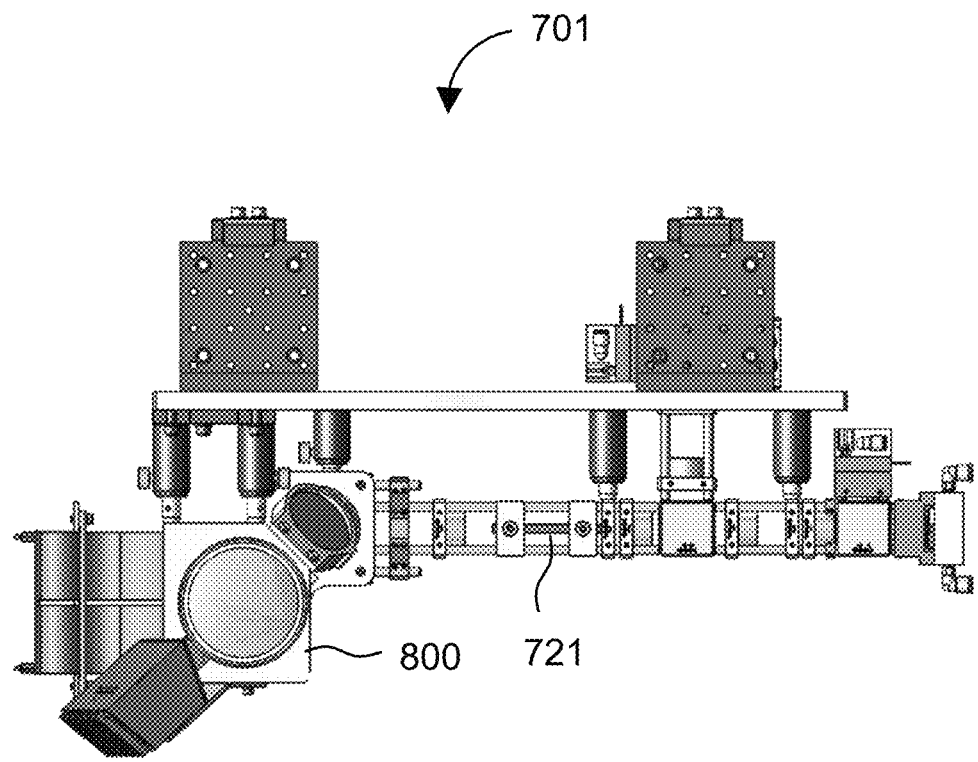
FIG. 7B shows a top view of the hardware.

FIG. 7B shows a top view of the hardware 701. As shown, the hardware 701 includes prism assembly 708, mirror 727, and light pipe 721. The light patterning system may include one or any number of lens element(s) 341, such as 30 mm achromatic doublets, to guide light onto any dichroic mirror (s) or to collimate the beam. There may be multiple light sources and mirrors to guide light to the sample.

The light patterning system 301 may include one or any number of mirrors to guide the beam from the light source mounted to within the hardware 701 to prism assembly 708 and on the sample. The prism assembly 708 includes one or more prisms to guide the light onto the DMD 705. The prism assembly 708 may be housed within a housing 800.

Figure 8:
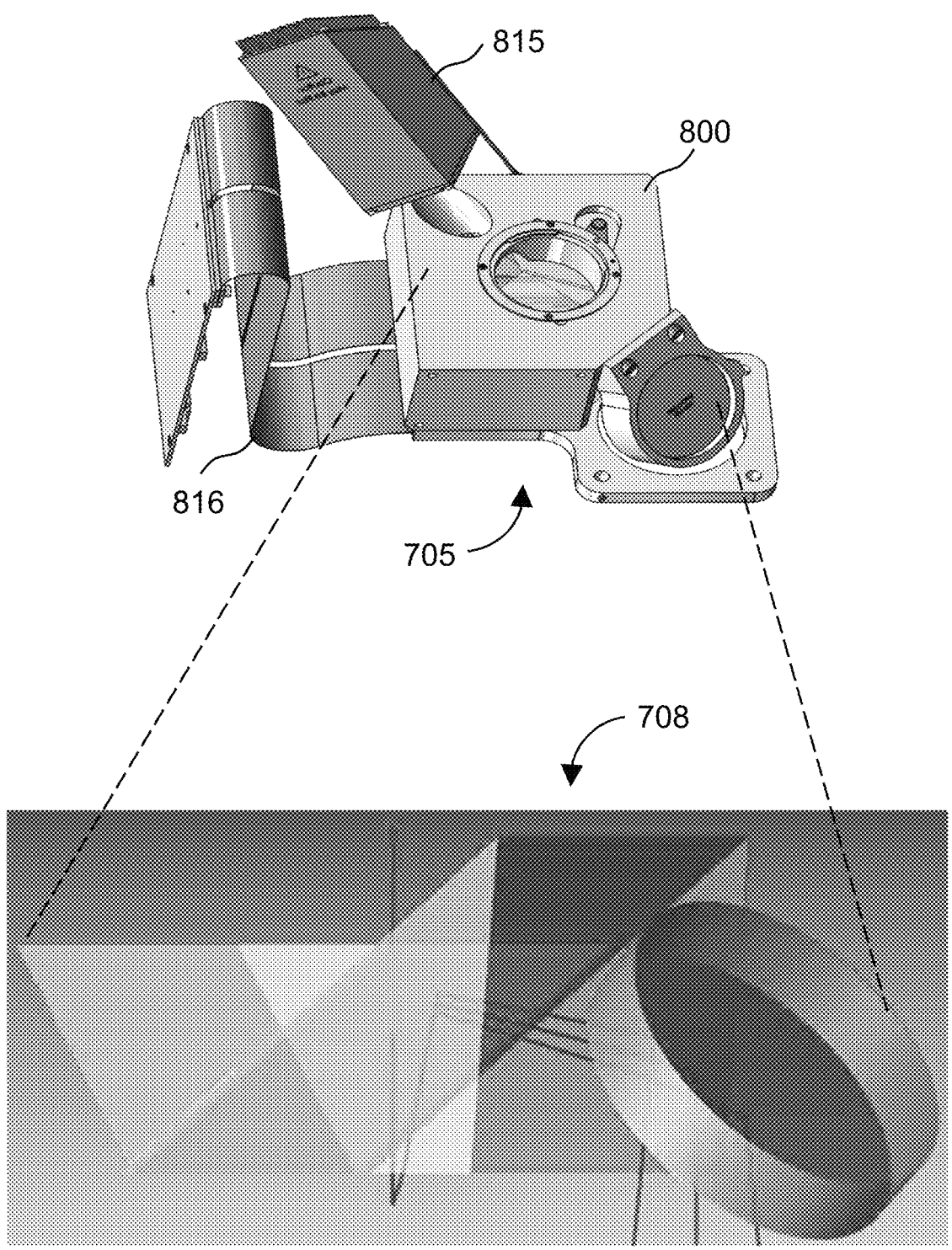
FIG. 8 shows the housing of a prism system.

FIG. 8 shows the housing 800 adjacent a wire-frame drawing of the prism assembly 708 to show, in this embodiment, how a mirror and a prism are housed in the housing. A DMD 705 is connected to the housing 800 adjacent the prisms. The prism assembly 708 bounces light off of a DMD 705. The DMD is connected to a cable 816, here shown as a ribbon cable connected to a board 817 having a processor for controlling DMD operations. The housing 800 also has a light dump 815 to receive and extinguish light that was bounced off the DMD and directed by the DMD away from the sample.

Figure 9:
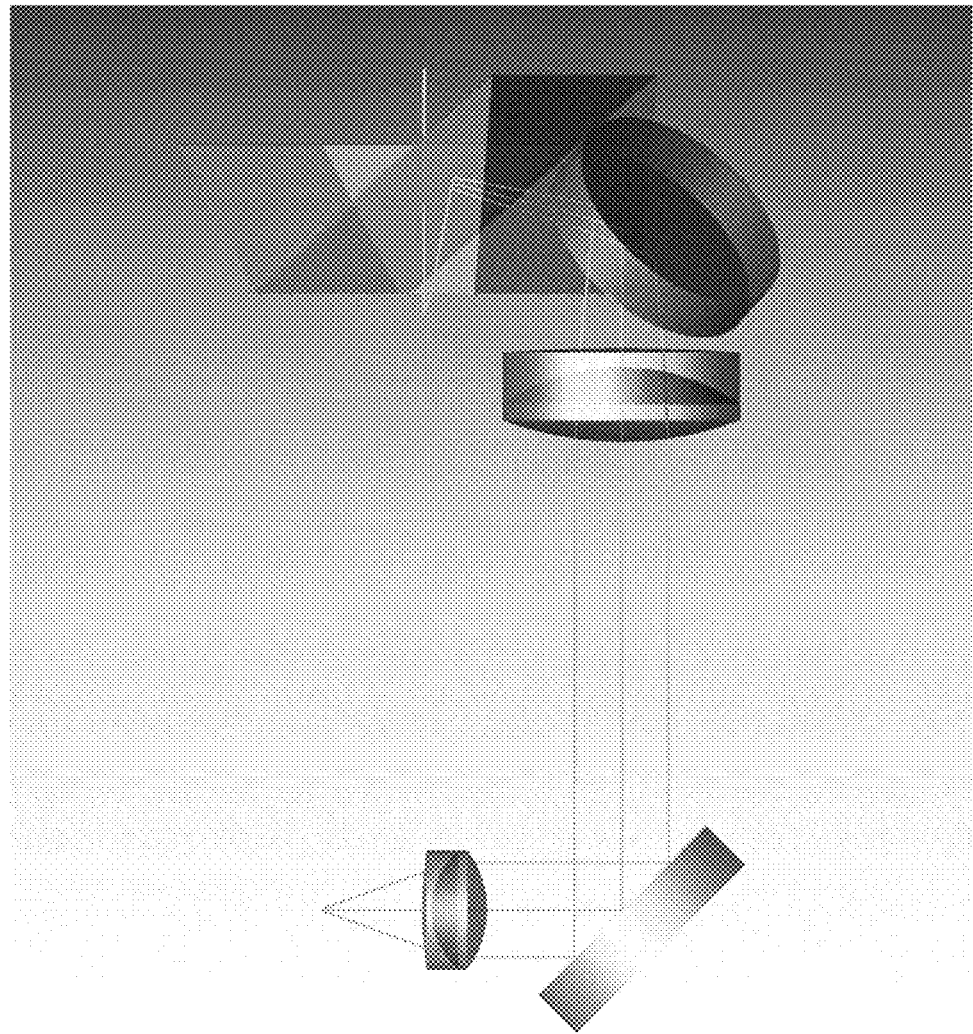
FIG. 9 illustrates geometry of a light path.

FIG. 9 illustrates geometry of a light path from a light source (not shown) in a bottom of the microscope 101 up to the prism assembly 800.

Within the optical system 601, the beam 121 passes through a homogenizer 125. Preferably, the homogenizer 125 forms the beam 121 into a substantially uniform and rectangular region of illumination. After passing through the homogenizer 125, the light passes through an aperture 555. Any suitable hardware mechanism may be used in the microscope 101 to create the aperture 555. It may be preferable for the microscope 101 to include a screen or block with a plurality of apertures therethrough.

Figure 10:
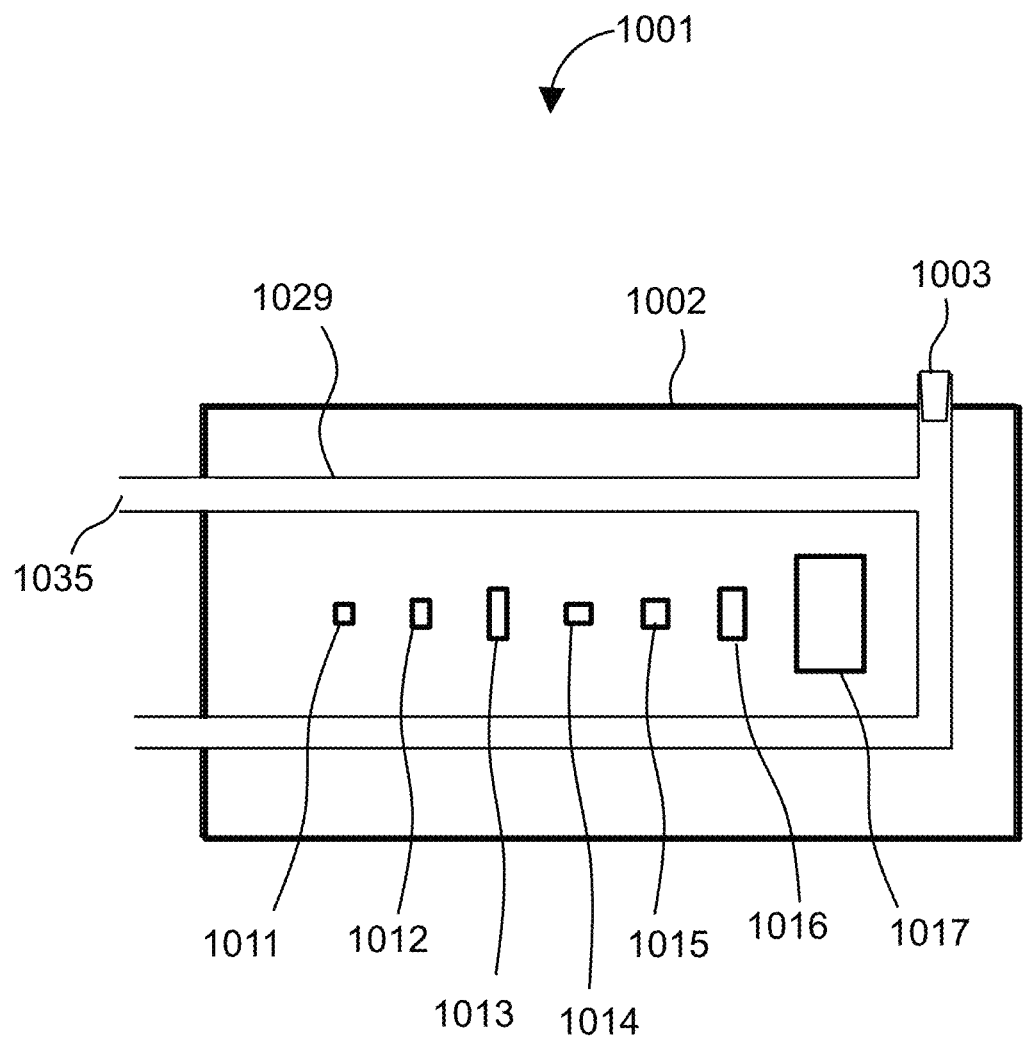
FIG. 10 shows an aperture piece.

FIG. 10 shows an aperture piece 1001 according to certain embodiments. As shown, the piece includes an aluminum block 1002 with seven apertures therethrough. The piece may be repositionable to one of seven corresponding pre-defined stops on the frame of the microscope 101. When so positioned, the light beam 121 pass through a selected aperture of the piece 1001. In such embodiments, the optical system 601 an opaque screen with a plurality of apertures, wherein the screen can be positioned so that the beam passes through one of the apertures. The apertures may be pre-defined for specific imaging workflows. For example, each aperture may define a beam profile suited to imaging a well of a multi-well plate of certain well count (e.g., 96 or 384).

The aperture piece 1001 may include multiple (e.g., seven) apertures for different imaging configurations. Here, as shown, the microscope 101 includes 7 pre-selected apertures for imaging each combination of three plate types and two lens types plus a "wide-open" option. From left to right as shown, the piece 1001 includes a first aperture 1011, second aperture 1012, third apertures 1013, fourth aperture 1014, fifth aperture 1015, sixth aperture 1016, and seventh aperture 1017. The first aperture 1011 is for imaging a 384-well plate at 1 kHz with 135 mm tube lens and is 0.90×0.89 mm. The second aperture 1012 is for imaging a 384-well plate at 1 kHz with an 85 mm tube lens and is 0.90×1.35 mm. The third aperture 1013 is for imaging a 384-well plate at 500 Hz with an 85 mm tube lens and is 0.90×2.57 mm. The fourth aperture 1014 is for imaging a 96-well plate at 1 kHz with a 135 mm tube lens and is 1.27×0.89 mm. The fifth aperture 1015 is for imaging a 96-well plate at 1 kHz with an 85 mm tube lens and is 1.27×1.35 mm. The sixth aperture 1016 is for imaging a 96-well plate at 500 Hz with an 85 mm tube lens and is 1.27×2.57 mm. The seventh aperture 1017 is for fully open imaging and is 4.6 mm×7.2 mm. The block 1002 may include a water channel 1029 with a cool water connection 1035. A plug 1003 may be used to facilitate milling the channel 1029 into the monolithic block 1002.

Here the homogenizer 125 uses two microlens arrays, the microscope 101 can be designed so that the microlens arrays are repositionable to create a defined spacing corresponding to one of the apertures through piece 1001. In some embodiments, the homogenizer 125 comprises two microlens arrays and the optical system 601 comprises a plurality of micro-lens array position stops at predetermined spacings whereby a distance between the two microlens arrays can be fixed to thereby shape the beam to match each of the apertures.

The microscope 101 may include multiple optical systems. For example, a light patterning system 301 may include a stimulation light source 313 (that emits a beam 302) and a digital micromirror device (DMD) 305. The beam 302 reflects off the DMD to illuminate a bottom of a well of the plate with a pattern defined by the DMD. The beam 302 may be at an excitation wavelength of a fluorophore. The microscope may include a secondary optical system with a secondary light source 253 that emits a stimulation beam at a second wavelength.

The light patterning system 301 includes a prism immediately beneath the stage, whereby the beam enters a side of the prism and the prism directs the beam into an aqueous sample in a well of the plate at an angle of refraction that restricts light to about the bottom ten microns of the well.

The microscope 101 may also include a stimulation light source 153 that emits a stimulation beam. Optionally, the stimulation beam reflects off the DMD to illuminate a bottom of a well of the plate with a pattern defined by the DMD.

The microscope 101 may optionally include a secondary light source 153. The secondary light source 153 may have its own optical system that share some similarities with the optical system 601. However, including the optical system 601 and the secondary light source 153 with its own optical system allows those systems to be operated independently, simultaneously, or not. In some embodiments, the secondary light system is operated a different (e.g., much higher) power than the optical system 601. The secondary light source 153 and its system may be used for calibration or to address optogenetic proteins that operate best at a different power than sets of optogenetic proteins addressed by the optical system 601.

In certain aspects, a microscope of the invention includes an autofocus system. The microscope may include a laser-based autofocus system. Alternatively or additionally, the microscope may include an image-based autofocus system. In certain aspects, a microscope of the invention includes and uses both a laser-based and image-based autofocus system.

Figure 11:
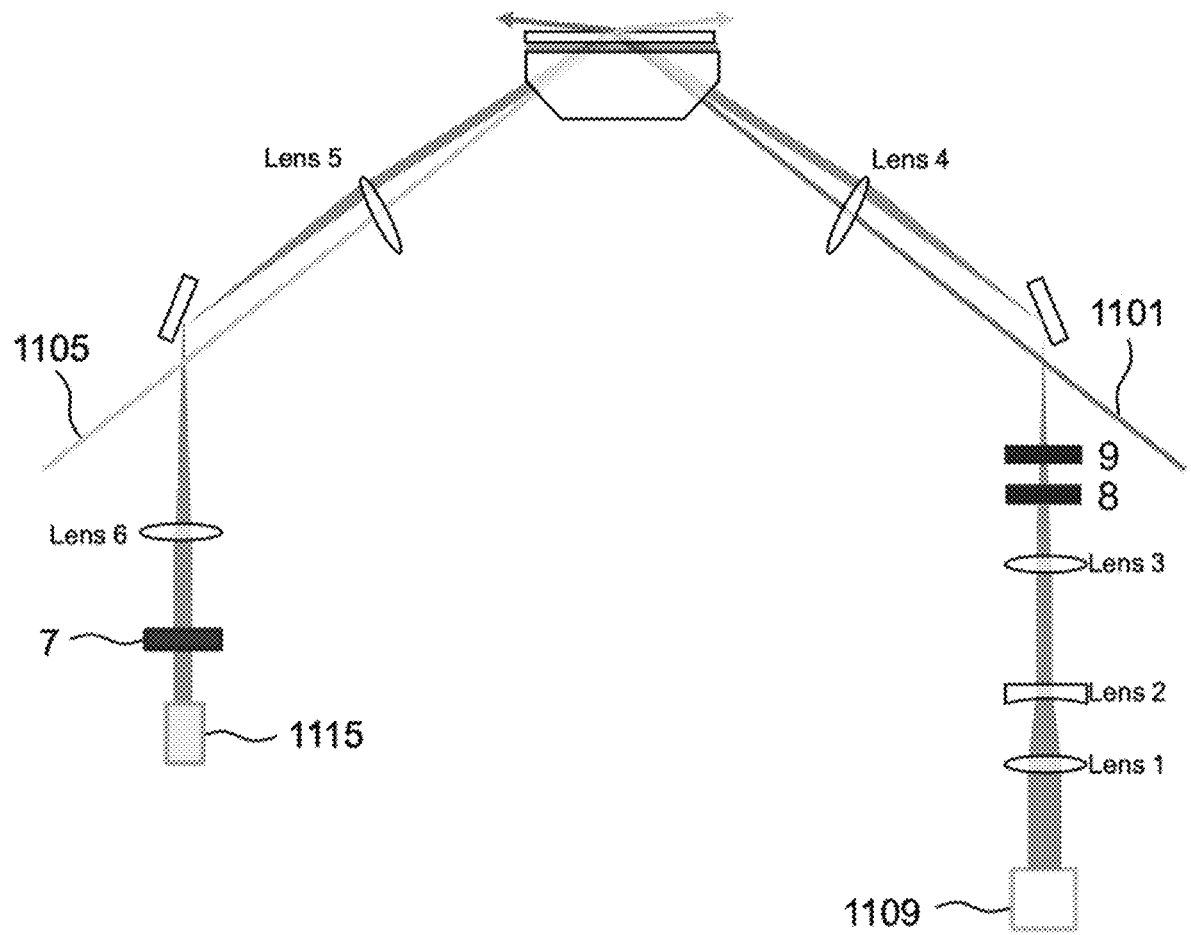
FIG. 11 shows a focusing system.

FIG. 11 shows an exemplary laser-based autofocus system that may be included. Red laser light 1101 is provided by the optical system 601. Yellow laser light 1105 is provided by a secondary light source 153 (sometimes called the "left path" light source based on how it is drawn on the page). The microscope 101 further includes a laser diode 1109 (e.g., green) and a position sensing detector 1115. The depicted components (lenses 1, 2, 3, 4, 5, 6, filters 7 and 9 and shutter 8) provide a 4-f imaging system for imaging the sample onto the position sensor so curvature of the well plate foil, which would change the angle of the beam, will not change position on the sensor. Preferably, the lenses 3 and 4 are separated by f3+f4 so a collimated beam enters sample. Lenses 1 and 2 shrink the beam diameter to avoid clipping on prism entrance aperture, with the lenses separated by f1+f2.

Filter 9 may provide the capability to regulate the power of the green laser light from laser diode 1109 for a given sample type to maximize the accuracy of the sensor towards a theoretical submicron limit. Shutter 8 may flash the laser to enable millisecond read times.

Figure 12:
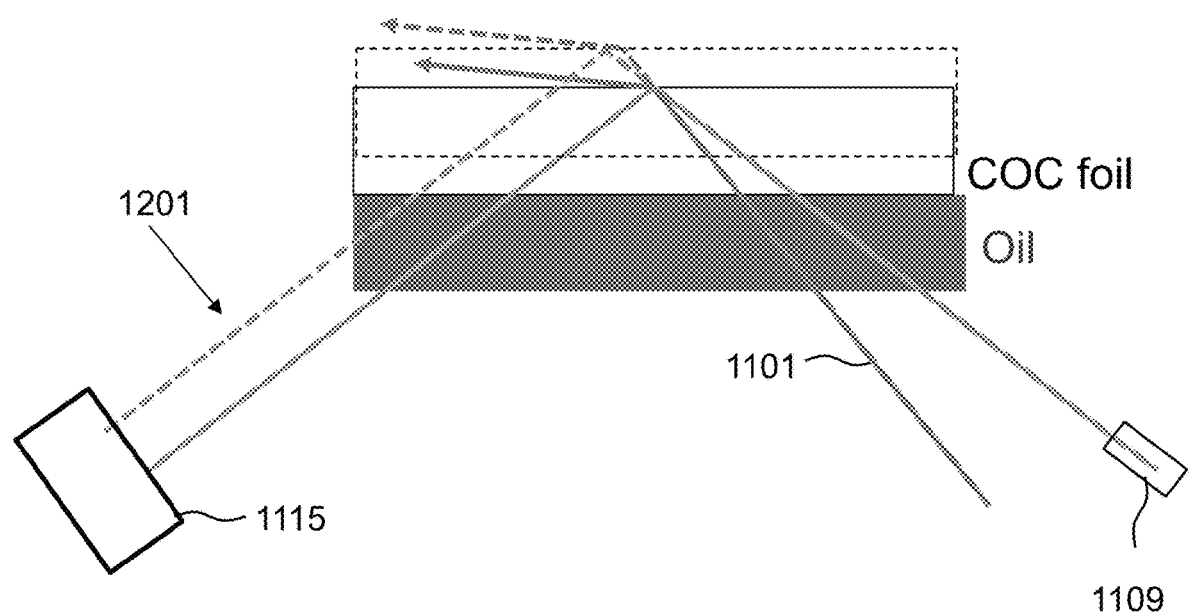
FIG. 12 illustrates how the focusing system works.

FIG. 12 illustrates an illustration of how an exemplary autofocus system works. The sample height changes from field-of-view (FOV) to FOV based on imperfections in plate manufacturing, bowing of the cyclic olefin copolymer (COC) foil, etc. (e.g., imperfections in the multi-well plate). Green laser comes in at a shallower angle, and so does full TIR. Red laser light 1101 exhibits near-TIR. Dashed line 1201 illustrates that the laser position changes when the TIR surface moves. The position sensing detector 1115 reports to the computing system 171 the position of the sample in the current well of the multi-well plate. The microscope 101 may include a z-motor (not pictured) to lift or lower the stage (relative to the optical systems) to focus the optics all under control function issuing instructions to operate the z-motor.

Figure 51:
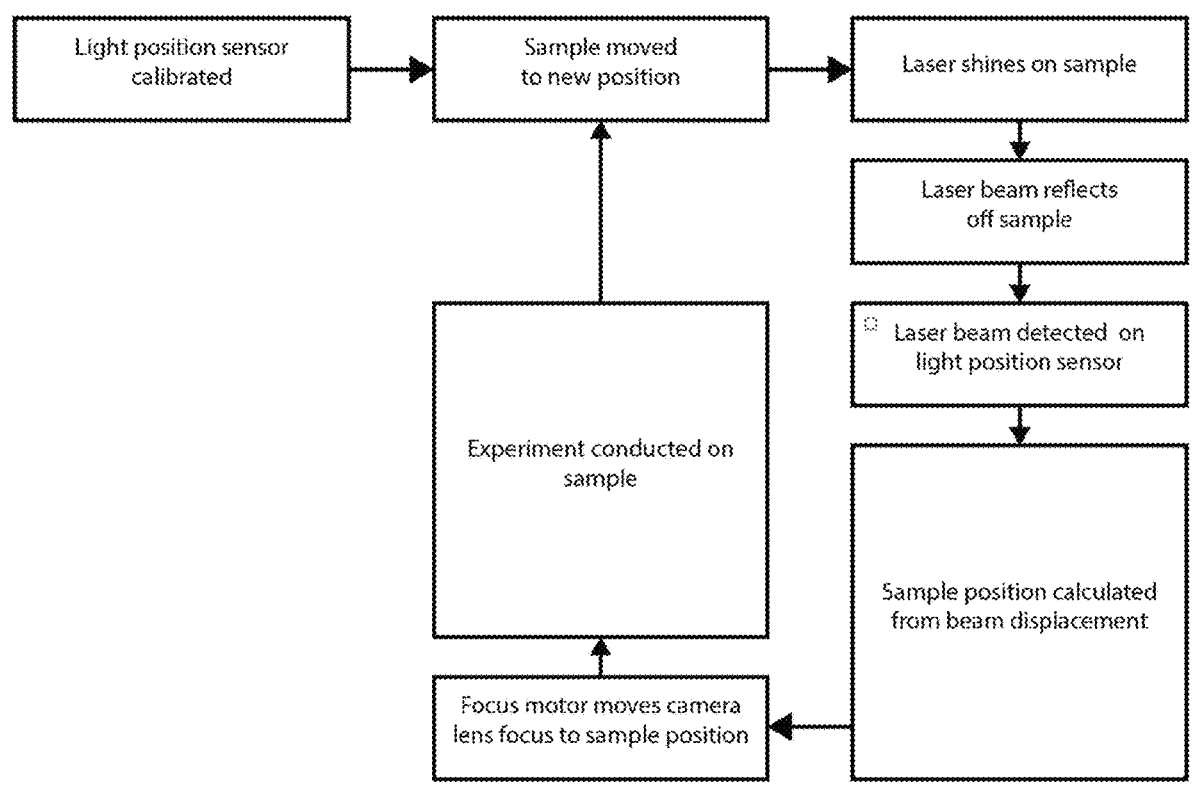
FIG. 51 shows an exemplary workflow using a laser-based autofocus system.

FIG. 51 provides a flow diagram of an exemplary method using the laser-based autofocus system of the invention. As shown, in certain aspects, the light position sensor 1115 may be calibrated before obtaining reads. Then, a sample is moved into position and the system shines a laser beam on the sample. The beam totally internal reflects off the sample and is detected on the light position sensor 1115. The sample position is calculated based on the displacement of the laser beam. A focus motor moves the camera lens focus to a sample position, at which time an experiment is conducted on the sample. When the experiment is completed, the sample may be moved and/or replaced by another sample, and the cycle may repeat as needed. As shown in FIG. 51, the steps of the system may happen fast enough to quickly measure the position of every field of view as the microscope screens samples, allowing for superior focus across all fields of view.

An exemplary laser-based autofocus system may harness full total internal fluorescence on the COC-imaging buffer interface and a micrometer accurate position sensor to directly measure the position of an FOV.

In certain aspects, the system uses an image-based autofocus system. An exemplary method using an image-based autofocus system includes obtaining groups of images from different fields of view. In certain aspects, the image-based autofocus system is able to indirectly measure the position of an FOV.

Figure 52:
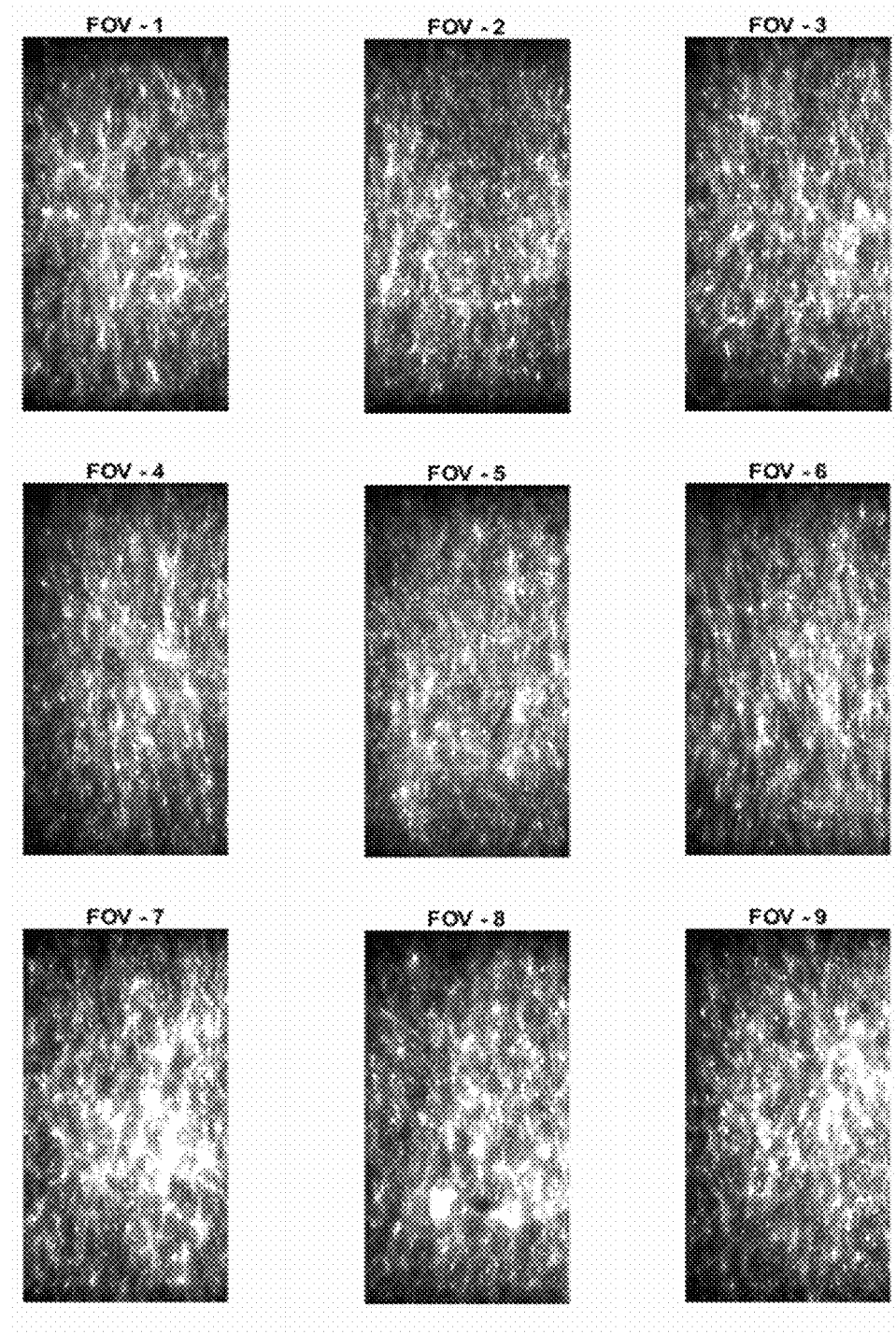
FIG. 52 shows nine fields of view (FOV).

FIG. 52 shows an example of 9 images of a sample plate obtained from 9 different fields of view. The system records the coordinates (X,Y) of the n wells across the microwell plate, which have good spacing (n=9 in FIG. 52). Then, the system measures an image quality metric in the n wells with a series of Z steps (axial locations).

Figure 53:
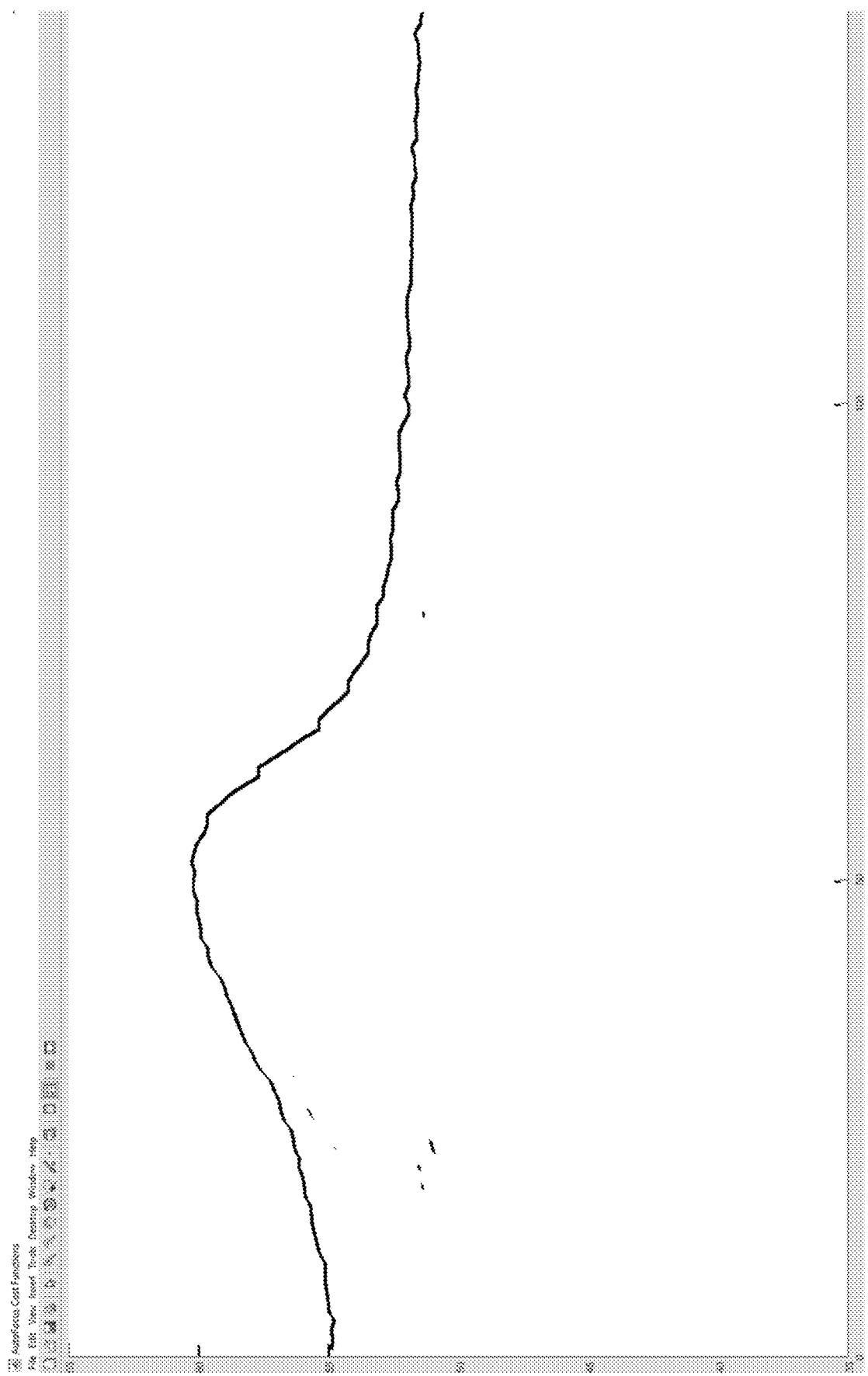
FIG. 53 shows a plot of image quality metric for a well taken across a series of Z (axial) steps.

FIG. 53 provides a plot of an image quality metric measured during the series of Z steps. The system uses the Z step (value) that provided the highest image quality metric for each well.

Figure 54:
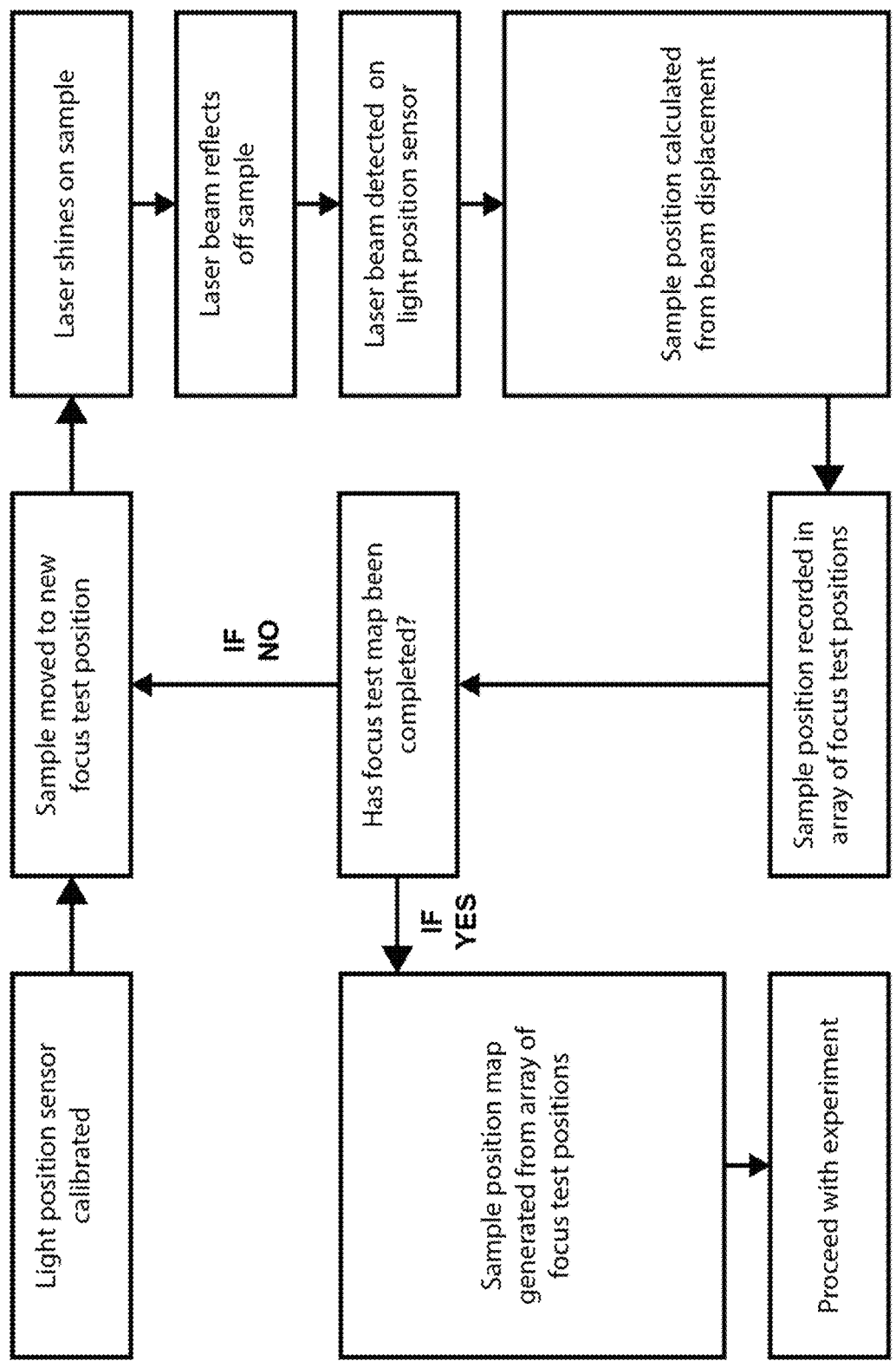
FIG. 54 shows an exemplary workflow using an autofocus system.

FIG. 54 provides a workflow of an exemplary method using an N-point autofocus system that employs a laser-based or image-based autofocus system. The N-point autofocus system takes the measured position of the sample microplate at an arbitrary subset of FOVs and generates a curved model from these wells representing the curvature of the bottom of the microplate. This allows electrophysiological measurements to be made in a rapid fashion by interpolating the position of FOVs between the arbitrary subset of FOVs without requiring the microscope to measure focus on every well individually, which would take more time and limit throughput.

Figure 55:
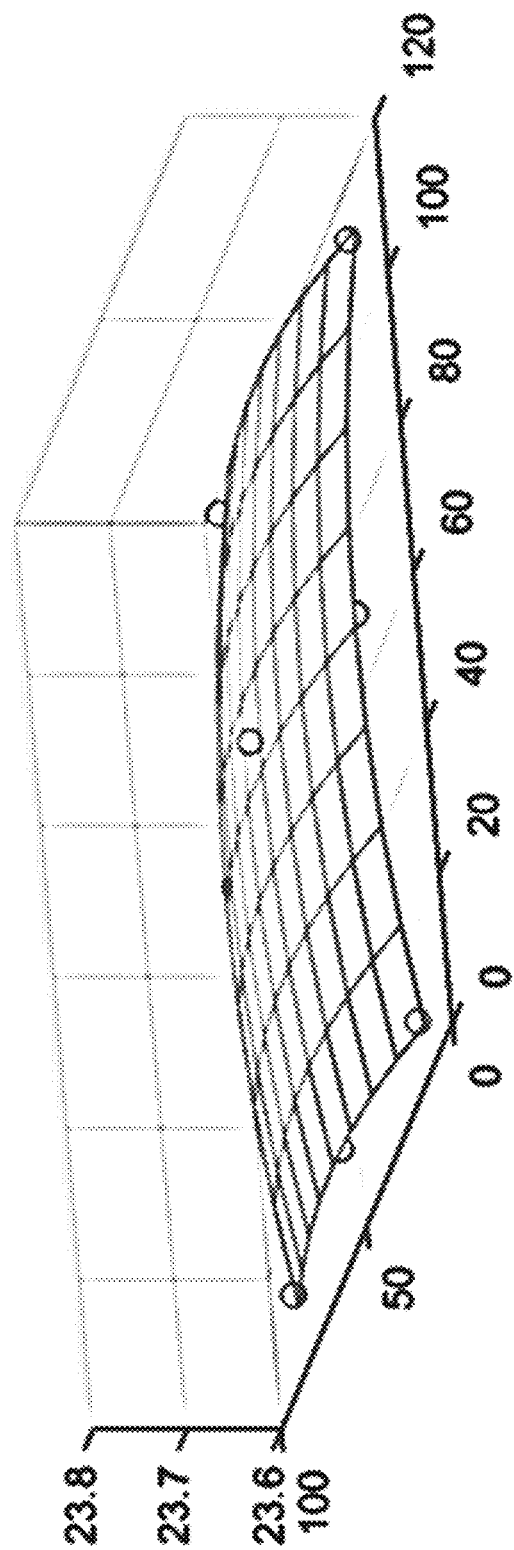
FIG. 55 shows an exemplary plate focus map obtained using an autofocus system.

FIG. 55 provides an exemplary plate focus map generated by the N-point autofocus system.

The computer system 171 performs control functions. In some embodiments, the microscope 101 uses the left path and the secondary light source 153 to image a sample in a multi-well plate in which a certain target of interest present in a sample is fluorescently labeled. For example, for a neural activity assay, each well of a plate may be contain a network of living neurons. The microscope may image each well and the computer may be used to identify all individual neurons in each well, find all synaptic connections among those neurons, and create a record of the locations of any pre-synaptic neurons in each well. Where all those neurons are provided with an optogenetic actuator such as CheRiff (an algal channelrhodopsin that functions as a light-gated ion channel), the computer 171 can create a spatial mask (a digital file with a binary coding for pixels in an image of the well that are occupied, or not, by certain neurons) identifying locations of pre-synaptic neurons in each well. The computer can store this information for each and every well in a multi-well plate. The xy motor can then translate the plate over the imaging lens and use the DMD to spatially pattern light onto the wells according to the spatial masks to selectively illuminate exclusively pre-synaptic neurons with light a wavelength that causes the light-gated ion channels to depolarize, causing the (and only the) pre-synaptic neurons to fire an action potential. In response to that optical stimulus from the DMD, any post-synaptic neurons will "fire", or exhibit an action potential, where there is successful neurotransmission with chemical transmission that crosses the threshold. Where the neurons include optical reporters of electrical activity such as one of the modified versions of Archaerhodopsin 3 known as Arch 3 D95N, QuasAr 1, QuasAr 2, or QuasAr 3, those postsynaptic neurons will emit light as their membrane potential changes as an action potential propagates. The microscope 101 can use the image sensor 135 to record a movie of the light, and the movie can be analyzed to detect successful neurotransmission and even to detect specific features (in the recorded light in the movie) tending to show specific biological neural phenotypes such as disease-associated problems with neural activity.

Thus, the microscope 101 may be used in a variety of assays on living cells and, in particular, for electrical activity of cells. The microscope can assay activity of various electrically active cells types include neurons and cardiomyocytes. The microscope 101 can use the multi-well plate compatible stage, the computer 171, and the DMD 305 to save and use spatial masks to spatially pattern illumination onto select cells in well-after-well of the plate without re-defining the spatial mask between wells (the spatial masks are stored in memory). Thus, the microscope provides for methods of imaging samples.

Figure 13:
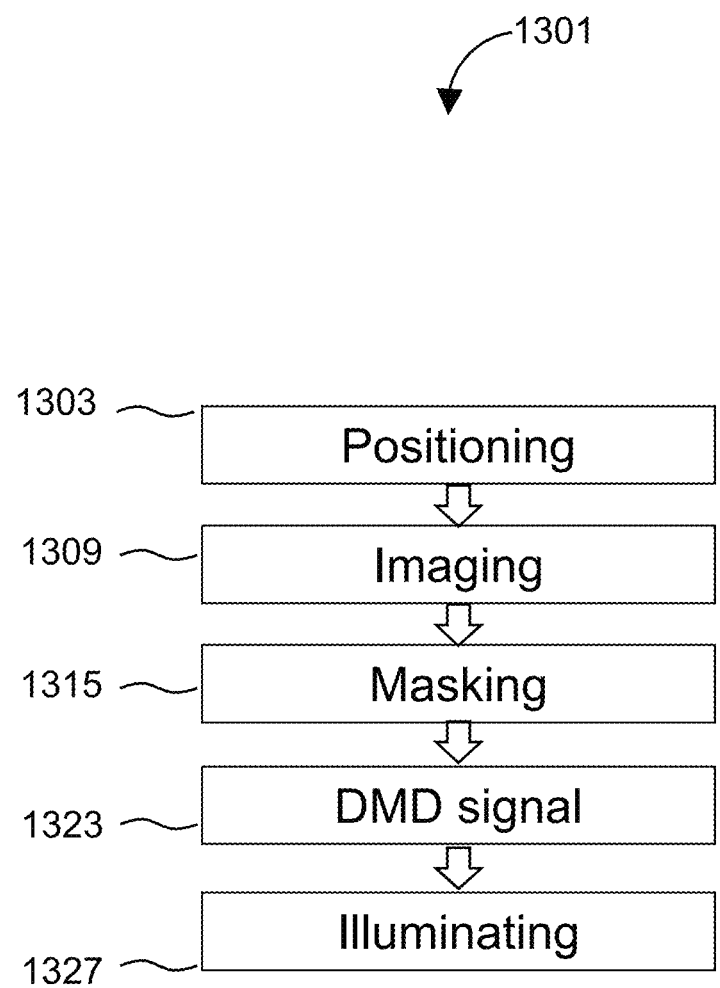
FIG. 13 diagrams a method of imaging a sample.

FIG. 13 diagrams a method 1301 of imaging a sample. The method 1301 includes positioning 1303 a multi-well plate on a microscope stage, the plate having at least one cell living on a bottom surface of a well. Imaging 1309 is performed to obtain an image of the cell. The image is processed to "mask" 1315 the surface on the bottom of the well, i.e., to create a spatial mask identifying areas of the bottom surface occupied by the cell and areas not occupied by the cell. Using the mask, the computer signals 1323 the DMD to selectively activate micromirrors of the DMD that subtend the cell using the spatial mask. Then, using the light source 121, the microscope illuminates 1327 the sample by shining light onto the DMD to thereby specifically reflect light onto the areas of the bottom surface occupied by the cell while not reflecting any of the light onto the areas not occupied by the cell. The method 1301 may include creating a spatial mask for cells in each of a plurality of wells of the multi-well plate; holding the spatial masks in memory; and using the spatial masks and DMD to selectively illuminate the cells in the plurality of wells in a serial manner. Optionally, the DMD is controlled by a computer comprising a process coupled to a non-transitory memory system, the memory system having the spatial masks stored therein.

Devices and methods of the invention may be used to exploit fluorescent indicators that are sensitive to specific physical properties of their environment such as calcium ion concentration or membrane potential. The time-varying signal produced by these indicators can be repeatedly measured to chart the course of chemical or electronic states of a living cell. One example of an environmentally sensitive fluorescent indicator is the archaerhodopsin-based protein QuasAr2, which is excited by red light and produces a signal that varies in intensity as a function of cellular membrane potential. QuasAr2 can be introduced into cells using genetic engineering techniques such as transfection or electroporation, facilitating optical measurements of membrane potential.

The invention provides in a large FOV optical microscope 100 that may be used to simultaneously image dozens, hundreds, or even thousands of cells. Since so many cells may be simultaneously imaged, optical characterization of cellular membrane potential can increase throughput by many orders of magnitude.

To realize the full potential of all-optical characterization, a microscope 100 may be used for simultaneously achieving a large FOV to allow measurement of interactions between cells in a network or to measure many cells concurrently for high throughput; high spatial resolution to detect the morphologies of individual cells and facilitate selectivity in signal processing; high temporal resolution to distinguish individual action potentials; and a high signal-to-noise ratio to facilitate accurate data analysis. The FOV is preferably sufficiently large to capture dozens or hundreds of cells, with a resolution on the order of 1 or 2 microns. To record the rapid changes that occur in electrically active cells such as neurons, microscope 101 can provide a very fast image acquisition rate on the order of 1 kilohertz, which corresponds to a very short exposure time on the order of 1 millisecond. (Most fluorescent images are acquired over a substantially longer time period.) The confluence of the above requirements places extreme demands on instruments for optically characterizing the dynamic properties of cells. The stage comprises a motorized xy translational stage and the computer directs the stage to serially position each of the plurality of wells over an imaging lens of the microscope and activate micromirrors of the DMD according to a spatial mask created uniquely for cells in that well and stored in the memory system. In preferred embodiments, the cells include neurons and selectively illuminating the cells in the plurality of wells initiates electrical activity in the illuminated cells. Optionally the computer records a movie for each well using an imaging sensor positioned beneath the imaging lens and stores the resulting plurality of movies in the memory system. Preferably the microscope includes a light source and optical system that guides an excitation beam of light each well from beneath at angle that restricts the light to about the bottom ten microns of the well. The wells may contain neurons that express optical reporters of electrical activity, wherein the neurons fluoresce when they fire an action potential. The microscope may record movies that depict fluorescent activity showing the neurons firing. Thus, the cell expresses a fluorescent protein and a computer system optionally analyzes a signal from the fluorescent protein to automatically create the spatial mask. In certain embodiments, the computer system can automatically create a spatial mask for labeled cells in each of a plurality of wells and hold the spatial masks in memory while the microscope serially illuminates each well using the DMD and the respective spatial mask to create spatially patterned illumination specific to a cell in that well.

In addition to fluorescent indicators, light-sensitive compounds have been developed to chemically or electrically perturb cells. Using light-controlled activators, stimulus can be applied to entire samples, selected regions, or individual cells by varying the illumination pattern. One example of a light-controlled activator is the channelrhodopsin protein CheRiff, which produces a current of increasing magnitude roughly in proportion to the intensity of blue light falling on it. In one study, CheRiff generated a current of about 1 nA in whole cells expressing the protein when illuminated by about 22 mW/cm$^2$ of blue light.

Optically modulated activators can be combined with fluorescent indicators to enable all-optical characterization of specific cell traits such as excitability. For example, the Optopatch method combines an electrical activator protein such as CheRiff with a fluorescent indicator such as QuasAr2. The activator and indicator proteins respond to different wavelengths of light, allowing membrane potential to be measured at the same time cells are excited over a range of photocurrent magnitudes. Optopatch includes the contents of U.S. Pat. Nos. 10,613,079 and 9,594,075, the contents of which are incorporated by reference for all purposes.

Measuring the electrical properties of cells is of primary importance to the study, diagnosis, and cure of diseases that involve electrically active cells, such as heart and brain cells (neurons and cardiomyocytes, respectively). Conditions that affect these cells include heart disease, atrial fibrillation, amyotrophic lateral sclerosis, primary lateral sclerosis, and many others. All-optical measurements provide an attractive alternative to conventional methods like patch clamping because they do not require precise micromechanical manipulations or direct contact with cells in the sample. Optical methods are much more amenable to high-throughput applications. The dramatic increases in throughput afforded by all-optical measurements have the potential to revolutionize study, diagnosis, and treatment of these conditions.

In various aspects, the present invention is generally directed to characterizing the physical properties of cells using fluorescent indicators and light-sensitive activators. Examples of applications of the system include studying the effect of a potential drug compound on cardiomyocytes. For example, the microscope could be used to optically obtain an action potential (AP) and calcium transient (CT) waveform from a stem-cell derived cardiomyocyte to characterize an arrhythmia in the cardiomyocyte. A cardiomyocyte in the sample could be caused to express a rhodopsin-type transmembrane optical reporter. The microscope can activate a microbial channelrhodopsin using the activation subsystem. An AP propagates through the cardiomyocyte. A cell containing a reporter protein is illuminated via the illumination subsystem, and the AP causes a change in the fluorescence of the reporter. Light from the reporter is detected by the imaging subsystem and analyzed to construct the AP waveform. An arrhythmia in the constructed AP waveform can be detected or characterized, e.g., by comparison to a known standard or other analytical techniques.

The near-TIRF microscope can thus be used to study a compound's effect on cardiomyocytes. Because the object region can support a cell in a medium, a sample cardiomyocyte can be observed with the microscope while exposed to a compound of interest, such as a prospective drug. Any resulting perturbation to the detected AP waveform, or arrhythmia, associated with exposure to the compound can thus be observed by the microscope. Since the optical reporter can include a voltage reporter, an ion reporter (e.g., for [Ca2+]), others, or combinations thereof, the microscope can detect the effect of the compound across multiple ion channels of the cardiomyocyte as revealed through all features of the AP waveform.

Using the microscope 101, cells 113 or any other suitable sample can be imaged. For example, cells 113 may be neurons, cardiomyocytes, or other electrically active cells expressing optogenetic reporters.

Figure 14A:
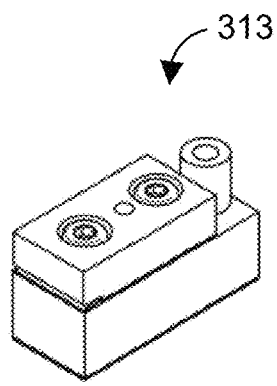
FIG. 14A is a perspective view of a light source.

FIG. 14A is a perspective view of a light source 313 useful in certain embodiments of the disclosure.

Figure 14B:
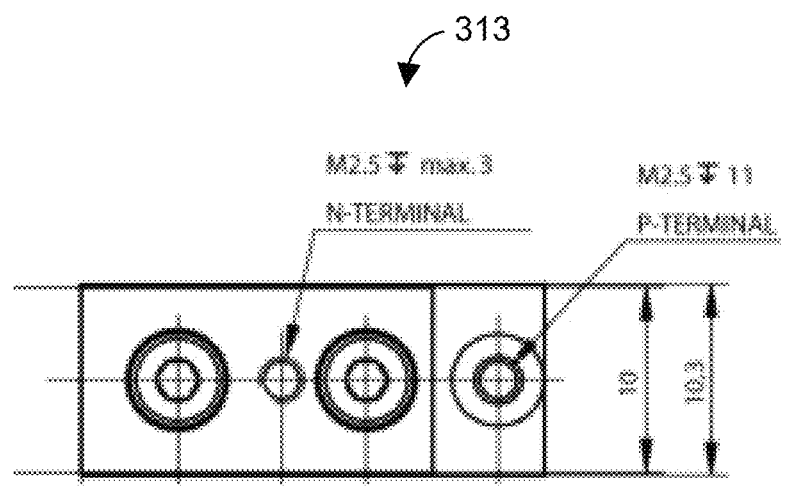
FIG. 14B is a top view of the light source.

FIG. 14B is a top view of the light source 313.

Figure 14C:
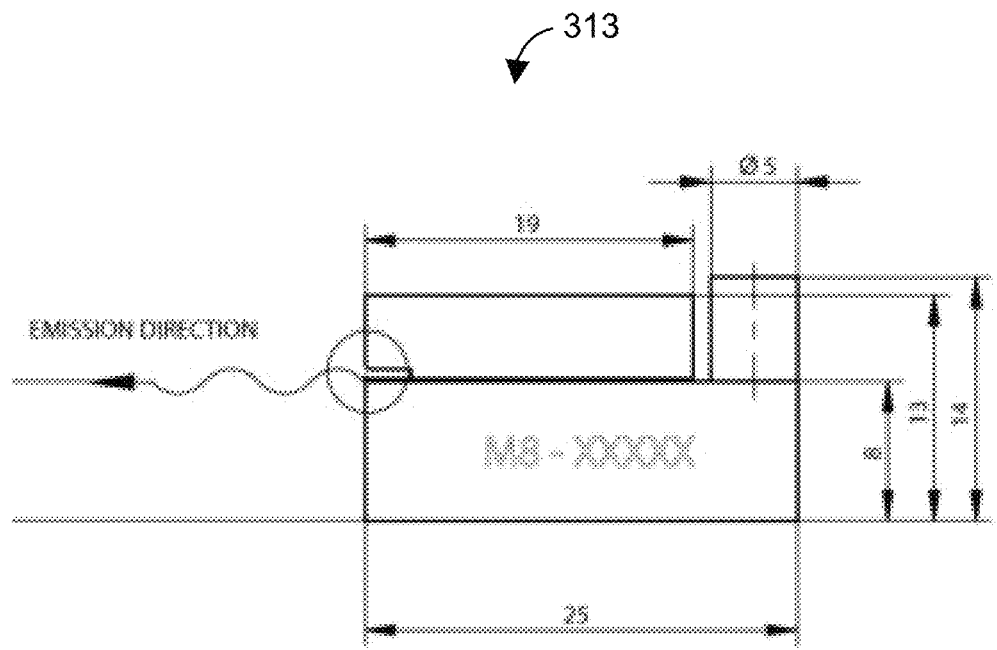
FIG. 14C is a side view of the light source.

FIG. 14C is a side view of the light source suitable for use with the invention. Light sources may include diode lasers, diode bar lasers, other types of lasers, LEDs, or other light sources with suitable characteristics.

Figure 15:
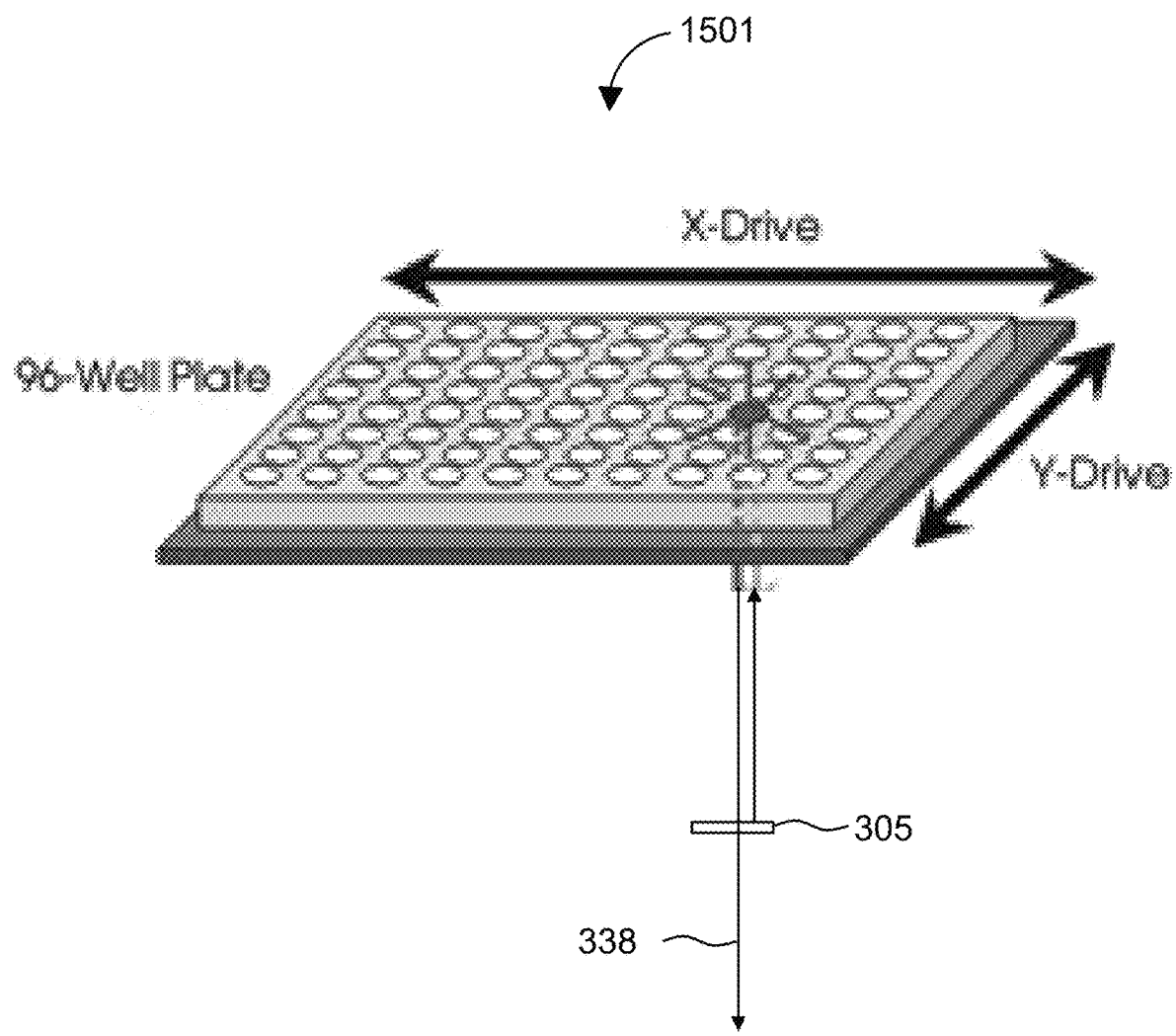
FIG. 15 shows a glass bottom microplate receiving spatially pattern light.

FIG. 15 shows a glass bottom microplate 1501 (e.g., a multi-well plate) receiving spatially pattern light from a mask implemented on DMD 305 onto cells 113 in one well of the plate. The cells emit emitted light 338 towards an imaging sensor. Any suitable well plate may be used. As shown, the plate 1501 is a glass bottom microplate with 96 wells such as the 96 well plate sold under the trademark SENSOPLATE by MilliporeSigma (St. Louis, MO). Preferably the plate 1501 has dimensions that include 127.76 mm length and 85.48 mm width. The microplate 1501 may include borosilicate glass (175 μm thick).

As shown, a sample that is imaged emits emitted light 338 that passes towards an imaging sensor 335 (e.g., through a tube lens, not pictured). Because of the dichroic mirror, the sample can be illuminated with spatially pattern light, also illuminated from the side by near-TIR light that pass through only about the bottom 10 microns of the sample well (both from beam 302), and also emit emitted light 338 that is captured by the sensor 335 to record a movie.

The inverted fluorescence micro-imaging system records optically from numerous (e.g., 50 to 5,000) expressing cells or cell clusters in a single field of view. For example, the system may be used to characterize optically evoked firing patterns and AP waveforms in electrically active cells expressing an Optopatch construct. Each field of view is exposed to whole-field or spatially localized pulses of blue light to evoke activity (e.g., 0.5 s, repeated every 6 s, nine intensities increasing from 0 to 10 mW/cm$^2$ to elicit neuronal firing). The number of steps and power variable depend on the particular study and the expression level of the activator. Reporter fluorescence such as from QuasAr2 may be simultaneously monitored with whole-field excitation at 640 nm, 100 W/cm$^2$. Additional useful discussion of microscopes and imaging systems may be found in U.S. Pat. No. 10,288,863, incorporated by reference.

Methods of the invention may include exciting the cells that are to be observed or activating a cell to initiate an action potential. Activation may be direct or indirect (e.g., optical activation of an optical activator or activating an upstream cell in gap junction- or synaptic communication with the cell(s) to be observed). Activation may be optical, electrical, chemical, or by any other suitable method. Activation may involve any pattern of activation including, for example, regular, periodic pulses, single pulses, irregular patterns, or any suitable pattern. Methods may include varying optical activation patterns in space or time to highlight particular aspects of cellular function. For example, a pulse pattern may have an increasing frequency. In certain embodiments, imaging includes activating an electrically active cell that expresses an optical activator using pulses of light.

Figure 16:
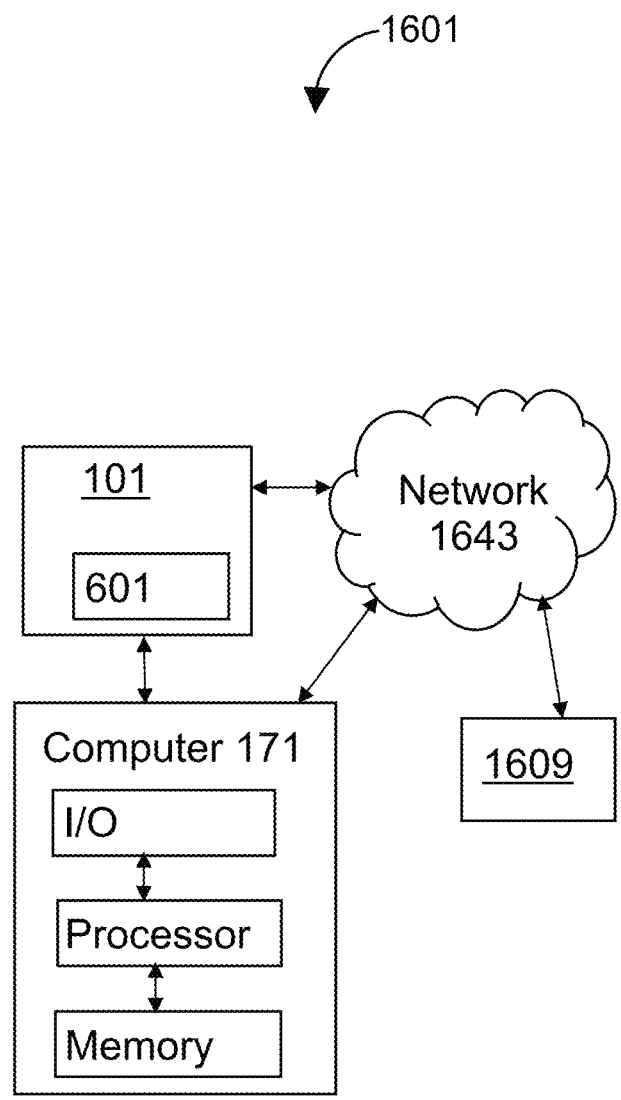
FIG. 16 diagrams a system for control and use of microscope.

FIG. 16 diagrams a system 1601 for control and use of microscope 101. Instrument 100 includes optical system 600 and is connected directly or via network 1643 to computer device 171. Optionally, system 1601 may include or access a server computer 1609. The system 1601 provides fluorescence microscopy for optogenetics. The system includes a microscope 101 and a computer 171. The microscope 101 preferably includes stage and an objective lens located in an imaging optical path that includes the object region. The microscope 101 may include one or more prisms for total internal reflection microscopy; one or more laser bars to provide light; and a digital light processer (DLP) comprising a digital micromirror device. Computer device 171 may include a touchscreen configured to display an image captured via the objective lens and to control a pattern of activation light based on user input obtained via the touchscreen. Using system 1601, a user may touch the touchscreen to activate an electrically active cell displayed on the touchscreen. The computer 171 and the DLP can alter a configuration of the digital micromirror device in response to the user touching the touchscreen. Additionally or alternatively, a microscope stage can respond to pan or zoom gestures made by the user using the touchscreen. For example, the user can touch the screen to adjust a position of the object region relative to the objective.

In certain aspects, the present disclosure provides a high-resolution, large field of view imaging system. The imaging system may include an objective lens, a tube lens, optical filters, mirrors, a focusing mechanism, and other optical elements to form an image in an image plane. The imaging system may also include an image detector that resides in the image plane of the imaging system for recording fluorescence images of the sample.

Incorporation by Reference

References and citations to other documents, such as patents, patent applications, patent publications, journals, books, papers, web contents, have been made throughout this disclosure. All such documents are hereby incorporated herein by reference in their entirety for all purposes.

Equivalents

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

EXAMPLES

Example 1: Overview

The disclosure provides an optogenetic microscope compatible with 384-well plates, streamline automation, and implement a new, more sensitive voltage trace extraction algorithm to enable a 4-fold increase in efficiency of measurements. The microscope may automate several processes in cell production to reduce labor and reagent usage and to improve repeatability. Together, those improvements make the microscope a robust and practical tool to screen for modulators of excitability and synaptic transmission in human iPSC-derived neuronal disease models. The microscope may be used to perform a screen in a human cellular disease model of loss-of-function (LOF) mutations in KCNQ2 and provide data showing strong pharmacological modulation.

Embodiments of the disclosure provide a custom, ultra-widefield fluorescence microscope, (sometimes dubbed "Firefly"), for all-optical measurements of cellular electrophysiology. The microscope leverages the Optopatch toolkit (optical stimulation plus optical voltage reporting, e.g., CheRiff & QuasAr), which allows simultaneous optical stimulation and recording of neuronal action potentials (APs) using engineered proteins. The channelrhodopsin CheRiff enables AP stimulation with blue light and the voltage-sensitive fluorescent protein QuasAr enables high-speed electrical recordings with red light. The Firefly microscope routinely makes simultaneous voltage recordings from >100 individual neurons over a large (0.5×4 mm) field of view (FOV) with 1 ms temporal resolution and high signal-to-noise ratio (SNR). A digital micromirror device (DMD) can project a fully reconfigurable optical pattern to sequentially stimulate individual cells while recording from many post-synaptic partners. Computer systems provide fully automated analyses that identify each individual neuron and calculate its voltage trace. In every voltage trace the spikes are detected and the key spike shape and timing parameters are computed. Because each cell fires many APs, a wealth of information can be extracted for distinguishing cell type, cell state, disease phenotype and pharmacological response. Additionally, electrode-free recordings minimally perturb the cells, enabling the recording of the same neurons before and after compound addition, which allows identification of compound effects on different neuronal sub-types and overcomes the biological "noise" of highly heterogeneous neuronal responses. In addition to cell autonomous excitability and firing patterns, it is possible to study synaptic transmission, long term potentiation/depression and network and circuit behavior.

Figure 17:
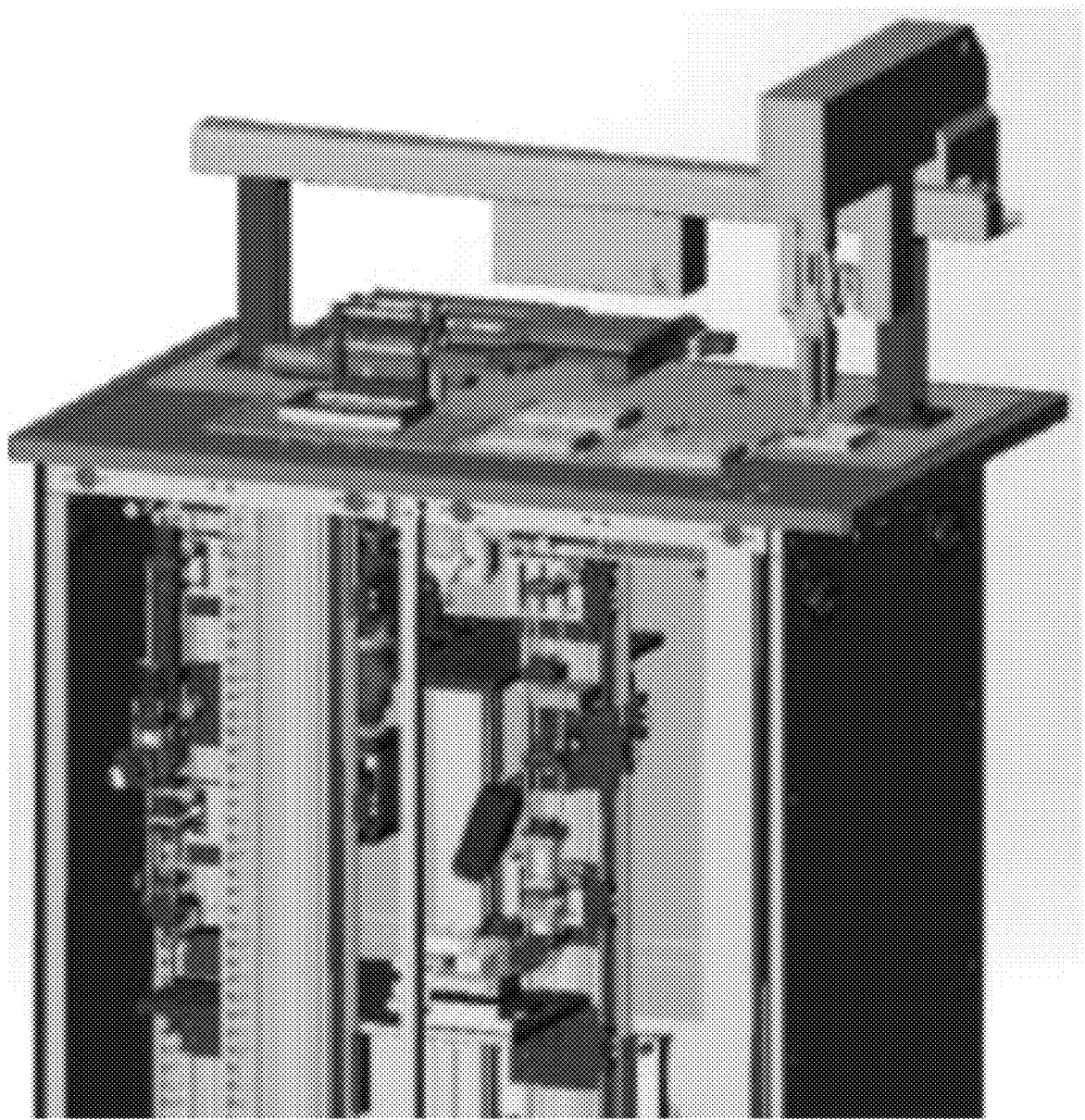
FIG. 17 is part of a computer-aided-design (CAD) drawing of the stage of a 96-well microscope.

FIG. 17 is part of a computer-aided-design (CAD) drawing of the stage of a 96-well microscope of the disclosure.

Figure 18:
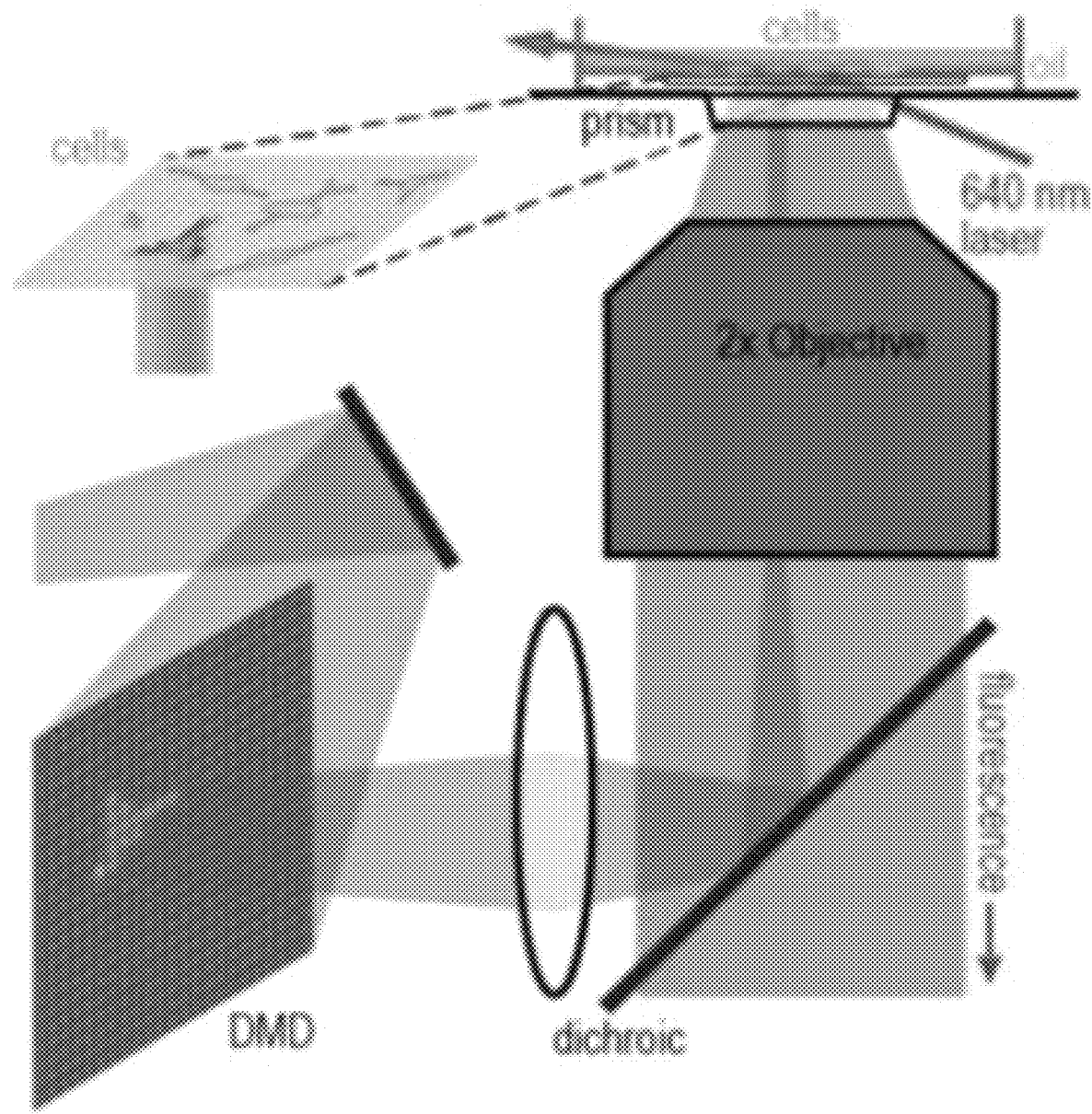
FIG. 18 shows light path for coupling red laser light into cell samples.

FIG. 18 shows light path for coupling red laser light into cell samples via a prism for low-background voltage imaging, and the blue light path for focal stimulation via a digital micromirror device.

For robust high-throughput operation, the Firefly system may include software tools e.g., automation and control software for applying blue-light stimuli, recording high-speed video data, moving between wells and operating the pipetting robot for automated compound addition. Tools may include analysis software to extract voltage vs. time traces from each neuron in each multi-GigaByte video. The reduced data (voltage traces, identified action potentials and extracted characteristics) as well as associated metadata such as cell type, compound, and compound concentration may be stored in a relational database.

Embodiments of the disclosure provide an instrument ready for phenotypic screening on neuronal excitability in rodent or human induced pluripotent stem cell (hiPSC)-derived neurons and an analysis workflow to use the rich, multi-dimensional assay readout. Methods provide pharmacology measurements and the high repeatability and stability necessary for screening. The microscope is useful for measurements in many cell types and detection of multiple disease phenotypes. In addition to neuronal excitability measurements, the microscope is useful for assays for synaptic transmission. The synaptic measurements are robust and ready for implementation in multi-well plates. They represent another powerful assay modality for the proposed 384-well instrument.

Example 2: Data Analysis Pipeline

Figure 19:
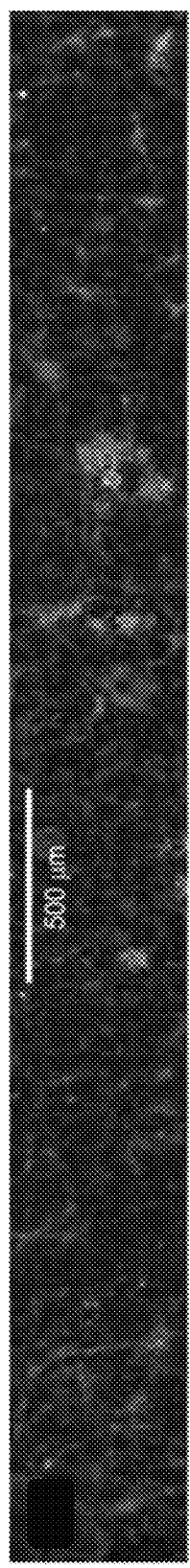
FIG. 19 shows hiPSCs.

FIG. 19 shows Firefly image with overlay (colored regions) of hiPSC. Firefly image with overlay (colored regions) of hiPSC-derived motor neurons are identified by automated analysis.

Figure 20:
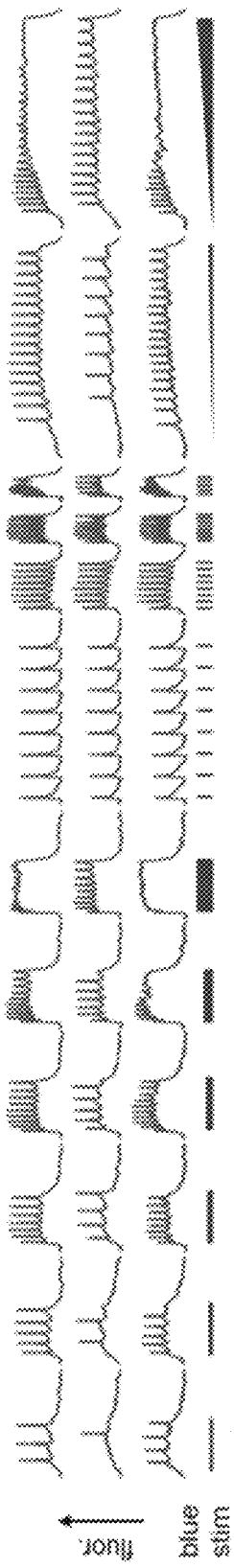
FIG. 20 shows example voltage recordings.

FIG. 20 shows example voltage recordings from derived motor neurons identified by automated analysis. Example voltage recordings from selected cells, and the blue stimulus used to evoke firing: steps, pulse trains, and ramps are shown. Time selected cells, and the blue stimulus used to evoke firing: steps, pulse trains, and ramps.

Figure 21:
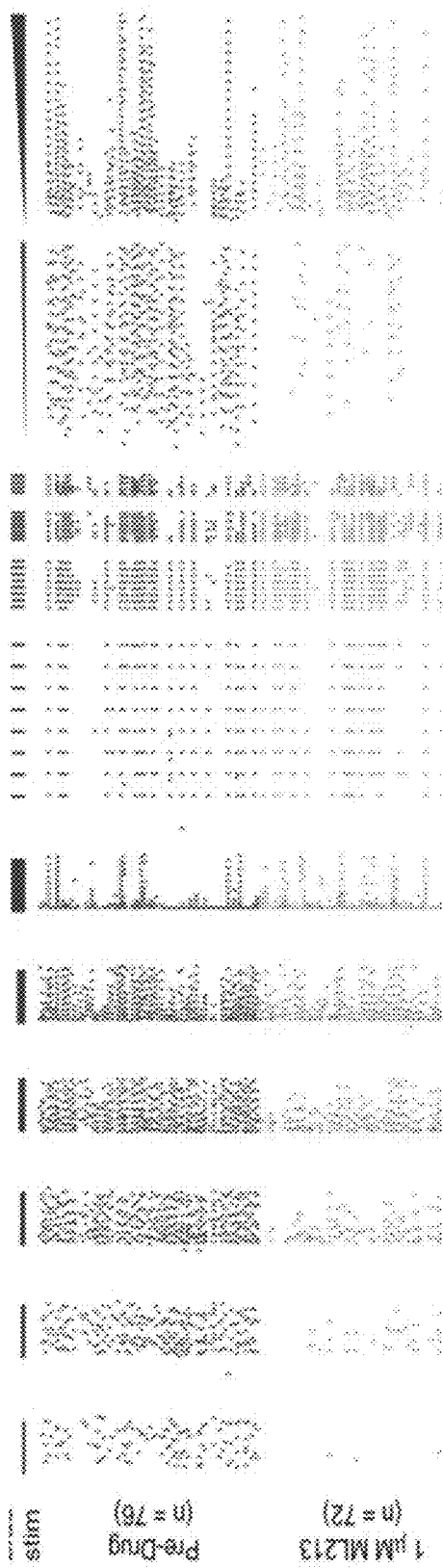
FIG. 21 is a raster plot.

FIG. 21 is a raster plot where each point is an identified action potential and each row is a neuron from a single FOV. Before (green) and after (orange) addition of ML213 at 1 µM, a potassium channel opener that lowers resting potential and suppresses firing.

Figure 22:
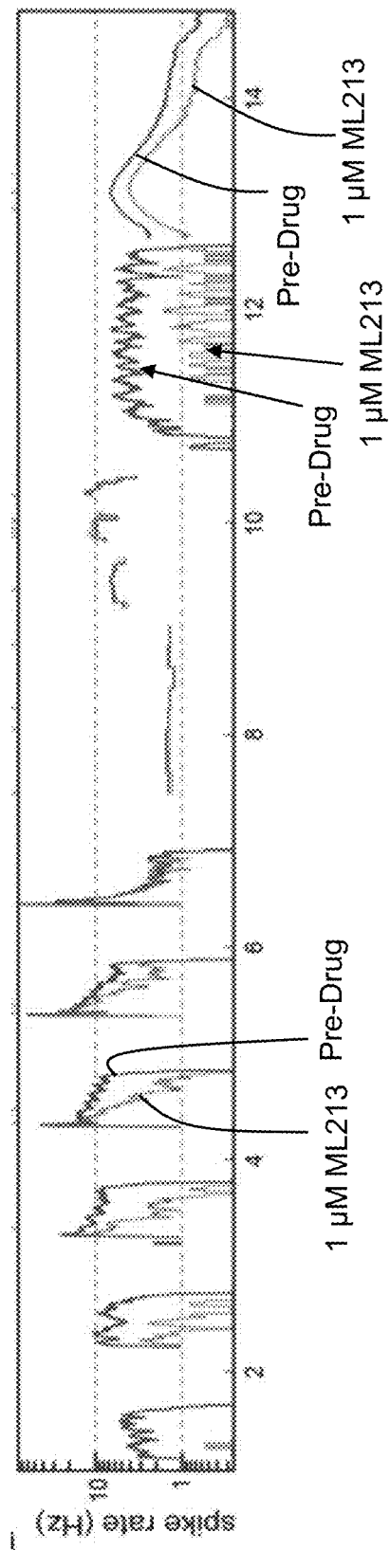
FIG. 22 shows the spike rate averaged over cells.

FIG. 22 shows the spike rate averaged over cells.

FIG. 23 shows spike shape properties.

FIG. 24 shows spike timing properties.

FIG. 25 shows adaptation averaged over cells.

The spike shape, spike timing properties, and adaptation may be automatically extracted for each cell. The excitability is automatically extracted for each cell.

FIG. 26 shows the excitability extracted from the staircase in FIG. 22 and shows a suppression in firing at all stimulus strengths.

Analysis overview: FIGS. 19-26 show the automated analysis workflow for measurements of intrinsic excitability and pharmacological response in hiPSC-derived motor neurons. Neurons are interrogated with a stimulus protocol (blue) designed to probe a broad range of spiking behaviors. All pixels capturing fluorescence from one neuron co-vary in time following that cell's unique firing pattern (FIG. 20). The temporal covariance is used to generate a weight mask for each cell (colored regions in FIG. 19); masked pixels are averaged for each frame in the movie to calculate the voltage traces. Each FOV was recorded twice, before and after addition of potassium channel opener ML213. Example traces in FIG. 20 demonstrate the underlying variability in neuronal behavior: Recordings from many neurons must be averaged to capture compound effects. From the fluorescence-time traces, each action potential in the dataset is identified (FIG. 21), and firing rate (FIG. 22), spike shape parameters (FIG. 23) and relative timings (FIG. 24 & FIG. 25) are measured as a function of stimulus.

FIG. 26 shows the clear reduction in neuronal excitability caused by ML213. All parameters are automatically extracted by the parallelized analysis in the cloud, stored in the database, and figures are automatically generated. The stimulus-dependent extracted values, greatly reduced in number and complexity from the raw video data, serve as the substrate for more detailed analysis for distinguishing cell type, cell state, disease phenotype and pharmacological response. Approximately 300 parameters may be extracted for each cell.

Example 3: Dimensionality

In compound screening, multidimensional data may be reduced to a few parameters that can be used to rank and select compounds to advance. In disease modeling, for example, one uses hiPSC-derived neurons from patients and healthy controls, and screens for compounds that induce the disease cells to behave like healthy cells. The dimensionality reduction is described in FIG. 27-FIG. 29.

Figure 27:
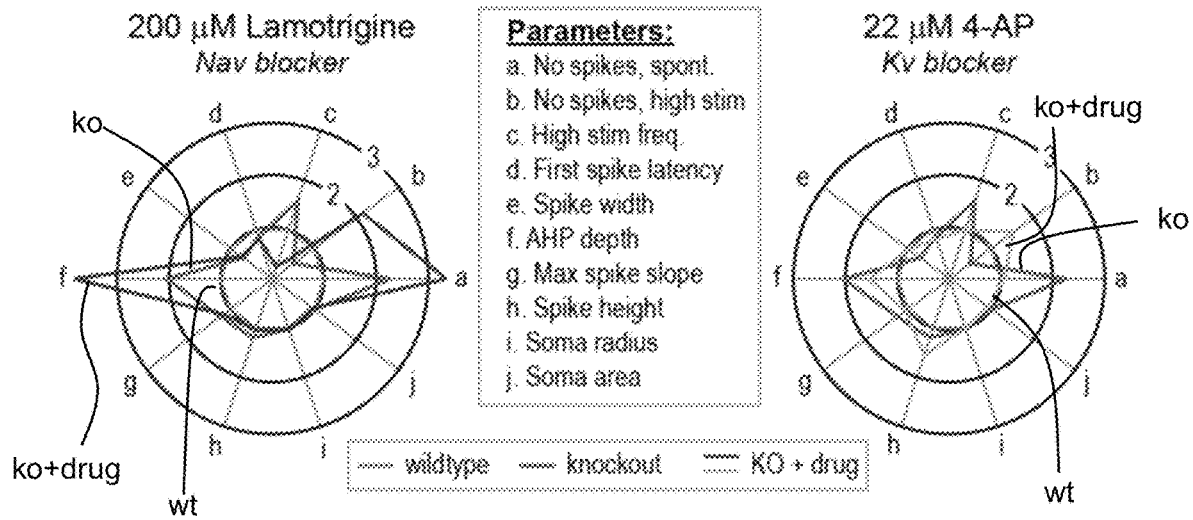
FIG. 27 shows radar plots of disease phenotype and compound effects.

FIG. 27 shows radar plots that allow visualization of disease phenotype and compound effects. This phenotype is more fully described by a vector in the 300-dimension parameter space of recordings.

Figure 28:
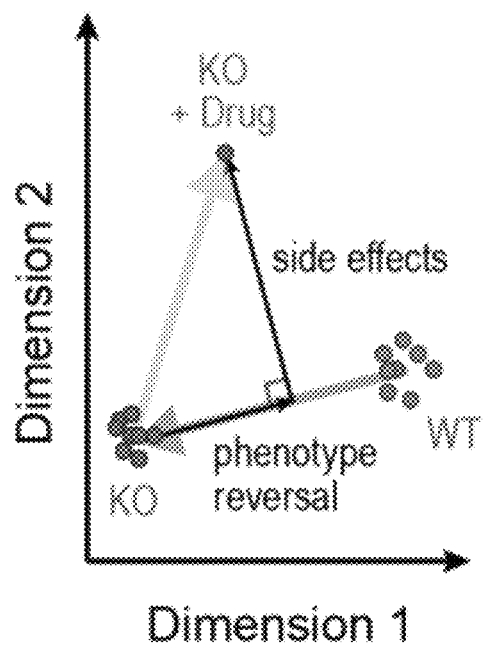
FIG. 28 shows compound effects projected on axes orthogonal to the phenotype vector.

FIG. 28 shows compound effects projected on axes along and orthogonal to the phenotype vector (FIG. 5B), yielding metrics for phenotype reversal and for unwanted "side effects."

Figure 29:
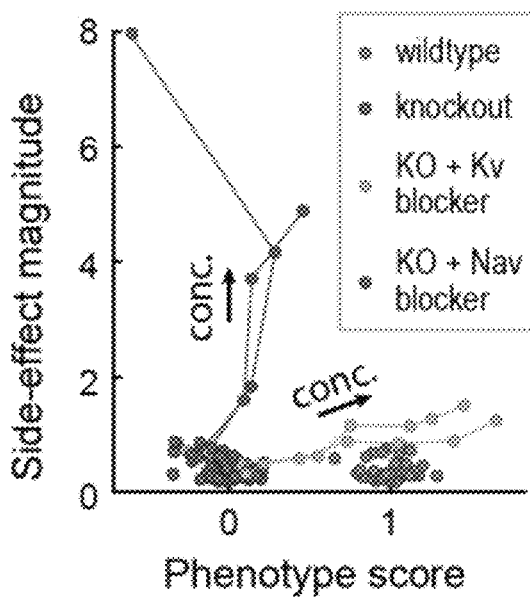
FIG. 29 shows results from two compounds.

FIG. 29 shows results from two compounds in the context of such a phenotype. These two values provide far more information when ranking compounds than a simple 1D effect size from most target-based screens.

FIG. 27-FIG. 29 show multi-dimensional analysis with iPSC-derived excitatory cortical neurons (NGN2), 30 days in culture.

FIG. 27 is Radar plot showing a select subset of parameters normalized to values for wildtype (WT) neurons. Data shows behavior of WT neurons, the disease-model neurons with a confidential LOF mutation (knockout/KO), and the KO neurons in the presence of promiscuous potassium channel blocker 4-AP and promiscuous sodium channel blocker lamotrigine. The difference between WT and KO traces is the functional phenotype. 4-AP substantially reversed the phenotype; lamotrigine perturbed behavior but did not reverse the phenotype.

FIG. 28 is a diagram illustrating phenotype reversal and "side effects." In the ~300-dimensional space of recorded parameters, only two of which are shown, WT wells are clustered and KO wells are clustered. The vector between these populations represents the phenotype (red). Drug effects (blue) are deconstructed into components along (phenotype reversal) and orthogonal to (side effects) the phenotype vector. An ideal drug would undo the effects of the mutation and move the well from the KO cloud to the WT cloud.

FIG. 29 is a plot showing many wells projected onto the phenotype/side effect space. WT and KO wells are well separated along the phenotype direction. Application of the two compounds (8 concentrations from 0.28 to 600 µM) from FIG. 27 have increasing effects on KO cell behavior as the concentration increases. 4-AP moves cell behavior toward and beyond WT behavior, while lamotrigine moves behavior away from both WT and KO. The connected drug points are in order of increasing concentration, and the two lines are experimental replicates on two consecutive weeks of experiment.

Example 4: Applications

Figure 30:
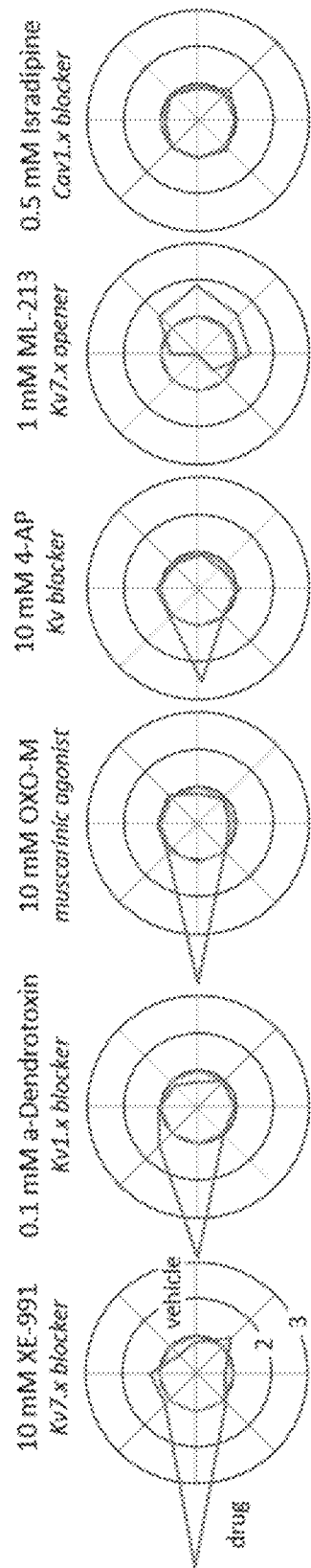
FIG. 30 is radar plots showing the drug-induced change in neuronal spiking behavior.
Figure 31:
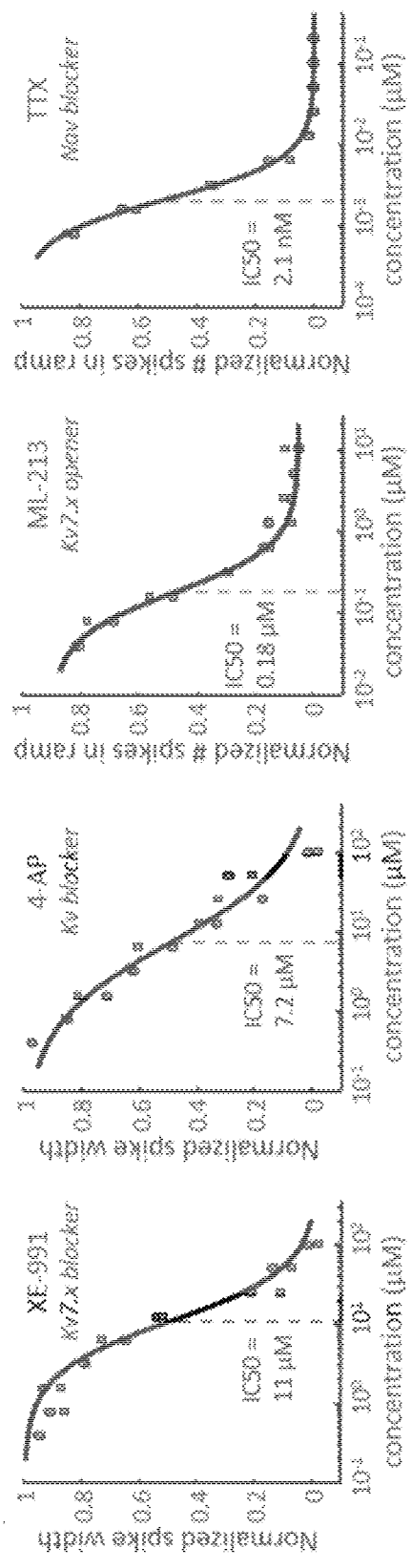
FIG. 31 shows concentration response; two independent titrations are plotted.

Instruments and methods of the disclosure are useful to demonstrate effects from compounds with varied targets (FIG. 30 and FIG. 31). Note that XE-991, a voltage-gated potassium channel Kv7.x blocker, and ML-213, a Kv7.x opener, drive behavior in opposite directions, as expected. Concentration response curves are readily measured with the Optopatch platform (FIG. 31). All compounds show large effect sizes and good repeatability on two independent plates. Each symbol represents>100 cells in one well. All the data shown were measured in a single day.

Figure 34:
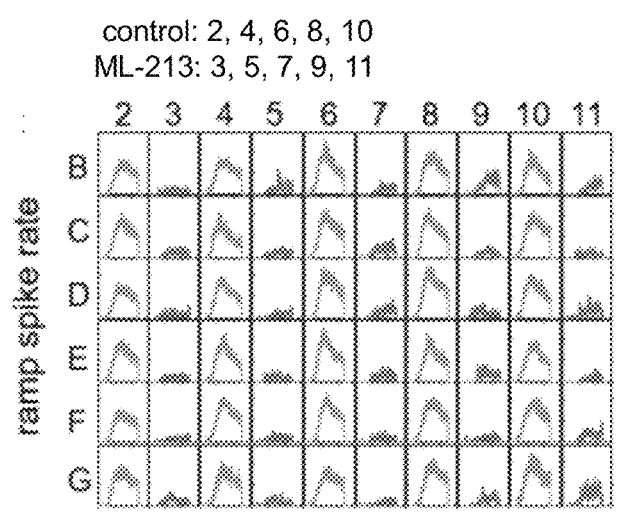
FIG. 34 shows average firing rate during the ramp for each well.
Figure 36:
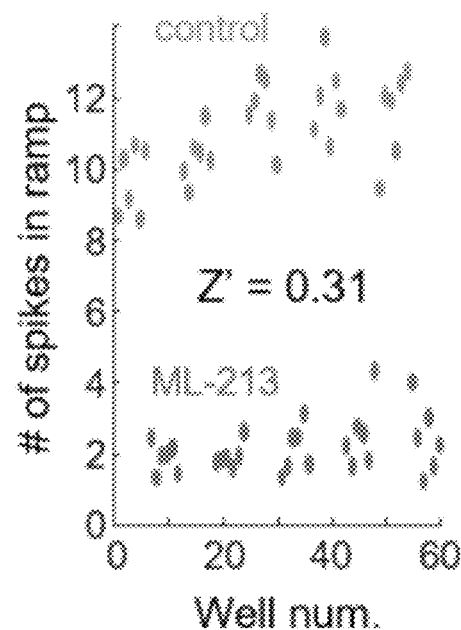
FIG. 36 shows the average number of spikes per cell for the ramp portion of the protocol for each well in FIG. 35.
Figure 35:
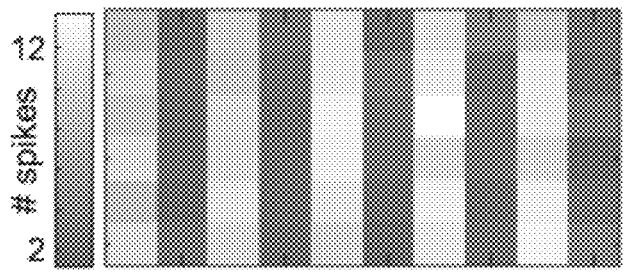
FIG. 35 is a heat map showing the number of spikes during the ramp for each well.

The system is also approaching readiness for high-throughput drug screening. To test system uniformity and repeatability, ML-213 is added to alternating columns in a 96-well plate (FIG. 32-FIG. 37). The change in spike rate during the ramp is readily visible in each well and is uniform across the plate (FIG. 34-35). Using one parameter, number of spikes during the ramp, the Z' of 0.31 indicates a failed call in 1 of 73,000 wells, sufficient for screening tens of thousands of compounds for phenotypic screens in neurons. There was a small drift in time as wells were read out serially at room temperature (FIG. 36). Recent improvements in automation control software have reduced the scan time per FOV from 30 seconds to 10 seconds, which will reduce scan time artifacts. Furthermore, the microscope will have a 5× increased imaging area, reducing the number of FOVs per well to 1 and further increasing screening speed.

FIGS. 30 & 31 show pharmacology e.g., with E18 rat hippocampal neurons cultured 14 days.

FIG. 30 is radar plots showing the drug-induced change in neuronal spiking behavior along many dimensions, tabulated at right. For each parameter, the vehicle is normalized to 1 (green); drug effects in orange.

FIG. 31 shows concentration response; two independent titrations are plotted (squares and circles).

FIG. 32-FIG. 37 show high-throughput validation for screening with E18 rat hippocampal neurons cultured for 14 days.

Figure 32:
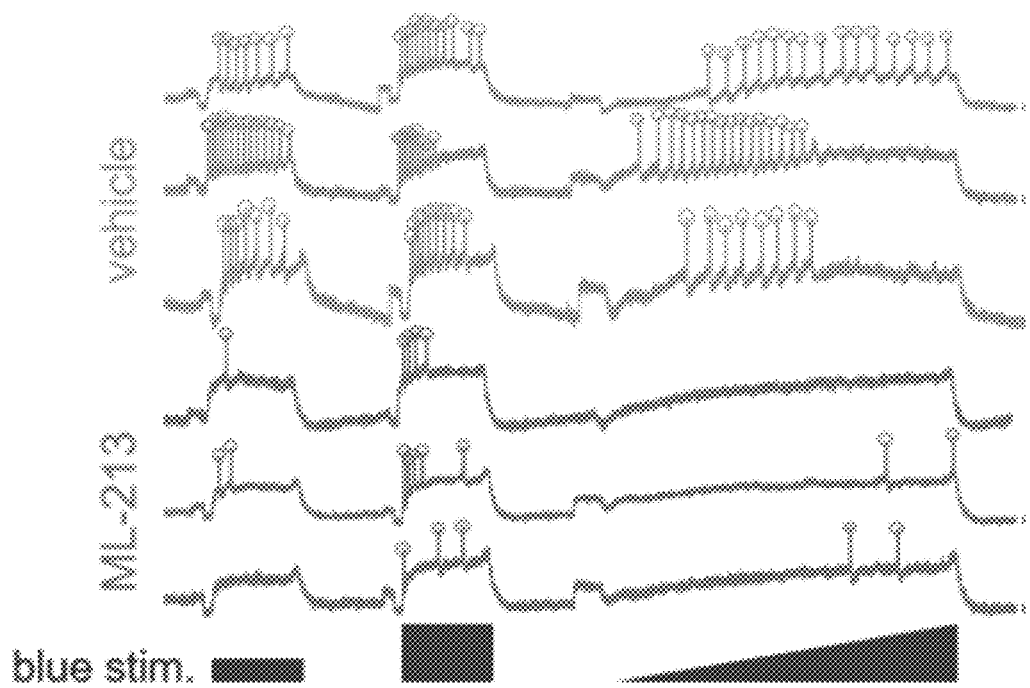
FIG. 32 shows high SNR fluorescent voltage recordings of neurons on the 96-well microscope.

FIG. 32 shows high SNR fluorescent voltage recordings of neurons on the 96-well Firefly in vehicle control wells or in wells with 1 µM ML-213, a Kv 7.x agonist that hyperpolarizes cells and reduces firing. The blue light stimulus is shown below.

Figure 33:
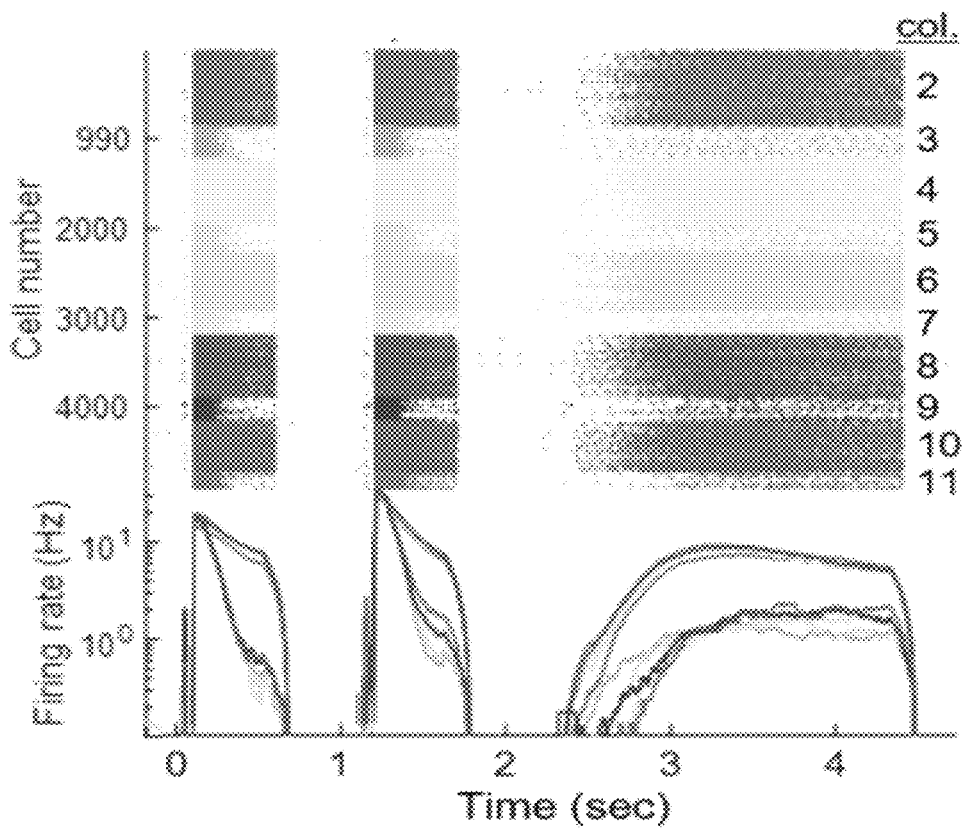
FIG. 33 is a taster plot showing spikes from columns of wells.

FIG. 33 is a Raster plot showing spikes from columns of wells. ML213 dramatically reduces firing rate in all wells tested.

FIG. 34 shows average firing rate during the ramp for each well. Vehicle wells (green) and ML213 wells (red) are easily distinguished.

FIG. 35 is a heat map showing the number of spikes during the ramp for each well.

FIG. 36 shows the average number of spikes per cell for the ramp portion of the protocol for each well in FIG. 35. The calculated Z' of 0.31 is more than good enough to execute a phenotypic screen.

Figure 37:
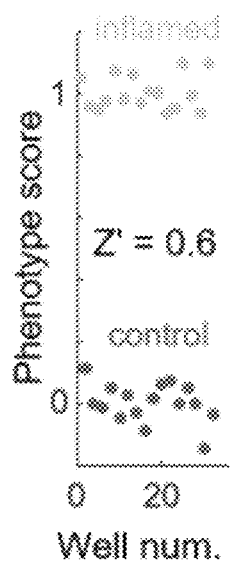
FIG. 37 shows Rat dorsal root ganglion (DRG) sensory neurons.

FIG. 37 shows Rat dorsal root ganglion (DRG) sensory neurons. When treated with a cocktail of inflammatory mediators found in joints of arthritis patients, neurons fire many more action potentials. The large phenotype can support robust screening. Inflammatory mediator cocktails may be compositions as described in WO 2018/165577, incorporated by reference.

Example 5: Phenotyping

FIGS. 38-FIG. 45 show disease-associated phenotypes detected with Optopatch platform including Monogenic epilepsy data with undisclosed mutations.

FIG. 38 shows WT cells, CRISPR/Cas9 was used to knock out the gene, and multiple isogenic clones were expanded and converted to neurons.

FIG. 39 show that through multiple rounds and KO cell lines, there was a consistent change in spike shape. Treatment with a clinically effective compound moves the behavior back towards WT.

FIG. 40 gives a similar, but less severe phenotype observed in heterozygous patient cell lines and healthy familial controls.

Figure 41:
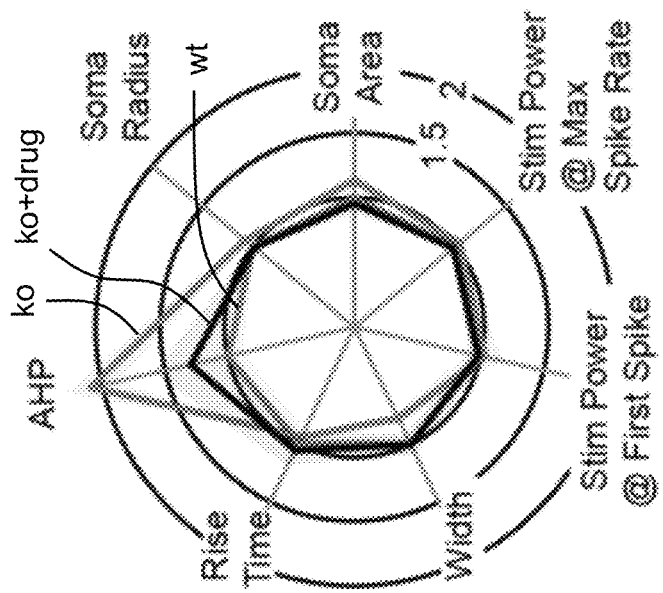
FIG. 41 is a multidimensional radar plot that reveals changes in neuronal morphology, action potential shape, and spike train behavior.

FIG. 41 is a multidimensional radar plot that reveals changes in neuronal morphology, action potential shape, and spike train behavior. Treatment with the clinical compound moves the KO towards WT for all metrics.

Figure 42:
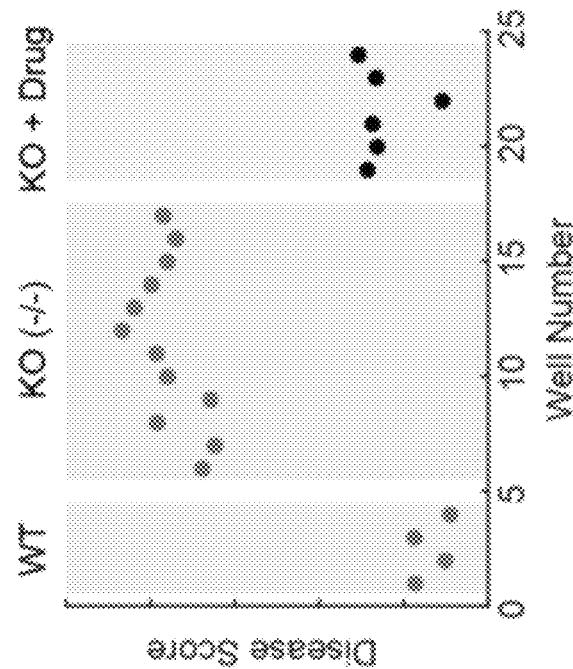
FIG. 42 shows dimensionality reduction yields a robust phenotype.

FIG. 42 shows dimensionality reduction yields a robust phenotype that is consistent across all three cell lines. Drug treatment rescues the phenotype.

Figure 43:
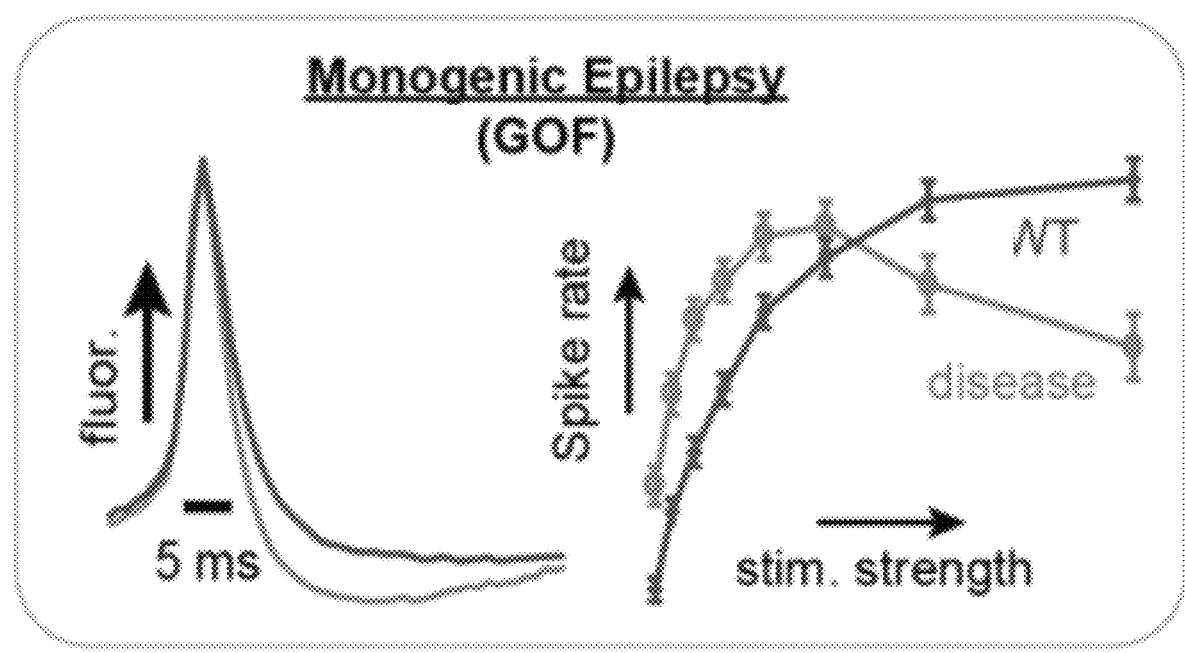
FIG. 43 shows CRISPR/Cas9 is used to introduce a gain-of-function mutation in an ion channel.

FIG. 43 shows CRISPR/Cas9 is used to introduce a gain-of-function mutation in an ion channel. The mutation changes action potential shape and firing behavior between disease model neurons and their isogenic controls.

In addition to testing diverse pharmacological mechanisms, the platform can be applied to many neuronal types for different disease models. The microscope may be used to record from rodent CNS neurons (e.g., FIG. 32), rodent DRG sensory neurons (FIG. 37), and many types of human iPSC-derived neurons including NGN2 cortical excitatory (FIG. 38-FIG. 42), inhibitory, motor, sensory, and dopaminergic neurons. The microscope may be used to detect functional phenotypes in several human iPSC-based and rodent neuron disease models using Optopatch.

Examples shown in FIG. 38-FIG. 43 include different neurological disease models. The disclosure includes disease models in isogenic backgrounds using gene knock-out or knock-in with CRISPR/Cas9 methods and with patient-derived neurons. Using multiple disease and control lines for statistical significance and our sensitive electrophysiology measures, methods may be used for identifying phenotypes associated with disease states.

In addition to intrinsic excitability measurements, the Optopatch platform and Firefly instrument can generate incisive measurements into synaptic function. Methods may be used to measure excitatory and inhibitory post-synaptic potentials (EPSPs and IPSPs) in individual cells, information that cannot be obtained with calcium imaging or microelectrode arrays. Although not as mature as our excitability measurements, new analysis tools and assays can be implemented robustly in 96- and 384-well plates with a throughput comparable to that of excitability measurements.

Example 6: Assays

Figure 45:
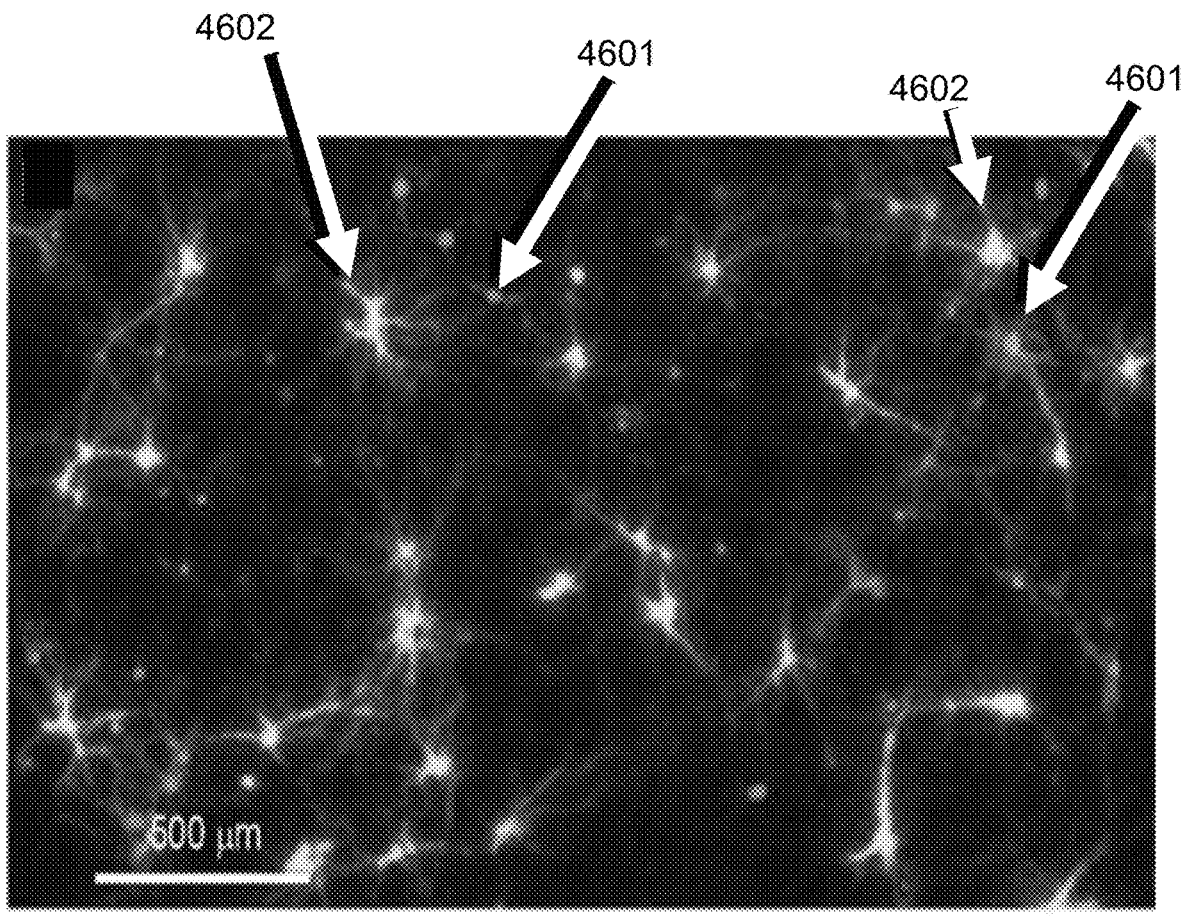
FIG. 45 is a fluorescence image on the Firefly showing QuasAr and CheRiff.
Figure 46:
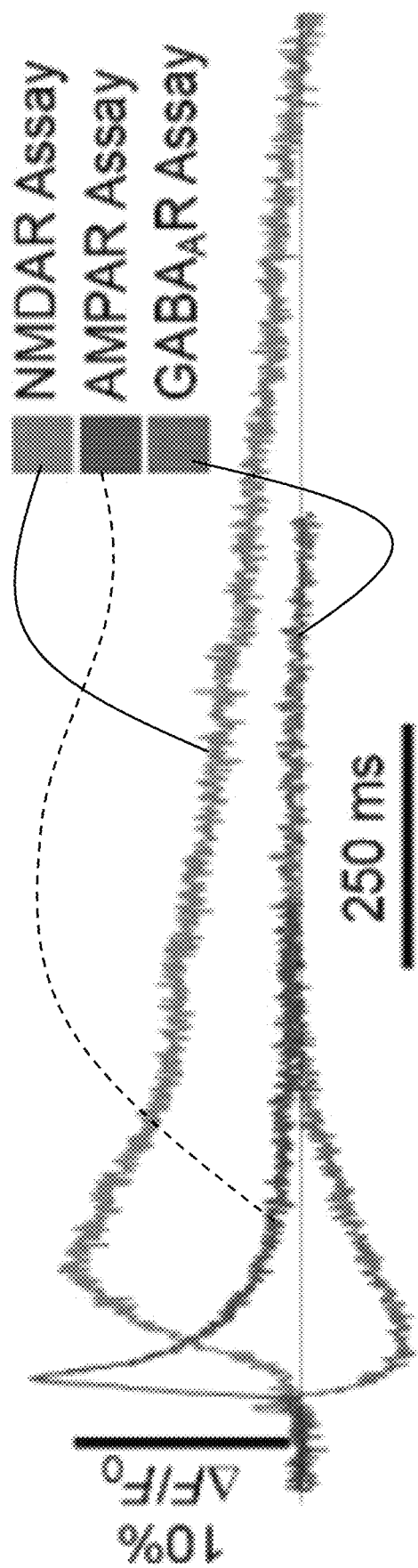
FIG. 46 shows single-cell fluorescent traces showing postsynaptic potentials (PSPs).
Figure 47:
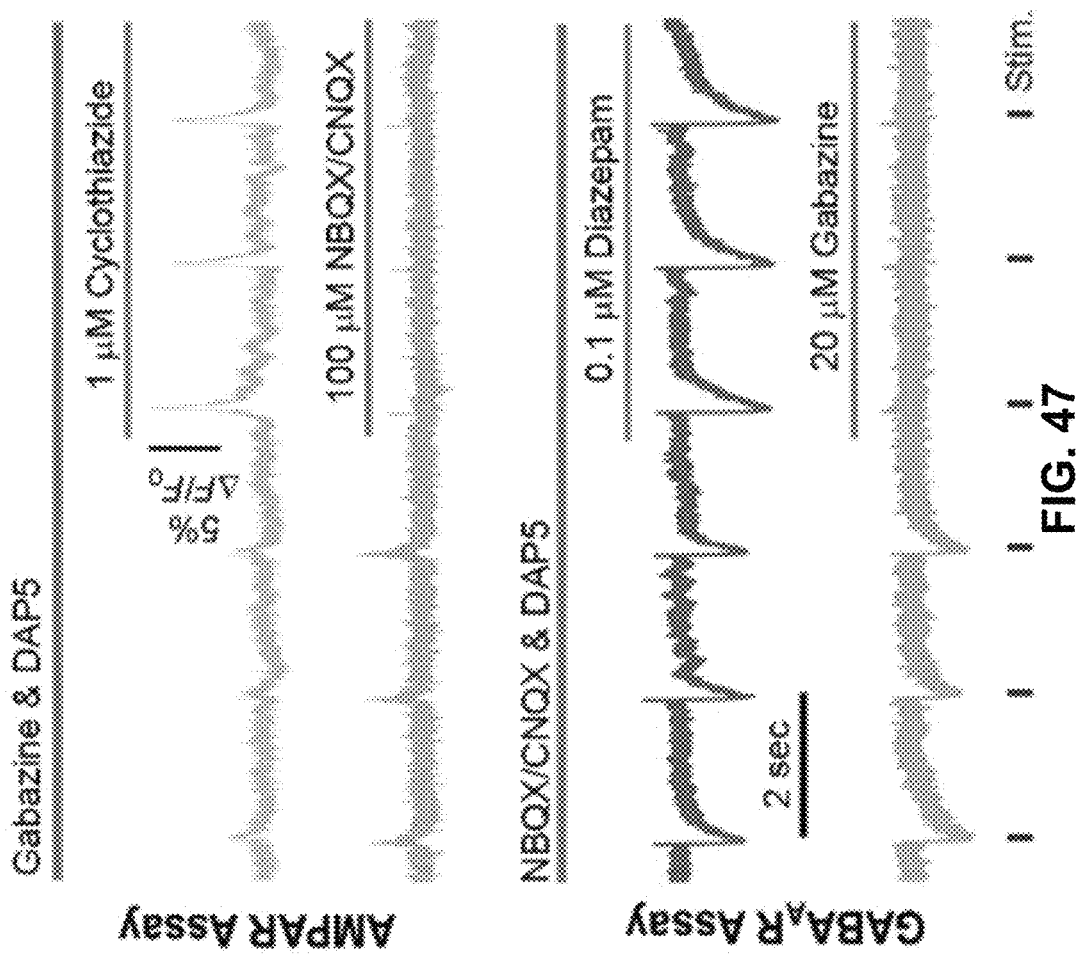
FIG. 47 shows modulation of single cell PSPs by control agonists and blockers.

FIG. 44-FIG. 49 shows recent results with a high-throughput, whole-field stimulation assay. High-throughput screening of synaptic function is implemented with distinct populations of neurons: pre-synaptic neurons express the actuator CheRiff and post-synaptic neurons express the voltage-sensor QuasAr using Cre recombinase and foxed constructs. All cells express CreOFF-CheRiff (Cre excises CheRiff and turns off expression) and CreON-QuasAr (Cre flips QuasAr to the forward orientation, turning on expression). Cre is added at low titer to transduce subsets of neurons creating disjoint populations of neurons expressing either QuasAr or CheRiff. A brief pulse of blue light induces action potentials in the presynaptic cells, and PSPs are detected in postsynaptic cells. Using appropriate postsynaptic channel blockers, we can isolate excitatory, depolarizing voltage changes resulting from AMPA channels (FIGS. 47 & 48, top) and NMDA channels and inhibitory hyperpolarizing voltage changes from GABAA channels (FIGS. 47 & 50, bottom).

Figure 49:
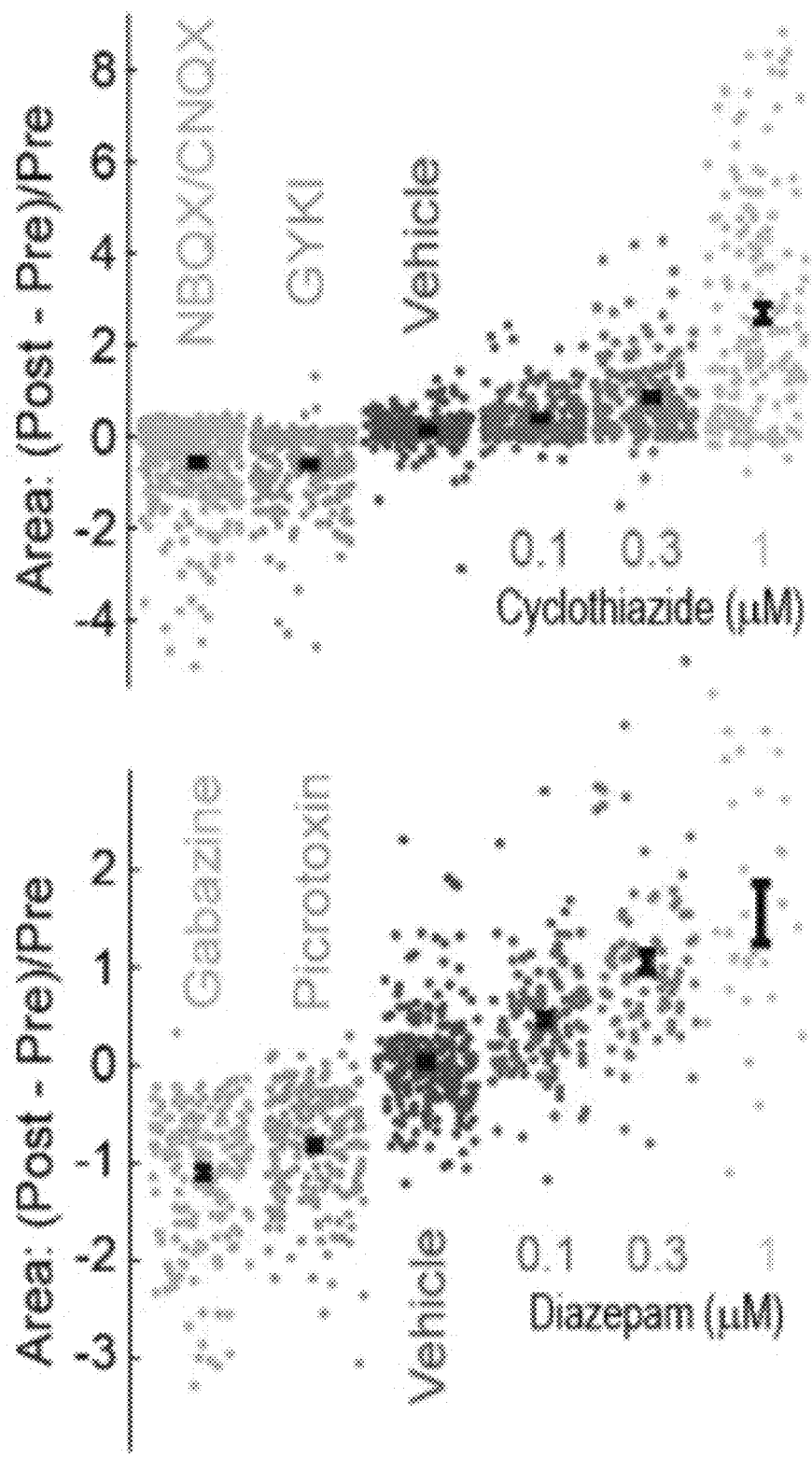
FIG. 49 gives dot-density plots.
Figure 50:
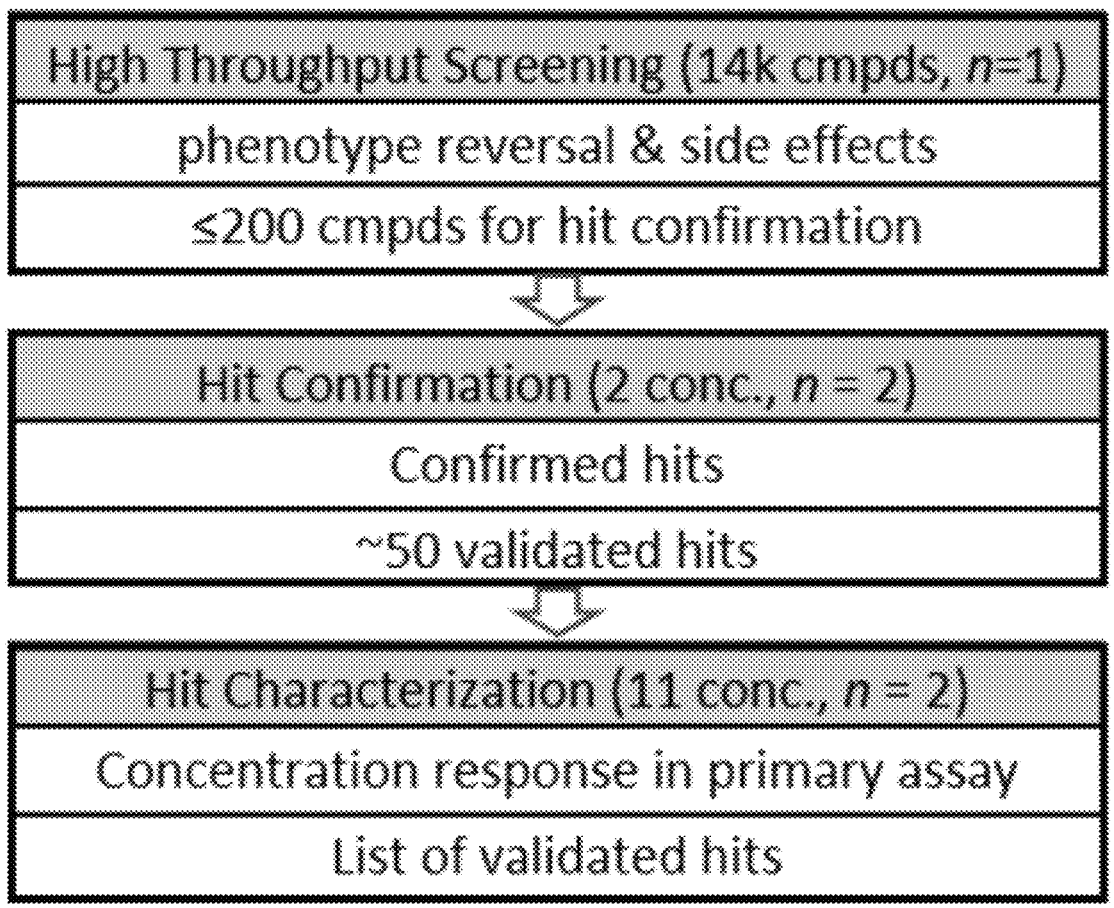
FIG. 50 shows a method for high-throughput screening.

FIG. 49 highlights the large number of individual cells measured and shows clear effects of both positive and negative channel modulators. Additional insight can be obtained if cell types are identified with a fluorescent label. Excitatory and inhibitory cells can be distinguished by transducing cells with a lentiviral construct containing GFP driven by an inhibitory promoter, and excitatory and inhibitory sub-types can be identified using mouse Cre lines. A synaptic assay under development resolves individual synapses by stimulating single presynaptic cells with the DMD.

FIG. 44-FIG. 49 show high-throughput synaptic assay e.g., with E18 rat hippocampal neurons cultured for 14 days.

Figure 44:
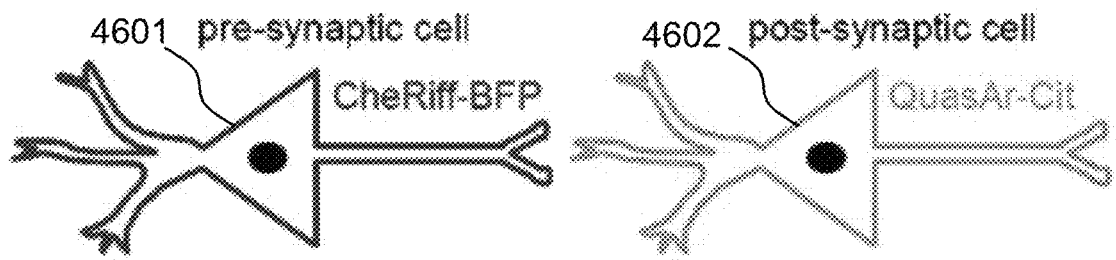
FIG. 44 shows that CheRiff and QuasAr are expressed in certain neurons.

FIG. 44 shows that CheRiff is expressed in a subset of neurons (pre-synaptic neurons 4601) (typically 10-50%) and QuasAr is expressed in the rest (typically 50-90%) (post synaptic neurons 4602).

FIG. 45 is a fluorescence image on the Firefly showing QuasAr fused with citrine (green), CheRiff fused with EBFP2 (blue), and nuclear trafficked TagRFP (red) used for automated image segmentation.

FIG. 46 shows single-cell fluorescent traces showing postsynaptic potentials (PSPs). We independently probe synaptic signals by pharmacologically isolating AMPA, NMDA and GABA.

FIG. 47 shows modulation of single cell PSPs in response to control agonists and blockers for the AMPAR and GABAAR assays. CheRiff stimulation shown at the bottom.

Figure 48:
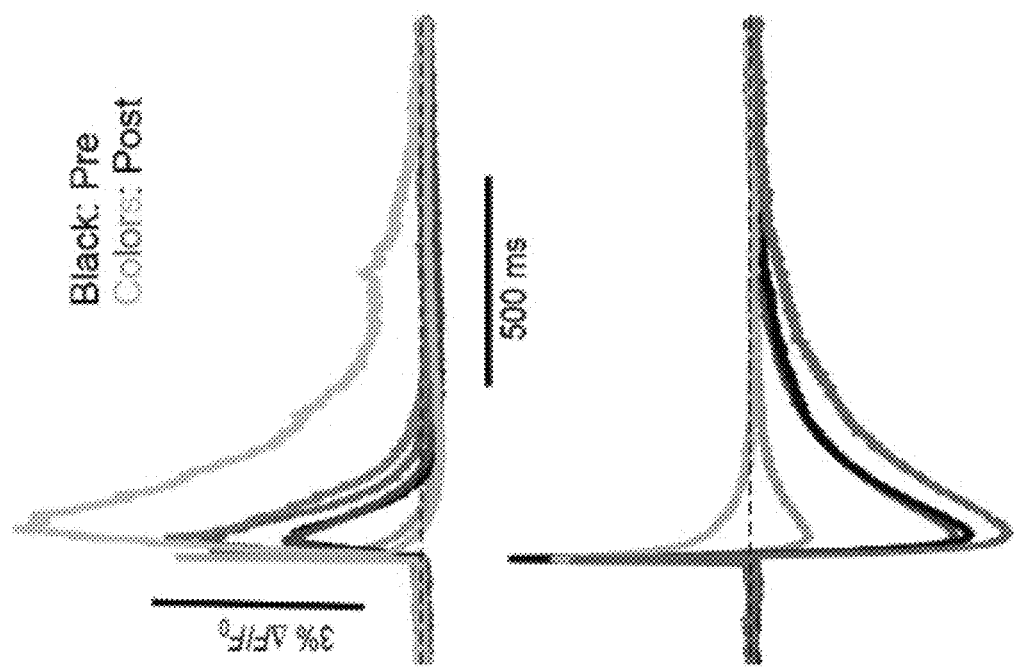
FIG. 48 shows average PSP traces for control pharmacology.

FIG. 48 shows average PSP traces for control pharmacology: Black: pre-drug; Cyan: competitive blocker [AMPAR: 100 µM NBQX/CNQX, 389 cells. GABAAR: 20 µM Gabazine, 176 cells], Green: negative allosteric modulator (NAM) [100 µM GYKI 53655, 291 cells. GABAAR: 30 µM Picrotoxin, 176 cells], Purple: vehicle control [AMPAR: 167 cells. GABAAR: 236 cells], and Blue, Red, & Yellow: positive allosteric modulator (PAM) [AMPAR: 0.1-1 µM Cyclothiazide, 512 cells. GABAAR: 0.1-1 µM Diazepam, 244 cells].

FIG. 49 gives dot-density plots (each dot is one post-synaptic neuron) showing the drug-induced change in PSP area normalized to the mean pre-drug response. Black whiskers are mean±SEM.

Methods are provided to establish robust Optopatch assays with a practical cost and speed, and to fully validate those assays with a large-scale phenotypic screen. Microscopes of the disclosure are useful with 384-well plates. Using optics of the disclosure, automation and a sCMOS camera, we will also increase our read speed by 4×, holding plate scan time roughly constant and quadrupling throughput. The larger imaging area will capture all the neurons in a well, making extremely efficient use of these valuable reagents. Methods of the disclosure provide phenotypic screens.

The disclosure provides a 384-well optogenetic microscope. Converting from 96- to 384-well plates provides a 4× reduction in cost. Methods may be used to record a 4 mm wide by 0.5 mm high FOV at a 1 kHz frame rate; increasing the height lowers the frame rate on the Hamamatsu ORCA-Flash scientific CMOS (sCMOS) camera. Transitioning to a 3.3 mm wide well on a 384-well plate allows 82% of the FOV to be used, modestly reducing the number of cells recorded per minute. A sCMOS camera by Hamamatsu uses a chip architecture and data transfer technology to achieve significantly faster read speeds. When combined with changes in imaging optics and an upgrade to a more powerful excitation laser, instruments of the disclosure may be able to image the full 3.3×3.3 mm area of a 384-well plate at a frame rate faster than 500 Hz, a 5× increase in recording area. Those may be able to image every active neuron in each well of the 384-well plate in a single movie using Optopatch (with the potential exception of cells around the well perimeter), an unprecedented throughput for single-cell electrophysiology recordings.

Example 7: Instrument Features

A microscope may be switched from a 2.7× to a 2×-magnification tube lens to maximize the number of neurons that can be recorded from simultaneously. 2× magnification is sufficient to capture the full 3.3 mm height of the well at 500 Hz. Despite the reduced magnification, the new microscope will have better resolution. When combined with the reduced pixel size, the resolution will improve from 4.8 µm to 2.8 µm. A Vialux V-9601 DMD provides fully synchronized 100 µs pattern refresh for fast single-cell stimulation to measure individual synaptic connections or slightly delayed pulses on connected neurons to probe spike-timing dependent plasticity. The custom prism for coupling the red laser into the sample may be designed to match the smaller well size. Custom 384-well plates, made entirely of cyclic-olefin copolymer (COC), may be used. COC is a plastic designed for UV spectrophotometric applications with ultra-low laser absorption and autofluorescence. COC, which can be tissue-culture (TC) treated with oxygen plasma like traditional polystyrene culture substrate and supports healthy and active neuronal cultures, essentially eliminates background fluorescence and minimizes laser-heating of the substrate. Data were recorded on COC 96-well plates. Control software may be included to handle new hardware (camera & DMD) and minimize dead time when scanning the 384-well plate. The new DMD has a display pattern that may be updated with digital triggers synchronized to camera frames. The new software will also enable multithreading for control of the pipetting robot (picking up tips, loading drug, moving to plate) during execution of other microscope tasks so the microscope can be almost continuously recording high-speed video. To enable facile multithreading, the control software may be architected in C# or similar.

Example 8: High Throughput Screening

Production of plates may be automated for the assay used to identify the disease associated phenotype and optimize for HTS. Heatmap analysis will be used to characterize intraplate and inter-plate variability; changes in cell plating and handling, stimulus protocol, and assay duration will be tested to achieve intraplate and inter-plate variability<20% while maintaining a Z' value>0.3 as described. DMSO tolerance will be defined using concentration-response experiments to identify DMSO levels that produce<10% changes in the assay window magnitude compared with buffer control values. Following confirmation of assay readiness, a small set of five screening plates is randomly selected from the library to guide the selection of a final screening concentration. These plates of compounds will be screened in duplicate at 1, 3, 7 and 10 micro-M. We will select the compound concentration that yields a hit rate of about 1%, with hits defined as a change of greater than 3 standard deviations (SD's) from control values. Using this concentration, we aim to capture a high number of true hits with some false positives.

Pilot screen of FDA approved drug library and tool compounds may use a library of approximately 2400 drugs approved worldwide. That library is screened and a selected set of available tool compounds at the selected screening concentration. This step will serve as a final test of assay readiness for HTS and provide a dataset to establish hit selection criteria, as this library is likely to contain active compounds. Compound libraries will be prepared in bar-coded 384-well plates in 100% DMSO.

Methods include production and banking of reagents for HTS. To ensure uniform cell preparation, one may generate, aliquot, and freeze 300 million iPSC-derived NGN2 neurons, 100 million primary rodent glia, and large batches of lentivirus encoding the Optopatch constructs; each enough to execute the screen 1.5 times. Automated cell culture processes will be applied throughout HTS activities to improve efficiency and uniformity.

Method may include HTS screen and hit confirmation. Compounds will be screened in 384-well format (n=1) at the screening concentration selected, with 32 wells in each plate reserved for controls. The scan time for each plate will depend on the assay protocol and is anticipated to be approximately 90 min., which will enable screening of >5,000 compounds/week on one Firefly instrument at 3 screening days/week. Plates with excess variability (Z'<0.3), low number of active cells, or non-uniform plating will be flagged for repeat. Hit selection and confirmation will be performed following HTS.

FIG. 50 shows a method for high-throughput screening.

Hits will be initially selected based on reversal of the multiparameter phenotype score and side effect score. Hit selection criteria will be based on statistical criteria with hits defined as compounds exhibiting>3 SD changes from in-plate control values.

Activity of up to 200 selected hits will first be confirmed in duplicate at 1× and 0.3× the screening concentration; 2 concentrations help identify compounds with non-monotonic concentration response. Confirmed hits will be tested in 11-pt concentration-response to quantitatively characterize phenotype reversal and side effects. Results will confirm platform performance and will seed hit-to-lead activities through grant funding or collaboration with a pharma partner. Instruments and methods of the disclosure provide for fast & affordable phenotype identification and phenotypic drug screening.

What is claimed is:

1. A microscope comprising:
   a stage configured to hold a multi-well plate;
   a light source for emitting a beam of light mounted within the microscope;
   an optical system that directs the beam towards the stage from beneath, wherein the optical system comprises a homogenizer for spatially homogenizing the beam; and
   a control system comprising memory connected to a processor operable to move the translational stage to position individual wells of the multi-well plate in the path of the beam.

2. The microscope of claim 1, wherein the stage comprises a motorized xy translational stage.

3. The microscope of claim 1, wherein the optical system includes a prism immediately beneath the stage, whereby the beam enters a side of the prism and passes into a well of the plate.

4. The microscope of claim 3, wherein when a well of the plate containing an aqueous sample is positioned above the prism, the prism directs the beam into the sample at angle that avoids total internal reflection within the bottom of the plate.

5. The microscope of claim 3, wherein when a well of the plate containing an aqueous sample is positioned above the prism, the prism directs the beam into the aqueous sample at an angle of refraction that restricts light to about the bottom 10 microns of the well.

6. The microscope of claim 1, comprising at least three light sources for emitting three beams at three distinct wavelengths, wherein the optical system comprises one or more dichroic mirrors to join the three beams in space and pass the three beams through the homogenizer.

7. The microscope of claim 1, wherein the homogenizer forms the beam into a substantially uniform and rectangular region of illumination.

8. The microscope of claim 1, wherein the homogenizer comprises at least two microlens arrays.

9. The microscope of claim 1, wherein the optical system comprises an opaque screen with a plurality of apertures, wherein the screen can be positioned so that the beam passes through one of the apertures.

10. The microscope of claim 9, wherein the homogenizer comprises two microlens arrays and the optical system comprises a plurality of microlens array position stops at predetermined spacings whereby a distance between the two microlens arrays can be fixed to thereby shape the beam to match each of the apertures.

11. The microscope of claim 1, further comprising a stimulation light source that emits a stimulation beam, wherein the optical system comprises digital micromirror device (DMD) and the stimulation beam reflects off the DMD to illuminate a bottom of a well of the plate with a pattern defined by the DMD.

12. The microscope of claim 11, wherein the beam is at an excitation wavelength of a fluorophore, and the stimulation beam is at a second wavelength.

13. The microscope of claim 1, further comprising an imaging lens beneath the stage to direct light from a sample in a well of the plate onto an image sensor mounted within the microscope.

14. The microscope of claim 13, wherein the optical system includes a prism immediately beneath the stage, whereby the beam enters a side of the prism and the prism directs the beam into an aqueous sample in a well of the plate at an angle of refraction that restricts light to about the bottom ten microns of the well, the microscope further comprising a stimulation light source that emits a stimulation beam, wherein the optical system comprises digital micromirror device (DMD) and the stimulation beam reflects off the DMD to illuminate a bottom of a well of the plate with a pattern defined by the DMD.

15. A method for imaging a sample, the method comprising:
   positioning a multi-well plate on a microscope stage, the plate having at least one cell living on a bottom surface of a well;
   obtaining an image of the cell;
   processing the image to create a spatial mask identifying areas of the bottom surface occupied by the cell and areas not occupied by the cell;
   selectively activating micromirrors of a digital micromirror device (DMD) that subtend the cell using the spatial mask; and
   shining light onto the DMD to thereby specifically reflect light onto the areas of the bottom surface occupied by the cell while not reflecting any of the light onto the areas not occupied by the cell.

16. The method of claim 15, further comprising
   creating a spatial mask for cells in each of a plurality of wells of the multi-well plate;
   holding the spatial masks in memory; and
   using the spatial masks and DMD to selectively illuminate the cells in the plurality of wells in a serial manner.

17. The method of claim 16, wherein the DMD is controlled by a computer comprising a process coupled to a non-transitory memory system, the memory system having the spatial masks stored therein.

18. The method of claim 17, wherein the stage comprises a motorized xy translational stage and the computer directs the stage to serially position each of the plurality of wells over an imaging lens of the microscope and activate micromirrors of the DMD according to a spatial mask created uniquely for cells in that well and stored in the memory system.

19. The method of claim 18, wherein the cells include neurons and selectively illuminating the cells in the plurality of wells initiates electrical activity in the illuminated cells.

20. The method of claim 19, wherein the computer records a movie for each well using an imaging sensor positioned beneath the imaging lens and stores the resulting plurality of movies in the memory system.

21. The method of claim 20, wherein the microscope includes a light source and optical system that guides an excitation beam of light each well from beneath at angle that restricts the light to about the bottom ten microns of the well.

22. The method of claim 21, wherein the wells contain neurons that express optical reporters of electrical activity, wherein the neurons fluoresce when they fire an action potential.

23. The method of claim 22, wherein the movies depict fluorescent activity showing the neurons firing.

24. The method of claim 15, wherein the light is stimulation light at a wavelength that excites a fluorophore in the cell.

25. The method of claim 15, wherein the light is activation light at a wavelength that activates a light-gated ion channel in the cell.

26. The method of claim 25, wherein the light-gated ion channel is in a pre-synaptic neuron connected to a non-selected cell via a synapse.

27. The method of claim 26, wherein the non-selected cell comprises an optical reporter of synaptic activity.

28. The method of claim 15, wherein the cell expresses a fluorescent protein, and a computer system analyzes a signal from the fluorescent protein to automatically create the spatial mask.

29. The method of claim 28, wherein the computer system can automatically create a spatial mask for labeled cells in each of a plurality of wells and hold the spatial masks in memory while the microscope serially illuminates each well using the DMD and the respective spatial mask to create spatially patterned illumination specific to a cell in that well.

30. A method for imaging a sample, the method comprising:

positioning a multi-well plate on a microscope stage, the plate having at least one cell living on a bottom surface of a well, wherein the microscope includes an autofocus system;

obtaining images of the multi-well plate from a plurality of fields of view (FOV);

determining the position of each field of view using the autofocus system;

generating a map of a curvature of the well using a subset of the FOVs; and obtaining measurements from the cell living on the bottom of the well by interpolating the positions the FOVs between the subset of the FOVs.

31. The method of claim 30, wherein the autofocus system is a laser-based autofocus system.

32. The method of claim 31, where in the method further comprises moving the microscope stage into a first position and shining a laser beam on the well using a laser of the laser-based autofocus system and determining, using the autofocus system, the position of a FOV based on the displacement the laser beam reflecting off the sample.

33. The method of claim 32, wherein the well with the sample is moved and the laser beam detected for each FOV.

34. The method of claim 30, wherein the autofocus system is an image-based autofocus system.

35. The method of claim 34, wherein the method further comprises recording the X, Y coordinates of n wells across the microplate from the subset of FOVs; measuring an image quality metric in the n wells across a series of Z steps; and finding the Z step that provides the highest image quality metric across the n wells.

* * * * *